US012407385B2

(12) United States Patent
Raghavan et al.

(10) Patent No.: US 12,407,385 B2
(45) Date of Patent: Sep. 2, 2025

(54) SIGNALING OF BEAM CORRELATION ACROSS MILLIMETER WAVE FREQUENCY BANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US); Robert Keith Douglas, San Diego, CA (US); Alexander Dorosenco, El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/157,907

(22) Filed: Jan. 25, 2021

(65) Prior Publication Data

US 2021/0234593 A1    Jul. 29, 2021

Related U.S. Application Data

(60) Provisional application No. 62/966,533, filed on Jan. 27, 2020.

(51) Int. Cl.
*H04B 7/06* (2006.01)
*H04L 5/00* (2006.01)
(Continued)

(52) U.S. Cl.
CPC .......... *H04B 7/0617* (2013.01); *H04W 16/28* (2013.01); *H04W 72/046* (2013.01);
(Continued)

(58) Field of Classification Search
CPC ............................ H04B 7/0617; H04W 16/28
See application file for complete search history.

(56) References Cited

U.S. PATENT DOCUMENTS 6,002,360 A    12/1999  Wolcott et al.
7,787,554 B1   8/2010   Nabar et al.
(Continued)

FOREIGN PATENT DOCUMENTS

CN      1761182 A      4/2006
CN      201902262 U    7/2011
(Continued)

OTHER PUBLICATIONS

Robert Heath, Spatial Covariance Estimation for Millimeter Wave Hybrid Systems using Out-of-Band Information, May 2019, Center for Transportation Research (Year: 2019).*
(Continued)

*Primary Examiner* — Jutai Kao
(74) *Attorney, Agent, or Firm* — Holland & Hart LLP/QUALCOMM Incorporated

(57) ABSTRACT

Methods, systems, and devices for wireless communications are described. A first wireless device may receive, from a second wireless device, a carrier aggregation configuration including two millimeter wave frequency bands for communications. The first wireless device may determine a beam correlation parameter based on the carrier aggregation configuration. The first wireless device may determine beams, based on the beam correlation parameter, in the two frequency bands. The first wireless device and the second wireless device may communicate in carrier aggregation using a beam on a first frequency band and a second beam on a second frequency band.

60 Claims, 23 Drawing Sheets

(51) Int. Cl.
    *H04W 16/28*     (2009.01)
    *H04W 72/044*     (2023.01)
    *H04W 72/23*     (2023.01)
    *H04W 88/14*     (2009.01)

(52) U.S. Cl.
    CPC ........... *H04W 72/23* (2023.01); *H04W 88/14* (2013.01); *H04L 5/001* (2013.01)

(56) References Cited

U.S. PATENT DOCUMENTS

| | | | |
|---|---|---|---|
| 7,826,415 | B2 | 11/2010 | Oh et al. |
| 8,503,322 | B2 * | 8/2013 | Krishnamurthy ....... H04L 5/001 370/252 |
| 9,312,933 | B2 | 4/2016 | Zhang et al. |
| 9,363,683 | B2 | 6/2016 | Raghavan et al. |
| 9,509,382 | B1 | 11/2016 | Nabar et al. |
| 9,520,973 | B2 | 12/2016 | Kim et al. |
| 9,780,928 | B2 | 10/2017 | Moshfeghi |
| 9,806,777 | B1 | 10/2017 | Doostnejad et al. |
| 10,004,032 | B2 | 6/2018 | Islam et al. |
| 10,075,223 | B1 * | 9/2018 | Pawar .................. H04L 5/0044 |
| 10,425,878 | B2 | 9/2019 | Cezanne et al. |
| 10,425,901 | B2 | 9/2019 | Islam et al. |
| 10,462,796 | B2 | 10/2019 | Frenne et al. |
| 10,559,880 | B1 | 2/2020 | Garrett et al. |
| 10,574,321 | B2 | 2/2020 | Nilsson et al. |
| 10,826,585 | B2 | 11/2020 | Bolotin et al. |
| 10,841,914 | B2 | 11/2020 | Liou et al. |
| 10,879,627 | B1 | 12/2020 | Frigon et al. |
| 10,924,173 | B2 | 2/2021 | Bai et al. |
| 10,986,235 | B2 | 4/2021 | Seo et al. |
| 11,438,877 | B2 | 9/2022 | Luo et al. |
| 11,856,570 | B2 | 12/2023 | Raghavan et al. |
| 2006/0008275 | A1 | 1/2006 | Lacovara et al. |
| 2006/0039318 | A1 | 2/2006 | Oh et al. |
| 2007/0070927 | A1 | 3/2007 | Shoki et al. |
| 2008/0240208 | A1 | 10/2008 | Lou et al. |
| 2011/0069633 | A1 | 3/2011 | Schmidt et al. |
| 2011/0255434 | A1 | 10/2011 | Ylitalo |
| 2012/0015603 | A1 | 1/2012 | Proctor, Jr. et al. |
| 2012/0064841 | A1 | 3/2012 | Husted et al. |
| 2012/0140658 | A1 | 6/2012 | Kanzaki et al. |
| 2014/0011468 | A1 | 1/2014 | Park et al. |
| 2014/0206304 | A1 | 7/2014 | Zhang et al. |
| 2014/0235287 | A1 | 8/2014 | Maltsev et al. |
| 2014/0241446 | A1 | 8/2014 | Zhang et al. |
| 2014/0294111 | A1 | 10/2014 | Zhang et al. |
| 2014/0363166 | A1 | 12/2014 | Lacovara |
| 2015/0092621 | A1 | 4/2015 | Jalloul et al. |
| 2015/0349863 | A1 | 12/2015 | El Ayach et al. |
| 2016/0020876 | A1 | 1/2016 | Raghavan et al. |
| 2016/0044517 | A1 | 2/2016 | Raghavan et al. |
| 2016/0112173 | A1 | 4/2016 | Wang et al. |
| 2016/0242182 | A1 | 8/2016 | Chen et al. |
| 2017/0005958 | A1 | 1/2017 | Frenkel et al. |
| 2017/0013630 | A1 | 1/2017 | Franz et al. |
| 2017/0117947 | A1 | 4/2017 | Petersson et al. |
| 2017/0164226 | A1 | 6/2017 | Wei et al. |
| 2017/0194706 | A1 | 7/2017 | Lee et al. |
| 2017/0195998 | A1 | 7/2017 | Zhang et al. |
| 2017/0294926 | A1 | 10/2017 | Islam et al. |
| 2017/0359826 | A1 | 12/2017 | Islam et al. |
| 2017/0364819 | A1 * | 12/2017 | Yang .................. H04L 41/16 |
| 2018/0062720 | A1 * | 3/2018 | Islam .................. H04W 16/28 |
| 2018/0063693 | A1 | 3/2018 | Chakraborty et al. |
| 2018/0138962 | A1 | 5/2018 | Islam et al. |
| 2018/0227094 | A1 | 8/2018 | Liu et al. |
| 2018/0227772 | A1 | 8/2018 | Yu et al. |
| 2018/0249453 | A1 | 8/2018 | Nagaraja et al. |
| 2018/0249526 | A1 | 8/2018 | Nagaraja et al. |
| 2018/0278309 | A1 | 9/2018 | Raghavan et al. |
| 2018/0278316 | A1 | 9/2018 | Yang et al. |
| 2018/0278320 | A1 | 9/2018 | Chendamarai et al. |
| 2019/0044596 | A1 | 2/2019 | Bolotin et al. |
| 2019/0053220 | A1 | 2/2019 | Zhang et al. |
| 2019/0059056 | A1 | 2/2019 | Islam et al. |
| 2019/0069198 | A1 | 2/2019 | Gheorghiu et al. |
| 2019/0081691 | A1 | 3/2019 | Nagaraja et al. |
| 2019/0081753 | A1 | 3/2019 | Jung et al. |
| 2019/0103908 | A1 | 4/2019 | Yu et al. |
| 2019/0141552 | A1 | 5/2019 | Chen et al. |
| 2019/0150161 | A1 | 5/2019 | Cheng et al. |
| 2019/0174385 | A1 | 6/2019 | Sang et al. |
| 2019/0190582 | A1 | 6/2019 | Guo et al. |
| 2019/0239092 | A1 | 8/2019 | Zhou et al. |
| 2019/0268118 | A1 | 8/2019 | Sadiq et al. |
| 2019/0349058 | A1 | 11/2019 | Raghavan et al. |
| 2019/0349863 | A1 * | 11/2019 | Lim ..................... H04W 52/42 |
| 2019/0393948 | A1 | 12/2019 | Zhao et al. |
| 2020/0015106 | A1 | 1/2020 | Lane et al. |
| 2020/0028545 | A1 | 1/2020 | Koskela et al. |
| 2020/0029274 | A1 | 1/2020 | Cheng et al. |
| 2020/0059280 | A1 | 2/2020 | Thurfjell et al. |
| 2020/0068644 | A1 | 2/2020 | Zhou et al. |
| 2020/0091978 | A1 | 3/2020 | Noh et al. |
| 2020/0136708 | A1 | 4/2020 | Pan et al. |
| 2020/0145079 | A1 | 5/2020 | Marinier et al. |
| 2020/0145929 | A1 | 5/2020 | Ryu et al. |
| 2020/0178134 | A1 | 6/2020 | Yang et al. |
| 2020/0178261 | A1 * | 6/2020 | Ioffe .................. H04W 72/085 |
| 2020/0220603 | A1 | 7/2020 | Hao et al. |
| 2020/0220631 | A1 * | 7/2020 | Onggosanusi ....... H04B 17/327 |
| 2020/0228190 | A1 | 7/2020 | Cirik et al. |
| 2020/0259618 | A1 * | 8/2020 | Yang .................. H04W 72/0453 |
| 2020/0259703 | A1 | 8/2020 | Cirik et al. |
| 2020/0260300 | A1 | 8/2020 | Cirik et al. |
| 2020/0314906 | A1 | 10/2020 | Goyal et al. |
| 2020/0351798 | A1 | 11/2020 | Ji et al. |
| 2020/0358509 | A1 | 11/2020 | Wernersson et al. |
| 2020/0366348 | A1 | 11/2020 | Bolotin et al. |
| 2020/0367083 | A1 | 11/2020 | Hao et al. |
| 2020/0374806 | A1 | 11/2020 | Manolakos et al. |
| 2020/0374960 | A1 | 11/2020 | Deenoo et al. |
| 2020/0383060 | A1 | 12/2020 | Park et al. |
| 2021/0021325 | A1 | 1/2021 | Davydov et al. |
| 2021/0022094 | A1 | 1/2021 | Luo et al. |
| 2021/0036741 | A1 * | 2/2021 | Park .................... H04B 7/0404 |
| 2021/0050898 | A1 | 2/2021 | Yu et al. |
| 2021/0068077 | A1 | 3/2021 | Raghavan et al. |
| 2021/0084672 | A1 | 3/2021 | Gulati et al. |
| 2021/0099958 | A1 | 4/2021 | Bae et al. |
| 2021/0105780 | A1 * | 4/2021 | Jin ..................... H04W 76/27 |
| 2021/0105860 | A1 | 4/2021 | Tsai et al. |
| 2021/0111779 | A1 | 4/2021 | Kundargi et al. |
| 2021/0119688 | A1 | 4/2021 | Enescu et al. |
| 2021/0127379 | A1 | 4/2021 | Harrebek et al. |
| 2021/0136598 | A1 | 5/2021 | Raghavan et al. |
| 2021/0144716 | A1 | 5/2021 | Choi et al. |
| 2021/0153085 | A1 | 5/2021 | Rahman et al. |
| 2021/0153209 | A1 * | 5/2021 | Guan ................. H04W 72/0493 |
| 2021/0159946 | A1 | 5/2021 | Raghavan et al. |
| 2021/0159966 | A1 | 5/2021 | Xi et al. |
| 2021/0160850 | A1 | 5/2021 | Akkarakaran et al. |
| 2021/0160881 | A1 | 5/2021 | Rahman et al. |
| 2021/0226681 | A1 | 7/2021 | Raghavan et al. |
| 2021/0234586 | A1 | 7/2021 | Raghavan et al. |
| 2021/0234597 | A1 | 7/2021 | Raghavan et al. |
| 2021/0234598 | A1 | 7/2021 | Raghavan et al. |
| 2021/0234602 | A1 | 7/2021 | Raghavan et al. |
| 2021/0234604 | A1 | 7/2021 | Raghavan et al. |
| 2021/0235434 | A1 | 7/2021 | Raghavan et al. |
| 2021/0250940 | A1 | 8/2021 | Raghavan et al. |
| 2021/0251040 | A1 * | 8/2021 | Tang ..................... H04W 24/10 |
| 2021/0265741 | A1 | 8/2021 | Kenington |
| 2021/0329621 | A1 | 10/2021 | Raghavan |
| 2021/0359826 | A1 * | 11/2021 | Wang .................... H04B 7/088 |
| 2021/0410094 | A1 | 12/2021 | Cui et al. |
| 2022/0006539 | A1 | 1/2022 | Sun et al. |
| 2022/0070823 | A1 | 3/2022 | Ma et al. |
| 2022/0086702 | A1 * | 3/2022 | Wang ................. H04W 36/0016 |
| 2022/0149924 | A1 * | 5/2022 | Zhang .................. H04L 1/1812 |
| 2022/0150717 | A1 | 5/2022 | Geng et al. |
| 2022/0200146 | A1 | 6/2022 | Du et al. |

(56) References Cited

U.S. PATENT DOCUMENTS

| | | | |
|---|---|---|---|
| 2022/0201505 A1 | 6/2022 | Zhao et al. | |
| 2022/0210810 A1 | 6/2022 | Khoshnevisan et al. | |
| 2022/0210814 A1 | 6/2022 | Khoshnevisan | |
| 2022/0345908 A1* | 10/2022 | Takano | H04W 16/28 |
| 2023/0051329 A1* | 2/2023 | Flordelis | H04W 72/0453 |
| 2024/0027821 A1 | 1/2024 | Noguchi | |
| 2024/0129922 A1 | 4/2024 | Raghavan et al. | |

FOREIGN PATENT DOCUMENTS

| | | | |
|---|---|---|---|
| CN | 109391984 A | 2/2019 | |
| CN | 109792610 A | 5/2019 | |
| CN | 110073609 A | 7/2019 | |
| CN | 110419177 A | 11/2019 | |
| CN | 113287349 B | 11/2022 | |
| EP | 3167653 A1 | 5/2017 | |
| EP | 3536101 A1 | 9/2019 | |
| JP | 2001526510 A | 12/2001 | |
| JP | 2013501480 A | 1/2013 | |
| TW | 201902262 A | 1/2019 | |
| TW | 201921882 A | 6/2019 | |
| TW | 201937873 A | 9/2019 | |
| WO | WO-2014130893 A2 | 8/2014 | |
| WO | WO-2016005843 A1 | 1/2016 | |
| WO | WO-2016148838 A1 | 9/2016 | |
| WO | WO-2017007564 A1 | 1/2017 | |
| WO | WO-2017204546 A1 | 11/2017 | |
| WO | WO-2018075205 A1 | 4/2018 | |
| WO | WO-2018085709 A1 | 5/2018 | |
| WO | WO-2018128885 A1 | 7/2018 | |
| WO | WO-2018144844 A1 | 8/2018 | |
| WO | WO-2018219438 A1 | 12/2018 | |
| WO | WO-2019014041 A1 | 1/2019 | |
| WO | WO-2019029609 A1 | 2/2019 | |
| WO | WO-2019140256 A1 | 7/2019 | |
| WO | WO-2019192005 A1 | 10/2019 | |
| WO | WO-2019213889 A1 | 11/2019 | |
| WO | WO-2019231716 A1 | 12/2019 | |
| WO | WO-2020020453 A1 | 1/2020 | |
| WO | WO-2020096903 A1 | 5/2020 | |
| WO | WO-2020101757 A1 | 5/2020 | |
| WO | WO-2021041533 A1 | 3/2021 | |
| WO | WO-2021144114 A1 * | 7/2021 | |
| WO | WO-2021154737 A9 | 9/2021 | |
| WO | WO-2022170622 A1 | 8/2022 | |

OTHER PUBLICATIONS

Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.

Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3-p. 3, paragraph 2.4 p. 4, paragraph 3 figures 3-5.

Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.

International Search Report and Written Opinion—PCT/US2021/015055—ISA/EPO—dated Apr. 15, 2021 (201385WO).

Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15-line 16 p. 2, line 6-line 16, the Whole Document.

Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3.

CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1-p. 3, paragraph section 2.2.

Motorola Mobility, et al., "Power Control for Multi-Panel Uplink Transmission", 3GPP TSG RAN WG1 AH-1901, 3GPP Draft; R1-1900944-PC-EMIMO-OTHER-FINAL, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1-p. 3, paragraph section 2.2.

Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2-p. 3, figure 2.

Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.

Fraunhofer IIS, et al., "Discussion on Signaling of Beam Correspondence", 3GPP TSG RAN WG1 Meeting #94bis, 3GPP Draft; R1-1811086_Discussion_on_Signaling_of_Beam_ Correspondence, 3rd Generation Partnership Project (3GPP), Mobile Competence Centre; 650, Route Des Lucioles; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.

Mediatek Inc: "Discussion on UL Beam Management Procedure", 3GPP TSG RAN WG1 Meeting #88, 3GPP Draft; R1-1702731 Discussion on UL Beam Management Procedure Final, 3rd Generation Partnership Project (3GPP), Mobile Competence Centre ; 650, Route Des Lucioles; F-06921 Sophia-Antipolis Cedex, vol.

(56) References Cited

OTHER PUBLICATIONS

RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.
Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.
Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, 27 Pages, Aug. 25, 2020 (Aug. 25, 2020) sections 1-2, section 4.1, the whole document.
Raghavan, et al., "Antenna Placement and Performance Tradeoffs With Hand Blockage in Millimeter Wave Systems", IEEE, Apr. 2019 (Year: 2019), 16 Pages.
Jain I. K., "Millimeter Wave Beam Training: A Survey", arXiv, Sep. 2018, 2 Pages.
Zheng Z., et al., "Time of Arrival and Time Sum of Arrival Based NLOS Identification and Localization", IEEE 2012, 5 Pages.
Nokia, et al., "On CSI-RS Design for DL Beam Management", 3GPP Draft, 3GPP TSG RAN WG1 #88, R1-1703179, Athens, Greece, Feb. 13-17, 2017, 14 Pages, Feb. 7, 2017.
Chen C., "Resolution to CIDs Related to Asymmetric Beamforming and Directional Allocation", IEEE 802.11-18/0158r3, Jan. 15, 2018, pp. 1-8.
Fraunhofer Iis., et al., "Discussion on Signaling of Beam Correspondence", R1-1811086, 3GPP TSG RAN WG1 Meeting #94bis Chengdu, China Oct. 8-12, 2018, 5 Pages.
Interdigital Inc: "Views on Panel Activation and Deactivation", 3GPP TSG RAN WG1 #98, R1-1908233, Prague, CZ, Aug. 26, 2019-Aug. 30, 2019, 6 Pages.
Mediatek Inc: "Discussion on UL Beam Management Procedure", R1-1702731, 3GPP TSG RAN WG1 Meeting #88 Athens, Greece, Feb. 13-17, 2017, 4 Pages.
Apple Inc: "FR2 DL Inter-Band CA Architecture Considerations", 3GPP RAN WG4 Meeting #93, R4-1913540, Reno, USA, Nov. 18-21, 2019, 8 Pages, Nov. 9, 2019.
Samsung: "Remaining Details on QCL", 3GPP TSG RAN WG1#90b, R1-1717634, Prague, Czech Republic, Oct. 9-13, 2017, 9 Pages, Oct. 3, 2017, Section 4, 4.2 Intercarrier QCL.

\* cited by examiner ated herein.

SIGNALING OF BEAM CORRELATION ACROSS MILLIMETER WAVE FREQUENCY BANDS

CROSS REFERENCE

The present Application for Patent claims the benefit of U.S. Provisional Patent Application No. 62/966,533 by RAGHAVAN et al., entitled "SIGNALING OF BEAM CORRELATION ACROSS MILLIMETER WAVE FREQUENCY BANDS," filed Jan. 27, 2020, assigned to the assignee hereof, and expressly incorporated by reference herein.

INTRODUCTION

The following relates to wireless communications and more specifically to managing beam correlation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first wireless device is described. The method may include receiving, from a second wireless device, a carrier aggregation configuration for communications with the second wireless device, the carrier aggregation configuration including at least a first frequency band and a second frequency band. The method may also include communicating, with the second wireless device, in carrier aggregation using a first beam on the first frequency band and a second beam on the second frequency band, the first beam and the second beam based on a beam correlation parameter, the beam correlation parameter based on the received carrier aggregation configuration.

An apparatus for wireless communications at a first wireless device is described. The apparatus may include a processor and memory coupled to the processor. The processor and memory configured to cause the apparatus to receive, from a second wireless device, a carrier aggregation configuration for communications with the second wireless device, the carrier aggregation configuration including at least a first frequency band and a second frequency band and communicate, with the second wireless device, in carrier aggregation using a first beam on the first frequency band and a second beam on the second frequency band, the first beam and the second beam based on a beam correlation parameter, the beam correlation parameter based on the received carrier aggregation configuration.

Another apparatus for wireless communications at a first wireless device is described. The apparatus may include means for receiving, from a second wireless device, a carrier aggregation configuration for communications with the second wireless device, the carrier aggregation configuration including at least a first frequency band and a second frequency band. The apparatus may also include means for communicating, with the second wireless device, in carrier aggregation using a first beam on the first frequency band and a second beam on the second frequency band, the first beam and the second beam based on a beam correlation parameter, the beam correlation parameter based on the received carrier aggregation configuration.

A non-transitory computer-readable medium storing code for wireless communications at a first wireless device is described. The code may include instructions executable by a processor to receive, from a second wireless device, a carrier aggregation configuration for communications with the second wireless device, the carrier aggregation configuration including at least a first frequency band and a second frequency band. The code may also include instructions to communicate, with the second wireless device, in carrier aggregation using a first beam on the first frequency band and a second beam on the second frequency band, the first beam and the second beam based on a beam correlation parameter, the beam correlation parameter based on the received carrier aggregation configuration.

In some examples of the method, apparatuses, and non-transitory computer-readable medium described herein, receiving the carrier aggregation configuration may include operations, features, means, or instructions for receiving, from the second wireless device, an inter-band carrier aggregation configuration.

In some examples of the method, apparatuses, and non-transitory computer-readable medium described herein, the first frequency band may be a first millimeter wave frequency band and the second frequency band may be a second millimeter wave frequency band.

In some examples of the method, apparatuses, and non-transitory computer-readable medium described herein, receiving the carrier aggregation configuration may include operations, features, means, or instructions for receiving, from the second wireless device, a configuration message as a broadcast message to one or more wireless devices including at least the first wireless device, a wireless device specific message intended for the first wireless device, or both.

In some examples of the method, apparatuses, and non-transitory computer-readable medium described herein, receiving the carrier aggregation configuration may include operations, features, means, or instructions for receiving, from the second wireless device, a configuration message specific to bandwidth parts of the first and second frequency bands.

In some examples of the method, apparatuses, and non-transitory computer-readable medium described herein, receiving the carrier aggregation configuration may include operations, features, means, or instructions for receiving, from the second wireless device, a configuration message specific to a transmission configuration indication state used in the first and second frequency bands at the second wireless device.

In some examples of the method, apparatuses, and non-transitory computer-readable medium described herein, receiving the carrier aggregation configuration may include operations, features, means, or instructions for receiving, from the second wireless device, a configuration message as a weighted average metric for two or more transmission configuration indication states used in the first and second frequency bands at the second wireless device.

In some examples of the method, apparatuses, and non-transitory computer-readable medium described herein, communicating in carrier aggregation may include operations, features, means, or instructions for communicating in carrier aggregation based on weights for use with the weighted average metric and the transmission configuration indication states of the second beam used in determining a weighted average.

In some examples of the method, apparatuses, and non-transitory computer-readable medium described herein, the first frequency band may be a lower millimeter wave band and the second frequency band may be an upper millimeter wave band.

In some examples of the method, apparatuses, and non-transitory computer-readable medium described herein, the first frequency band includes frequencies between 24.25 GHz and 52.6 GHz and the second frequency band includes frequencies that are greater than 52.6 GHz.

In some examples of the method, apparatuses, and non-transitory computer-readable medium described herein, the first wireless device may be a user equipment (UE) or a customer premises equipment (CPE) in a wireless communications system and the second wireless device may be a base station, a CPE, a relay device, a router, a repeater, or an integrated access and backhaul (IAB) node in the wireless communications system.

A method for wireless communications at a second wireless device is described. The method may include transmitting, to a first wireless device, a carrier aggregation configuration for communications with the first wireless device, the carrier aggregation configuration including at least a first frequency band and a second frequency band. The method may also include communicating, with the first wireless device, in carrier aggregation using a first beam on the first frequency band and a second beam on the second millimeter frequency wave band, the first beam and the second beam being based on a beam correlation parameter, the beam correlation parameter based on the received carrier aggregation configuration.

An apparatus for wireless communications at a second wireless device is described. The apparatus may include a processor and memory coupled to the processor. The processor and memory configured to cause the apparatus to transmit, to a first wireless device, a carrier aggregation configuration for communications with the first wireless device, the carrier aggregation configuration including at least a first frequency band and a second frequency band and communicate, with the first wireless device, in carrier aggregation using a first beam on the first frequency band and a second beam on the second millimeter frequency wave band, the first beam and the second beam being based on a beam correlation parameter, the beam correlation parameter based on the received carrier aggregation configuration.

Another apparatus for wireless communications at a second wireless device is described. The apparatus may include means for transmitting, to a first wireless device, a carrier aggregation configuration for communications with the first wireless device, the carrier aggregation configuration including at least a first frequency band and a second frequency band. The apparatus may also include means for communicating, with the first wireless device, in carrier aggregation using a first beam on the first frequency band and a second beam on the second millimeter frequency wave band, the first beam and the second beam being based on a beam correlation parameter, the beam correlation parameter based on the received carrier aggregation configuration.

A non-transitory computer-readable medium storing code for wireless communications at a second wireless device is described. The code may include instructions executable by a processor to transmit, to a first wireless device, a carrier aggregation configuration for communications with the first wireless device, the carrier aggregation configuration including at least a first frequency band and a second frequency band and communicate, with the first wireless device, in carrier aggregation using a first beam on the first frequency band and a second beam on the second millimeter frequency wave band, the first beam and the second beam being based on a beam correlation parameter, the beam correlation parameter based on the received carrier aggregation configuration.

In some examples of the method, apparatuses, and non-transitory computer-readable medium described herein, transmitting the carrier aggregation configuration may include operations, features, means, or instructions for transmitting, from the second wireless device, an inter-band carrier aggregation configuration.

In some examples of the method, apparatuses, and non-transitory computer-readable medium described herein, the first frequency band may be a first millimeter wave frequency band and the second frequency band may be a second millimeter wave frequency band.

In some examples of the method, apparatuses, and non-transitory computer-readable medium described herein, transmitting the carrier aggregation configuration may include operations, features, means, or instructions for transmitting, to the first wireless device, a configuration message as a broadcast message to one or more wireless devices including at least the first wireless device, a wireless device specific message intended for the first wireless device, or both.

In some examples of the method, apparatuses, and non-transitory computer-readable medium described herein, transmitting the carrier aggregation configuration may include operations, features, means, or instructions for transmitting, to the first wireless device, a configuration message specific to bandwidth parts of the first and second frequency bands.

In some examples of the method, apparatuses, and non-transitory computer-readable medium described herein, transmitting the carrier aggregation configuration may include operations, features, means, or instructions for transmitting, to the first wireless device, a configuration message specific to a transmission configuration indication state used in the first and second frequency bands at the second wireless device.

In some examples of the method, apparatuses, and non-transitory computer-readable medium described herein, transmitting the carrier aggregation configuration may include operations, features, means, or instructions for transmitting, to the first wireless device, a configuration message as a weighted average metric for two or more transmission configuration indication states used in the first and second frequency bands at the second wireless device.

In some examples of the method, apparatuses, and non-transitory computer-readable medium described herein, the first frequency band may be a lower millimeter wave band and the second frequency band may be an upper millimeter wave band.

In some examples of the method, apparatuses, and non-transitory computer-readable medium described herein, the first wireless device may be a UE or a CPE in a wireless communications system and the second wireless device may be a base station, a CPE, a relay device, a router, a repeater, or an IAB node in the wireless communications system.

In some examples of the method, apparatuses, and non-transitory computer-readable medium described herein, the first frequency band includes frequencies between 24.25 GHz and 52.6 GHz and the second frequency band includes frequencies that are greater than 52.6 GHz.

Another method of wireless communications at a first wireless device is described. The method may include receiving, from a second wireless device, an inter-band carrier aggregation configuration for communications with the second wireless device, the inter-band carrier aggregation configuration including at least a first millimeter wave frequency band and a second millimeter wave frequency band, determining, a beam correlation parameter, based on the received inter-band carrier aggregation configuration from the second wireless device, determining, a first beam for use in communications with the second wireless device on the first millimeter wave frequency band based on the beam correlation parameter, determining, a second beam for use in communications with the second wireless device on the second millimeter wave frequency band based on the beam correlation parameter, and communicating, with the second wireless device, in an inter-band carrier aggregation mode using the first beam on the first millimeter wave frequency band and the second beam on the second millimeter wave frequency band.

Another apparatus for wireless communications at a first wireless device is described. The apparatus may include a processor, memory coupled with the processor, and instructions stored in the memory. The instructions may be executable by the processor to cause the apparatus to receive, from a second wireless device, an inter-band carrier aggregation configuration for communications with the second wireless device, the inter-band carrier aggregation configuration including at least a first millimeter wave frequency band and a second millimeter wave frequency band, determine, a beam correlation parameter, based on the received inter-band carrier aggregation configuration from the second wireless device, determine, a first beam for use in communications with the second wireless device on the first millimeter wave frequency band based on the beam correlation parameter, determine, a second beam for use in communications with the second wireless device on the second millimeter wave frequency band based on the beam correlation parameter, and communicate, with the second wireless device, in an inter-band carrier aggregation mode using the first beam on the first millimeter wave frequency band and the second beam on the second millimeter wave frequency band.

Another apparatus for wireless communications at a first wireless device is described. The apparatus may include means for receiving, from a second wireless device, an inter-band carrier aggregation configuration for communications with the second wireless device, the inter-band carrier aggregation configuration including at least a first millimeter wave frequency band and a second millimeter wave frequency band, determining, a beam correlation parameter, based on the received inter-band carrier aggregation configuration from the second wireless device, determining, a first beam for use in communications with the second wireless device on the first millimeter wave frequency band based on the beam correlation parameter, determining, a second beam for use in communications with the second wireless device on the second millimeter wave frequency band based on the beam correlation parameter, and communicating, with the second wireless device, in an inter-band carrier aggregation mode using the first beam on the first millimeter wave frequency band and the second beam on the second millimeter wave frequency band.

Another non-transitory computer-readable medium storing code for wireless communications at a first wireless device is described. The code may include instructions executable by a processor to receive, from a second wireless device, an inter-band carrier aggregation configuration for communications with the second wireless device, the inter-band carrier aggregation configuration including at least a first millimeter wave frequency band and a second millimeter wave frequency band, determine, a beam correlation parameter, based on the received inter-band carrier aggregation configuration from the second wireless device, determine, a first beam for use in communications with the second wireless device on the first millimeter wave frequency band based on the beam correlation parameter, determine, a second beam for use in communications with the second wireless device on the second millimeter wave frequency band based on the beam correlation parameter, and communicate, with the second wireless device, in an inter-band carrier aggregation mode using the first beam on the first millimeter wave frequency band and the second beam on the second millimeter wave frequency band.

In some examples of the method, apparatuses, and non-transitory computer-readable medium described herein, receiving the inter-band carrier aggregation configuration may include operations, features, means, or instructions for receiving, from the second wireless device, a configuration message as a broadcast message to one or more wireless devices including at least the first wireless device, a wireless device specific message intended for the first wireless device, or both.

In some examples of the method, apparatuses, and non-transitory computer-readable medium described herein, receiving the inter-band carrier aggregation configuration may include operations, features, means, or instructions for receiving, from the second wireless device, a configuration message specific to bandwidth parts of the first and second millimeter wave frequency bands.

In some examples of the method, apparatuses, and non-transitory computer-readable medium described herein, receiving the inter-band carrier aggregation configuration may include operations, features, means, or instructions for receiving, from the second wireless device, a configuration message specific to a transmission configuration indication state used in the first and second millimeter wave frequency bands at the second wireless device.

In some examples of the method, apparatuses, and non-transitory computer-readable medium described herein, receiving the inter-band carrier aggregation configuration may include operations, features, means, or instructions for receiving, from the second wireless device, a configuration message as a weighted average metric for two or more transmission configuration indication states used in the first and second millimeter wave frequency bands at the second wireless device.

Some examples of the method, apparatuses, and non-transitory computer-readable medium described herein may further include operations, features, means, or instructions for determining the weights for use with the weighted average metric and the transmission configuration indications of the second beam used in determining the weighted average.

In some examples of the method, apparatuses, and non-transitory computer-readable medium described herein, the first millimeter wave frequency band may be a lower millimeter wave band and the second millimeter wave frequency band may be an upper millimeter wave band.

In some examples of the method, apparatuses, and non-transitory computer-readable medium described herein, the first millimeter wave frequency band includes frequencies between 24.25 GHz and 52.6 GHz, and the second millimeter wave frequency band includes frequencies that may be greater than 52.6 GHz.

In some examples of the method, apparatuses, and non-transitory computer-readable medium described herein, the first wireless device may be a UE or a CPE in a wireless communications system and the second wireless device may be a base station, a CPE, a relay device, a router, a repeater, or an IAB node in the wireless communications system.

A method of wireless communications at a second wireless device is described. The method may include transmitting, to a first wireless device, an inter-band carrier aggregation configuration for communications with the first wireless device, the inter-band carrier aggregation configuration including at least a first millimeter wave frequency band and a second millimeter wave frequency band, determining, a beam correlation parameter, based on the inter-band carrier aggregation configuration, and communicating, with the first wireless device, in an inter-band carrier aggregation mode using a first beam on the first millimeter wave frequency band and a second beam on the second millimeter frequency wave band, the first beam and the second beam based on the beam correlation parameter.

An apparatus for wireless communications at a second wireless device is described. The apparatus may include a processor, memory coupled with the processor, and instructions stored in the memory. The instructions may be executable by the processor to cause the apparatus to transmit, to a first wireless device, an inter-band carrier aggregation configuration for communications with the first wireless device, the inter-band carrier aggregation configuration including at least a first millimeter wave frequency band and a second millimeter wave frequency band, determine, a beam correlation parameter, based on the inter-band carrier aggregation configuration, and communicate, with the first wireless device, in an inter-band carrier aggregation mode using a first beam on the first millimeter wave frequency band and a second beam on the second millimeter frequency wave band, the first beam and the second beam based on the beam correlation parameter.

Another apparatus for wireless communications at a second wireless device is described. The apparatus may include means for transmitting, to a first wireless device, an inter-band carrier aggregation configuration for communications with the first wireless device, the inter-band carrier aggregation configuration including at least a first millimeter wave frequency band and a second millimeter wave frequency band, determining, a beam correlation parameter, based on the inter-band carrier aggregation configuration, and communicating, with the first wireless device, in an inter-band carrier aggregation mode using a first beam on the first millimeter wave frequency band and a second beam on the second millimeter frequency wave band, the first beam and the second beam based on the beam correlation parameter.

A non-transitory computer-readable medium storing code for wireless communications at a second wireless device is described. The code may include instructions executable by a processor to transmit, to a first wireless device, an inter-band carrier aggregation configuration for communications with the first wireless device, the inter-band carrier aggregation configuration including at least a first millimeter wave frequency band and a second millimeter wave frequency band, determine, a beam correlation parameter, based on the inter-band carrier aggregation configuration, and communicate, with the first wireless device, in an inter-band carrier aggregation mode using a first beam on the first millimeter wave frequency band and a second beam on the second millimeter frequency wave band, the first beam and the second beam based on the beam correlation parameter.

In some examples of the method, apparatuses, and non-transitory computer-readable medium described herein, transmitting the inter-band carrier aggregation configuration may include operations, features, means, or instructions for transmitting, to the first wireless device, a configuration message as a broadcast message to one or more wireless devices including at least the first wireless device, a wireless device specific message intended for the first wireless device, or both.

In some examples of the method, apparatuses, and non-transitory computer-readable medium described herein, transmitting the inter-band carrier aggregation configuration may include operations, features, means, or instructions for transmitting, to the first wireless device, a configuration message specific to bandwidth parts of the first and second millimeter wave frequency bands.

In some examples of the method, apparatuses, and non-transitory computer-readable medium described herein, transmitting the inter-band carrier aggregation configuration may include operations, features, means, or instructions for transmitting, to the first wireless device, a configuration message specific to a transmission configuration indication state used in the first and second millimeter wave frequency bands at the second wireless device.

In some examples of the method, apparatuses, and non-transitory computer-readable medium described herein, transmitting the inter-band carrier aggregation configuration may include operations, features, means, or instructions for transmitting, to the first wireless device, a configuration message as a weighted average metric for two or more transmission configuration indication states used in the first and second millimeter wave frequency bands at the second wireless device.

In some examples of the method, apparatuses, and non-transitory computer-readable medium described herein, the first millimeter wave frequency band may be a lower millimeter wave band and the second millimeter wave frequency band may be an upper millimeter wave band.

In some examples of the method, apparatuses, and non-transitory computer-readable medium described herein, the first wireless device may be a UE or a CPE in a wireless communications system and the second wireless device may be a base station, a CPE, a relay device, a router, a repeater, or an IAB node in the wireless communications system.

In some examples of the method, apparatuses, and non-transitory computer-readable medium described herein, the first millimeter wave frequency band includes frequencies between 24.25 GHz and 52.6 GHz, and the second millimeter wave frequency band includes frequencies that may be greater than 52.6 GHz.

DETAILED DESCRIPTION

Figure 1:
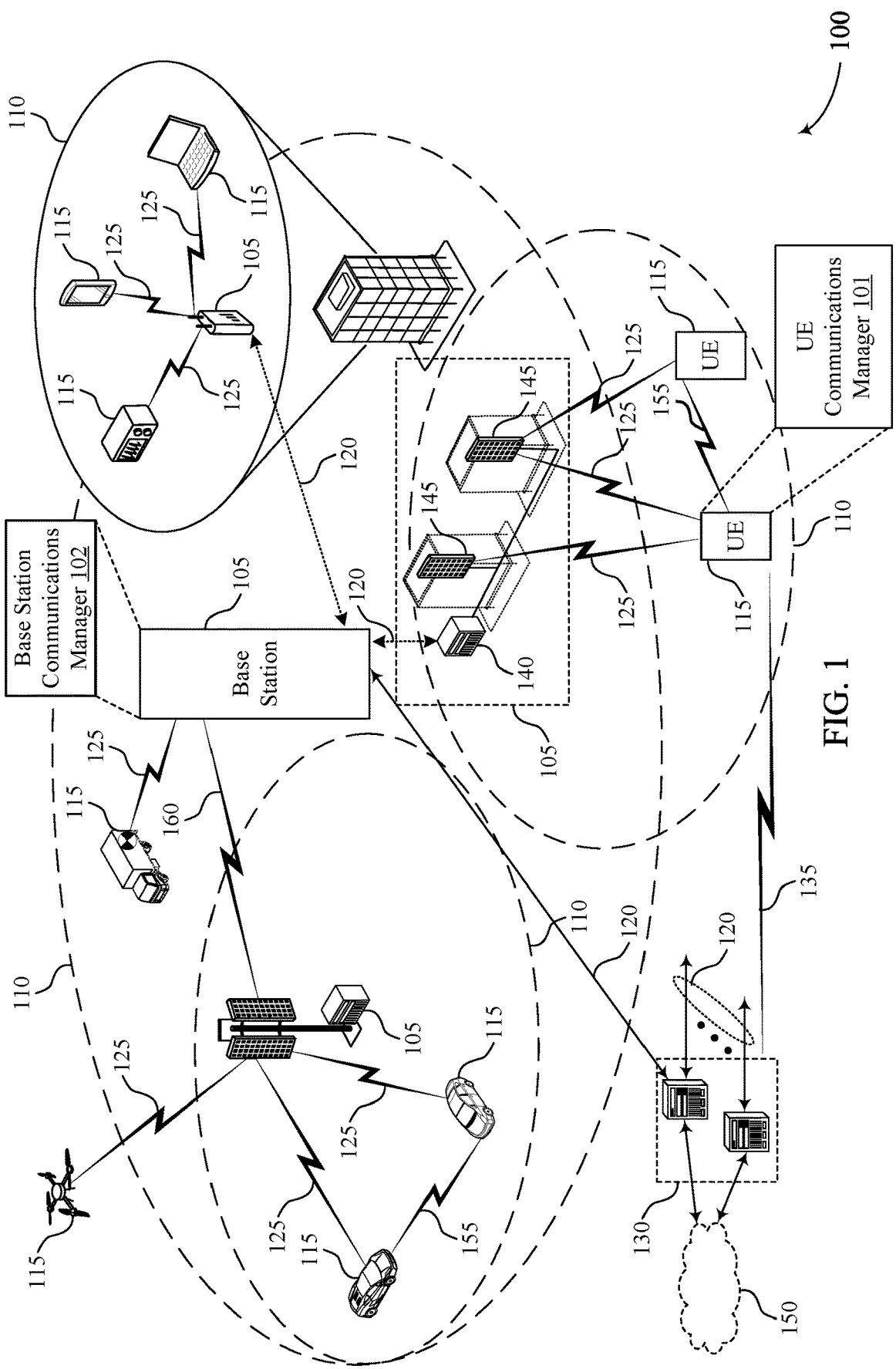
FIG. 1 illustrates an example of a system for wireless communications that supports signaling of beam correlation across millimeter wave frequency bands in accordance with aspects of the present disclosure.

In some deployments, wireless communications systems may operate in millimeter wave (mmW) frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration, and blockage losses in mmW communications systems, transmissions between wireless devices (e.g., from a base station and/or user equipment (UE)) may be beamformed. Moreover, a receiving device may use beamforming techniques to configure antenna(s) and/or antenna array(s) and/or antenna array module(s) such that transmissions are received in a directional manner.

Some wireless communications systems may employ carrier aggregation techniques where communications are conveyed between devices using multiple component carriers simultaneously or concurrently. In some examples, such techniques may be configured to increase a throughput of information between devices as compared with communications using a single component carrier. Carrier aggregation techniques may be applied across one or more frequency bands. In some examples, carrier aggregation techniques performed using component carriers in the same frequency band may be referred to as "intra-band" carrier aggregation. In some examples, carrier aggregation techniques performed using component carriers in different frequency bands (e.g., two or more frequency bands that are non-overlapping in the frequency domain) may be referred to as "inter-band" carrier aggregation.

In some cases, carrier aggregation may rely on or may be otherwise performed when signals using different bands are received in a same or similar direction (e.g., having directions of highest received power that are within a threshold angle of separation, using receive beams or directions that are well-correlated). For example, carrier aggregation may be associated with favorable spectral efficiency when directions of reception at a receiving device can use a same cluster in the channel, a same or similar set of beamforming weights steering peak energy towards the same or similar direction(s), a same or similar modulation and coding scheme (MCS), or other correlated configurations or characteristics at a receive device. When these or other criteria for supporting carrier aggregation are not satisfied (e.g., when beams or directions of different bands are not well-correlated), it may be preferable to perform carrier aggregation using a different set of transmit or receive beams, or refrain from performing communications according to carrier aggregation. Thus, procedures and metrics for evaluating beam correlation may be beneficial for supporting various aspects of carrier aggregation, including various examples of inter-band carrier aggregation of intra-band carrier aggregation.

In some deployments, communications in mmW frequencies may utilize what is referred to as frequency range 2 (FR2), corresponding to deployments in 24 GHz, 26 GHz, 28 GHz, 39 GHz, etc. As demand for wireless communications increases, additional mmW frequencies may be desirable for some deployments, such as frequency range 4 (FR4) (e.g., upper mmW bands) which may be associated with 52.6 GHz and beyond. In many FR2 deployments, wireless devices use antenna modules that include a number of antenna elements, such as an array of four antenna elements per module in a 4×1 array arrangement, among other example configurations. Upper mmW bands have shorter wavelengths, and thus more antenna elements can be placed in the same physical aperture in FR4 than at FR2. For example, an FR4 device may have multiple antenna modules that each contain four 4×4 subarrays. In some cases, it may be easier for a wireless device (e.g., a UE) to use or manage some possible combinations of antenna elements across subarrays within an antenna module or across antenna modules than others.

In some cases, a wireless device may perform inter-band carrier aggregation in FR4 and FR2. However, due to environmental degradation (oxygen absorption, water vapor reflections off metallic objects, fading, blockage, polarization dependent losses, etc.) the quality of the beam used in communications with other wireless devices may be different in FR2 and FR4. For example, the wireless device may detect a cluster at 28 GHz but not detect the cluster at 60 GHz in the same direction. As used herein, a cluster may refer to one or more signals within a particular physical direction or bandwidth. For example, a cluster may be detected as one or more beams, some of which may be subject to multi-path or other environmental degradation, in a particular bandwidth around 28 or 60 GHz.

Various aspects of the present disclosure provide that a first wireless device may configure a beam correlation parameter across mmW frequency bands in FR2 and FR4 of an inter-band carrier aggregation system to determine communication beams. A carrier aggregation configuration may identify two or more frequencies for communications that may be used to configure a wireless device. For example, a first wireless device may receive, from a second wireless device, a carrier aggregation configuration including two mmW frequency bands (e.g., in FR2 and FR4) for communications. The second wireless device may send the carrier aggregation configuration as a configuration message. The configuration message may be a broadcast message, specific to bandwidth parts of FR2 and FR4, specific to a transmission configuration indication (TCI) state used in FR2 and FR4, or a weighted average metric for two or more TCI states used in FR2 or FR4. The first wireless device may determine a beam correlation parameter based on the carrier aggregation configuration. For example, the beam correlation parameter may indicate a correlation between beams in a direction using inter-band carrier aggregation with the same direction beam in both mmW frequency bands. The first wireless device may determine beams, based on the beam correlation parameter, in FR2 and FR4 and communicate with the second wireless device using the beams. The wireless devices may communicate using the beams in FR2 and FR4 that were determined based on the beam correlation parameter. For example, the wireless devices may detect a cluster at 28 GHz (in FR2) and a cluster at 60 GHz (in FR4). Thus, the wireless devices may detect a cluster at 28 GHz and a cluster at 60 GHz in the same direction as the transmitted beams when communicating based on the beam correlation parameter.

The described techniques may support improvements in signaling of beam correlation across millimeter wave frequency bands, decreasing signaling overhead, and improving reliability. As such, supported techniques may include improved network operations and, in some examples, may promote network efficiencies.

Aspects of the disclosure are initially described in the context of wireless communications systems. Examples of antenna modules and groups of antenna elements are then discussed for some aspects. Aspects of the disclosure are further illustrated by and described with reference to apparatus diagrams, system diagrams, and flowcharts that relate to signaling of beam correlation across millimeter wave frequency bands.

FIG. 1 illustrates an example of a wireless communications system 100 that supports signaling of beam correlation across millimeter wave frequency bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, integrated access and backhaul (IAB) nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples. The carrier aggregation configuration may be associated with a first component carrier and a second component carrier.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 may include one or more antenna modules that may include a relatively large number of antenna elements for mmW communications, and may be an example of a first wireless device as discussed herein. A UE communications manager 101 may manage mmW communications, and in some cases may receive, from a second wireless device, a carrier aggregation configuration, the carrier aggregation configuration including a first mmW frequency band and a second mmW frequency band. The UE communications manager 101 may determine a beam correlation parameter based on a received carrier aggregation configuration from a second wireless device. The UE communications manager 101 may determine a first beam in the first mmW frequency band and a second beam in the second mmW frequency band and may communicate with a second wireless device, such as a base station 105, using the first and second beams.

One or more of the base stations 105 may be an example of a second wireless device as discussed herein, and may include a base station communications manager 102. The base station communications manager 102 may transmit a carrier aggregation configuration to UE 115 and may determine a beam correlation parameter based on the inter-band carrier aggregation parameter. The base station communications manager 102 may communicate with UE 115 in an inter-band carrier aggregation mode using a first beam on the first mmW frequency band and a second beam on the second mmW frequency band, in which the first beam and the second beam are based on the beam correlation parameter.

Figure 2:
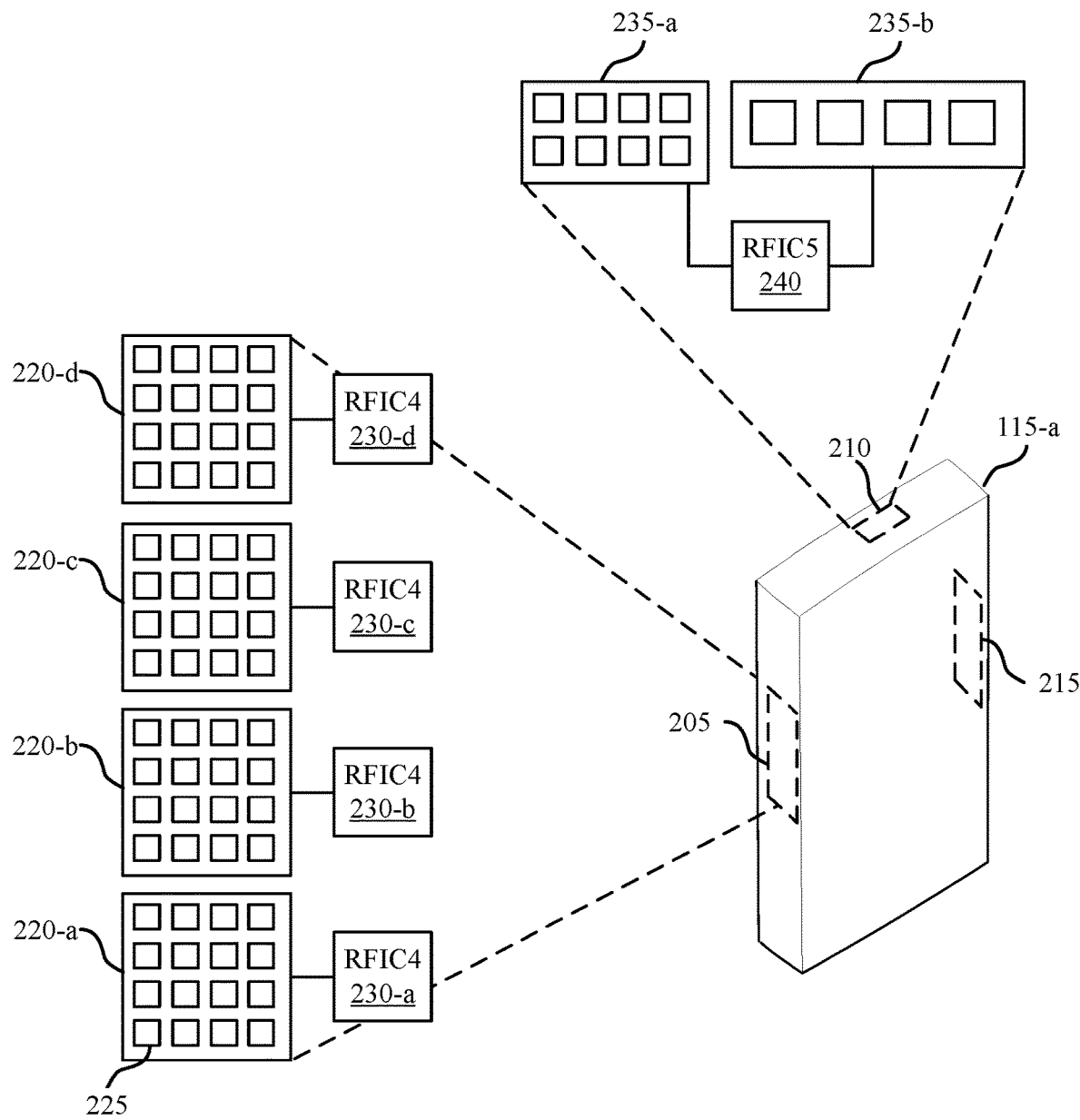
FIG. 2 illustrates an example of a wireless communication device with multiple antenna arrays that supports signaling of beam correlation across millimeter wave frequency bands in accordance with aspects of the present disclosure.

FIG. 2 illustrates an example of a wireless communication device with multiple antenna arrays 200 that signaling of beam correlation across millimeter wave frequency bands in accordance with aspects of the present disclosure. In some examples, wireless communication device with multiple antenna arrays 200 may implement aspects of wireless communications system 100. In this example, the wireless communication device may be a UE 115-a, although in other cases the wireless communication device may be a different device, such as a CPE, a relay device, a router, a repeater, or an IAB node.

In this example, the UE 115-a includes a number of different antenna modules, including a first antenna module 205, a second antenna module 210, and a third antenna module 215. Each of the antenna modules 205 through 215 may include a number of subarrays 220 of antenna elements. In this example, the first antenna module 205 may include four subarrays 220, including a first subarray 220-a, a second subarray 220-b, a third subarray 220-c, and a fourth subarray 220-d. Each subarray 220 in this example may include 16 individual antenna elements 225 arranged in a 4×4 array configuration. Each antenna element 225, in some cases, may be a patch antenna element configured to communicate in a high-band mmW deployment. In some cases, the spacing of antenna elements 225 within each subarray 220 may be configured to provide for efficient analog beamforming at wavelengths associated with high-band mmW communications (e.g., in FR4). Further, in this example, each subarray 220 may include an associated radio frequency integrated circuit (RFIC) 230.

In the example of FIG. 2, the second antenna module 210 also may include multiple subarrays 235, including a fifth subarray 235-a and a sixth subarray 235-b. In this example, the fifth subarray 235-a includes eight antenna elements arranged in a 4×2 array configuration, and the sixth subarray 235-b includes four antenna elements arranged in a 4×1 array configuration. In this case, a single RFIC (RFIC5) 240 may be coupled with the subarrays 235, although multiple RFICs may be used or an RFIC may be shared with one or more other of the antenna modules 205 or 215. While the antenna module 210 is illustrated as having multiple subarrays 235 that are different sizes, other examples may have a same number of subarrays 235 with each subarray having a same size (e.g., four 4×4 antenna subarrays similarly as illustrated in the first antenna module 205). Techniques as discussed herein may be applied to any numbers of antenna modules 205 through 215, any numbers of subarrays included in each antenna module, any numbers of antennas per subarray, or any combinations thereof.

As discussed herein, multiple RFICs 230 and associated antenna subarrays 220 may be used at different times by the wireless device. For example, in the case of FIG. 2 where the wireless device is UE 115-a, it may be desirable to operate using only a subset of the antenna modules 205-215, using only a subset of antenna subarrays 220 and associated RFICs 230, using only a subset of antenna elements 225 within one or more subarrays 220, or any combinations thereof. Such operations may allow the UE 115-a to manage power consumption in order to reduce power used by RF components, for example. In other cases, the UE 115-a may determine, in addition or alternatively to power consumption considerations, that one or more MPE limitations, one or more thermal limitations, or combinations thereof, make it desirable to use only certain groups of antenna elements 225 of one or more subarrays 220. Thus, even though a relatively large number of antenna elements 225 are available at the UE 115-a, not all elements may be used at any particular instant in time. For example, the UE 115-a may have a total of N antenna elements 225 across each of the different antenna modules 205-215, and may choose K antenna elements 225 for communications, which results in $^{N}C_{K}$ possibilities, which can result in a relatively large number of combinations of different antenna elements 225. Thus, in some cases, the UE 115-a may select a relatively small list of antenna groups that are useful at a given time (e.g., based on power consumption, MPE consideration, thermal considerations, etc.). The UE 115-a may provide an indication of the selected antenna groups to a second wireless device (e.g., a base station) along with an indication of one or more transmission parameters that are based on a number of antenna elements of one or more antenna groups. Communications then may be established using one of the indicated antenna groups based on the one or more transmission parameters and number of antenna elements in the antenna group. Various examples of indications transmission control parameters of one or more antenna groups and procedures based on such indications are discussed with reference to FIGS. 3 and 4.

Figure 3:
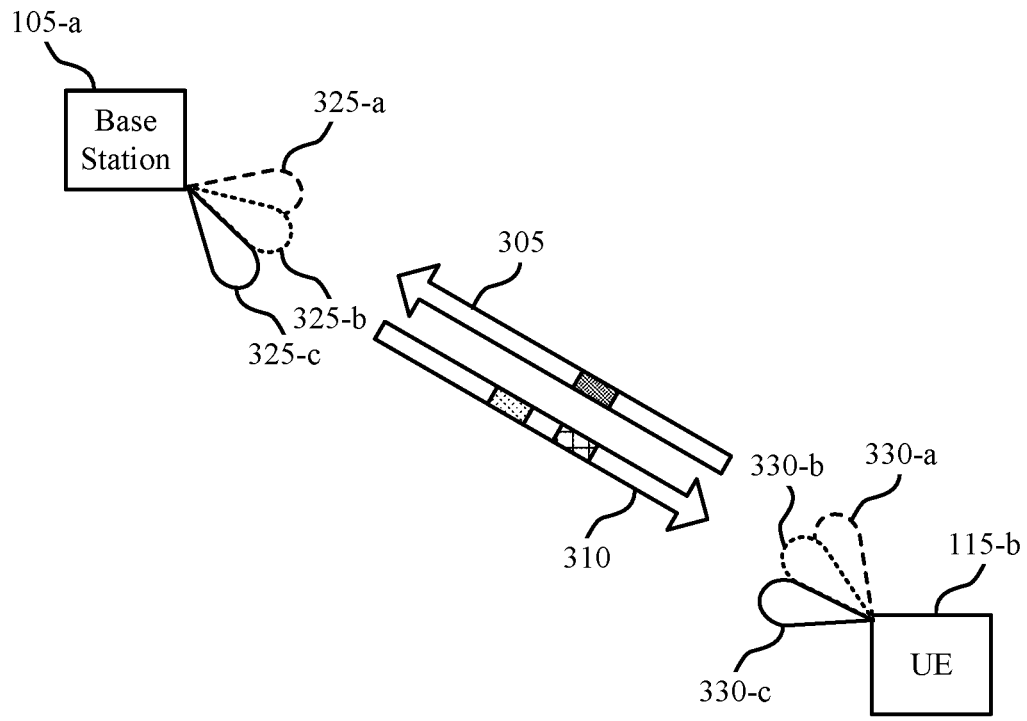
FIG. 3 illustrates an example of a wireless communications system that supports signaling of beam correlation across millimeter wave frequency bands in accordance with aspects of the present disclosure.

FIG. 3 illustrates an example of a wireless communications system 300 that supports signaling of beam correlation across millimeter wave frequency bands in accordance with aspects of the present disclosure. In some examples, wireless communications system 300 may implement aspects of wireless communications system 100. In some examples, the wireless communications system 300 may include a UE 115-b, and a base station 105-a which may be examples of UEs 115 and base stations 105 described with reference to FIGS. 1-2. Further, UE 115-b may be an example of a first wireless device, and the base station 105-a may be an example of a second wireless device. The UE 115-b and base station 105-a may communicate using beamformed communications in which the UE 115-b transmits uplink communications 305 to the base station 105-a, and the base station 105-a transmits downlink communications 310 to the UE 115-b.

In some cases, the UE 115-b may include a relatively large number of antenna elements, which may be spread across one or more antenna subarrays and one or more antenna modules, such as discussed with reference to FIG. 2. The UE 115-b may transmit antenna selection information 315 to the base station 105-a that indicates one or more different antenna groups that have been selected at the UE 115-b and are preferred for use in establishing transmission beams for mmW communications, and one or more transmission control parameters associated with the one or more antenna groups. The one or more transmission control parameters may be based at least in part on a number of antenna elements in the associated antenna group. In some cases, one or more transmission control parameters may be mapped to a number of antenna elements of an antenna group, one or more attributes of a transmission, or combinations thereof. For example, a MCS-dependent phase noise compensation may be mapped to a particular configured MCS and number of antenna elements used for a transmission. In cases where such a mapping may be implemented, the mapping may be preconfigured or provided to the UE 115-b when configuring a connection establishment or reestablishment.

In some cases, the base station 105-a may initiate one or more procedures based on the antenna selection information 315, such as a beam training procedure based on the indicated antenna groups, where different base station beams 325 and different UE beams 330 may be tested and measured to identify a preferred beam for communications. For example, the UE 115-b may measure reference signals of multiple base station beams 325 using multiple UE beams 330 and select a preferred beam, and provide feedback to the base station 105-a on the selected beam, such as through a chosen TCI state. In some cases, the UE 115-b may transmit a CSI measurement report to the base station 105-a based on measurements of the beam training procedure. Further, in some cases, the UE 115-b may transmit the one or more transmission control parameters associated with the selected beam and associated group of antenna elements once the preferred beam has been selected, which may then be used by the base station 105-a for allocating resources to the UE 115-b, scheduling communications for the UE 115-b, setting a digital beamforming codebook, setting one or more power control parameters, or any combinations thereof.

In some cases, the transmission control parameters may include, for example, an array size of one or more groups (which may also be referred to as sets) of antenna elements, an array geometry of the one or more sets of antenna elements, a beam pattern of the one or more sets of antenna elements, or any combinations thereof. With different sets of antenna elements, a digital beamforming codebook used for communications between the UE 115-b and base station 105-a may be configured specific to the particular group of antennas that is used for communications, and may be indicated in a digital beamforming configuration 320 provided by the base station 105-a. In some examples, the digital beamforming configuration 320 may be provided in downlink control information (DCI) with a resource grant that is provided to the UE 115-b for uplink or downlink communications. Further, for power control, a maximum transmittable power at the UE 115-b (e.g., $P_{cmax}$) may be dependent on the group of antenna elements used in communications due to Effective Isotropic Radiated Power (EIRP) limitations that may apply at the UE 115-b, and different array sizes may lead to different array gains and thus impact $P_{cmax}$. Additionally, modulation and coding scheme (MCS) dependent phase noise compensation may be dependent upon antenna array size. The transmission control parameters may provide information related to the $P_{cmax}$, array information, or combinations thereof, that may be used to determine a MCS for communications, a digital beamforming codebook, MCS-dependent phase noise compensation, or any combinations thereof, based on a number of antenna elements of the group of antenna elements that are to be used for communications. Additionally, the base station 105-a may use the indication of antenna groups to help with scheduling based on data rates and antenna gains of the one or more groups of antenna elements that are used for communications.

In some cases, wireless devices may perform inter-band carrier aggregation across frequency bands in FR4 and FR2. Base station 105-a may configure beam correlation information (e.g., carrier aggregation configuration parameter 335) across TCI states in different mmW frequency bands to allow the UE 115-a to determine the correlation (e.g., beam correlation parameter) in a direction using inter-band carrier aggregation with the same direction beam in both mmW frequency bands. For example, UE 115-b may send a beam training signal (e.g., sounding reference signal (SRS)) on a lower carrier frequency (e.g., 28 GHz). Base station 105-a may process the beam training signal at 28 GHz on a first radio frequency (RF) chain and at 60 GHz on a second RF chain. The base station 105-a may determine a carrier aggregation configuration parameter 335 based on the direction with the strongest signal for both the first and second RF chains. Base station 105-a may transmit, to UE 115-b, the carrier aggregation configuration parameter 335 to determine a beam for communications at lower carrier frequency and the higher carrier frequency (e.g., 60 GHz) based on the beam training procedure.

Base station 105-a may send the carrier aggregation configuration as a configuration message. In a first example, the configuration message may be a broadcast message to one or more wireless devices including at least UE 115-b. In some cases, the configuration may be a wireless device specific message intended for UE 115-b. In a second example, the configuration message may be specific to bandwidth parts of the lower mmW frequency band and the upper mmW frequency band. In a third example, the configuration message may be specific to a TCI state used in the upper and lower mmW frequency bands at base station 105-a. In a fourth example, the configuration message may include a weighted average metric for a group of TCI states used in the upper and lower mmW frequency bands at the base station 105-a. UE 115-b may determine the weights for use with the weighted average metric and the TCI of the beam used in determining the weighted average. In some cases, the configuration message may be a combination of the first through fourth examples.

In some examples, UE 115-b may perform inter-band carrier aggregation across the two bands. UE 115-b may determine a beam correlation parameter based on the carrier aggregation configuration parameter 335. In some cases, UE 115-b may determine, based on the beam correlation parameter, a first beam on the lower mmW frequency band and a second beam on the upper mmW frequency band to use in communications (e.g., simultaneous communications across the two bands) with base station 105-a.

Figure 4:
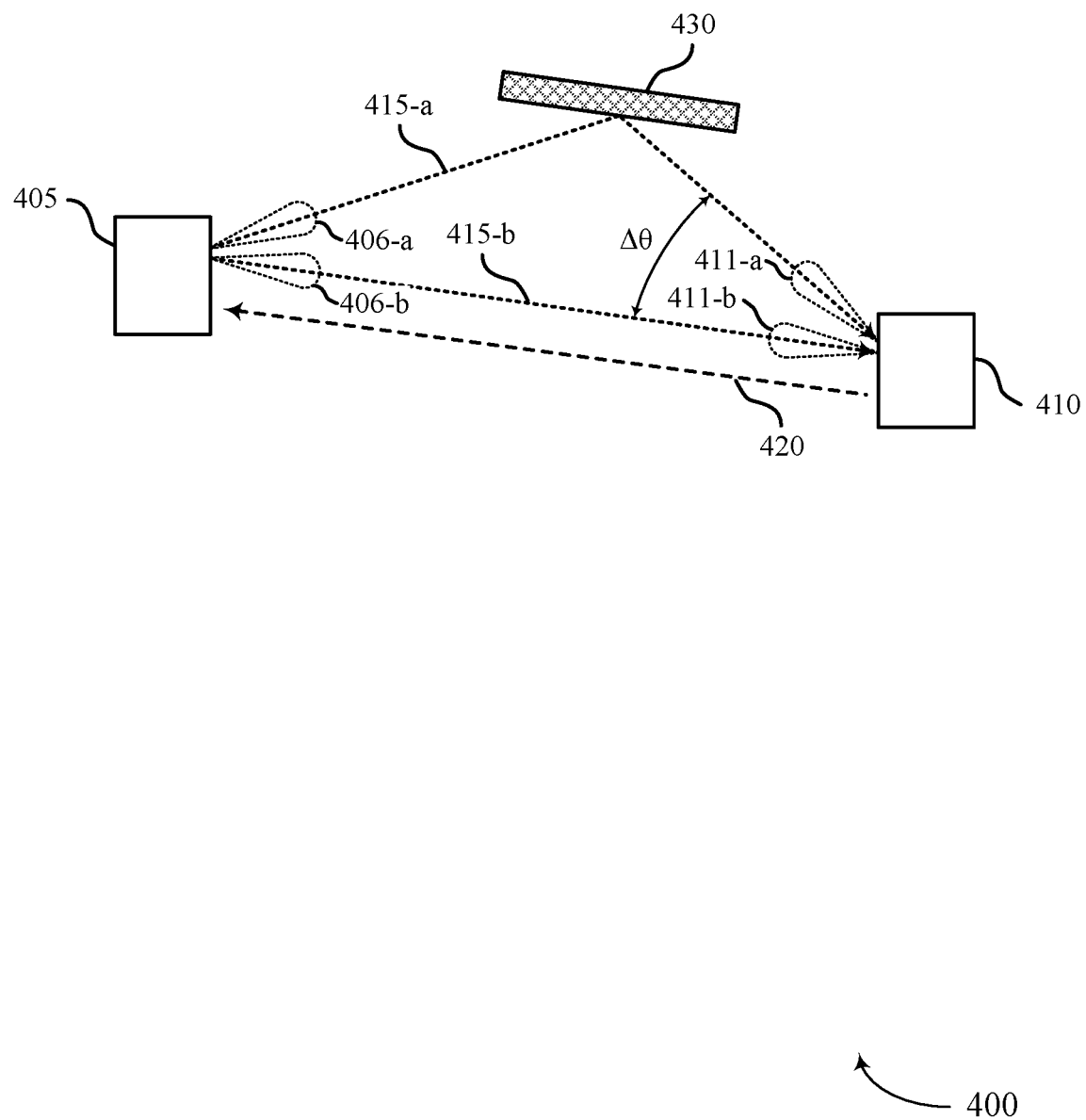
FIG. 4 illustrates an example of a wireless communications system that supports signaling of beam correlation across millimeter wave frequency bands in accordance with aspects of the present disclosure.

FIG. 4 illustrates an example of a wireless communications system 400 that supports signaling of beam correlation across millimeter wave frequency bands in accordance with aspects of the present disclosure. In some examples, wireless communications system 400 may implement aspects of wireless communications system 100 or 300. Wireless communications system 400 may be implemented by first wireless device 405 and a second wireless device 410 as described herein. Alternative examples of the following may be implemented, where some steps are performed in a different order than described or are not performed at all. In some cases, steps may include additional features not mentioned below, or further steps may be added.

The wireless communications system 400 may include a first device 405 (e.g., a transmitting device, a reference signal transmitter) and a second device 410 (e.g., a receiving device, a reference signal transmitter), where the first device 405 and the second device 410 may refer to various types of devices according to different types of configuration. For example, when the described reference signals are associated with downlink transmission, the first device 405 may be a base station 105 and the second device 410 may be a UE 115. When reference signals are associated with uplink transmission, the first device 405 may be a UE 115 and the second device may be a base station 105. When reference signals are associated with sidelink or D4D or M4M transmission, the first device 405 may be a first UE 115 and the second device may be a second UE. When reference signals are associated with IAB transmission, the first device 405 may be a first base station 105 and the second device may be a second base station 105. In other examples, the first device 405 and the second device 410 may refer to these or other types of devices that may perform techniques for beam correlation evaluation in accordance with the examples disclosed herein. In some examples, the first device 405, the second device 410, or both, may be referred to as a millimeter wave device The wireless communications system 400 may be configured for communications according to various frequency bands, which may include licensed bands or unlicensed or shared bands. In one example, a frequency band may refer to a frequency range (FR), which may include a set of frequency channels (e.g., a set of ARFCNs), and such frequency ranges may be non-overlapping in the frequency domain. For example, the wireless communications system 400 may support communications using a frequency range FR1, corresponding to a frequency band between 410 MHz and 7.145 GHz, a frequency range FR4, corresponding to a frequency band between 44.450 GHz and 54.600 GHz, a frequency range FR4, corresponding to a frequency band between 54.6 GHz and 71 GHz or 114.45 GHz, or various combinations of FR1, FR4, FR4, or other frequency ranges.

The first device 405 and the second device 410 may each be configured with a multi-antenna array that supports directional transmission, directional reception, or both. In some examples, the first device 405 or the second device 410 may be configured with a first multi-antenna array associated with one frequency band, and a second multi-antenna array for another frequency band. Such a configuration may be one example of a device having different RF chains for different frequency bands, but different RF chains may additionally or alternatively refer to different power amplifiers (PAs), different low noise amplifiers (LNAs), or other components related to RF signal processing. In some examples, components of an RF chain may be used for communications and for other purposes. For example, some automotive applications may include radar systems that support location or proximity detections, and such a radar system may additionally be used for performing communications in a radar band (e.g., an 80 GHz band), where such communications may include an inter-band carrier configuration including the radar band and another frequency band. Although some examples of a first device 405 or a second device 410 may include multiple RF chains, which respectively may be associated with (e.g., tailored to, calibrated or configured for, corresponding to) different frequency bands, other examples of a first device 405 or a second device 410 may include an RF chain that supports communications over multiple frequency bands.

The first device 405 and the second device 410 may be configured to support inter-band carrier aggregation, which may refer to simultaneous communications over two or more frequency bands. In one example of inter-band carrier aggregation, simultaneous communications may be supported over a first carrier or channel associated with a first band (e.g., a lower carrier frequency), referred to herein as $Band_1$, and a second carrier or channel associated with a second band (e.g., an upper carrier frequency), referred to herein as $Band_4$. For example, the signals 420 may represent transmissions using carrier aggregation, which may be inter-band carrier aggregation. Additionally, any of the signals shown in FIG. 4 may be transmitted using carrier aggregation.

In some examples, carriers or channels of $Band_1$ and $Band_4$ may refer to different frequency ranges (e.g., different ones of FR1, FR4, or FR4). In one illustrative example, communications over $Band_1$ may be associated with a carrier or channel of FR1 (e.g., a 4.9 GHz band) and communications over $Band_4$ may be associated with a carrier or channel of FR4 (e.g., a 48 GHz band). In another example, communications over $Band_1$ may be associated with a carrier or channel of FR4 (e.g., a 48 GHz band) and communications over $Band_4$ may be associated with a carrier or channel of FR4 (e.g., a 39 GHz band, a 60 GHz band).

In some examples, carriers or channels of $Band_1$ and $Band_4$ may refer to the same frequency range (e.g., a same one of FR1, FR4, or FR4). In one illustrative example, communications over $Band_1$ may be associated with a first carrier or channel of FR4 (e.g., a 48 GHz band) and communications over $Band_4$ may be associated with a second carrier or channel of FR4 (e.g., a 39 GHz band). In another example, communications over $Band_1$ may be associated with a first carrier or channel of FR4 (e.g., a 60 GHz band) and communications over $Band_4$ may be associated with a second carrier or channel of FR4 (e.g., a 66 GHz band). Although examples are provided for inter-band carrier aggregation over two bands, the described techniques may be applied to any quantity of frequency bands used in a carrier aggregation configuration, whether in a same frequency range or in two or more different frequency ranges.

In some examples of inter-band carrier aggregation, multiple RF chains may be used to steer energy towards the same direction or cluster across bands. For example, inter-band carrier aggregation including a 48 GHz band and a 39 GHz band may include using a different RF chain for each band, where such a coexistence may include various power or thermal considerations. In some examples, an inter-band carrier aggregation may be improved from having well-correlated beams (e.g., directionally similar receive directions for the different bands, from the perspective of the second device 410), and the first device 405 and the second device 410 may support a quantification or other evaluation of correlation between beams used in the two frequency bands.

In one example, inter-band carrier aggregation may include a first carrier or channel of a 48 GHz band and a second carrier or channel of a 39 GHz band, and a relatively narrower beam at 39 GHz may be aligned along a different direction (e.g., at the second device 410) than a relatively wider beam at 48 GHz. In some examples, such beam alignment may be related to antenna or RF clusters of the second device 410 that are intended to be excited by the beams at the two frequencies being aligned in different directions (e.g., due to different antennas or antenna arrays being aligned along different directions from the second device 410). Moreover, a power angular delay profile (PADP) may be different between the 48 GHz band and the 39 GHz band depending on material properties, environmental degradation (e.g., due to oxygen or water vapor along a signal propagation path), fading, blockage, polarization-dependent losses, and others, which may be specific to certain bands or subbands. Thus, for these and other reasons, transmissions of different frequency bands may be associated with directions of peak received power (e.g., at the second device 410) being aligned in different directions.

To support various configurations of inter-band carrier aggregation, the wireless communications system 400 may be configured to transmit different reference signals on different frequency bands to support an evaluation of beam correlation or other reception correlation from the perspective of the second device 410. For example, the first device 405 may be configured to transmit a first reference signal 415-a over a carrier or channel of a first band (e.g., $Band_1$) and transmit a second reference signal 415-b over a carrier or channel of a second band (e.g., $Band_4$).

The first reference signal 415-a and the second reference signal 415-b may be transmitted concurrently, simultaneously, or according to some other degree of overlapping time intervals. For example, communications using the first band and the second band may be synchronized (e.g., in time, such as an inter-band synchronization, an inter-cell synchronization, or other synchronization), such that resource blocks or other allocation intervals of the first band and of the second band are aligned in the time domain (e.g., having a same beginning time, having a same ending time, spanning a same duration in time, from the perspective of the first device 405 or the second device 410). In some examples, the first reference signal 415-a and the second reference signal 415-b may be transmitted by the first device 405 in a same TTI, or portion thereof (e.g., transmitting the first reference signal 415-a and the second reference signal 415-b in the same symbol duration or symbol period). In some examples, the first reference signal 415-a and the second reference signal 415-b may be transmitted over otherwise simultaneous durations or during respective durations that are otherwise overlapping in time.

The first reference signal 415-a may be transmitted by the first device 405-a using a first transmit beam 406-a, or otherwise directionally transmitted using a first transmit codebook (e.g., an analog or digital codebook associated with a first direction of transmission) and the second reference signal 415-b may be transmitted by the first device 405 using a second transmit beam 406-b, or otherwise directionally transmitted using a second transmit codebook (e.g., another analog or digital codebook associated with a second direction of transmission). Although it may be beneficial to inter-band carrier aggregation for the second device 410 to receive the first reference signal 415-*a* and the second reference signal 415-*b* along a same direction or similar directions (e.g., receive directions), the first reference signal 415-*a* and the second reference signal 415-*b* may be transmitted in the same direction or in different directions. For example, the first transmit beam 406-*a* and the second transmit beam 406-*b* may be a same transmit beam, or otherwise aligned in a same direction, or the first transmit beam 406-*a* and the second transmit beam 406-*b* may be different transmit beams, or otherwise aligned in different directions.

In various examples, the respective directions for transmitting the first reference signal 415-*a* and the second reference signal 415-*b* may be based at least in part on alignments of different antenna arrays associated with the different bands, directional transmission resolution or granularity associated with transmitting over the different bands, or other hardware of processing configurations or capabilities associated with the different bands. In some examples, the first device 405 may be aware of a signal propagation difference between the first band and the second band (e.g., based at least in part on a beam or codebook training operation between the first device 405 and the second device 410), such as a reflection surface 430 or other signal propagation distortion or attenuation that is relevant to the transmission of the first reference signal 415-*a* but not the transmission of the second reference signal 415-*b*. Thus, in some examples, the first device 405 may separately determine or adjust transmission directions of one or both of the first reference signal 415-*a* or the second reference signal 415-*b* accordingly (e.g., to support receive directions at the second device 410 being relatively well-aligned or otherwise correlated).

The type of reference signal employed by the wireless communications system 400 to support the described techniques may be based at least in part on the device type of the first device 405 or the second device 410, or a type of communications between the first device 405 and the second device 410, or a combination thereof. For example, when the first device 405 is a base station 105, or the reference signals 415-*a* and 415-*b* are transmitted in a downlink or backhaul configuration or direction, the reference signals 415-*a* and 415-*b* may be CSI-RS transmissions over the first band and the second band by the first device 405. In another example, when the first device 405 is a UE 115, or the reference signals 415-*a* and 415-*b* are transmitted in an uplink or sidelink configuration or direction, the reference signals 415-*a* and 415-*b* may be SRS transmissions over the first band and the second band by the first device 405.

The hardware configuration used by the first device 405 to transmit the reference signals 415-*a* and 415-*b* may be based at least in part on the device type of the first device 405, or a hardware capability of the first device 405, or both. For example, the first device 405 may be a UE 115 having a single RF chain, and the first reference signal 415-*a* and the second reference signal 415-*b* may be transmitted on the first band and the second band, respectively, using the same single RF chain. In some examples, such a transmission may include applying a same M-sequence, a same gold sequence, or a same pseudo-random sequence for each of the first reference signal 415-*a* and the second reference signal 415-*b*, where such sequences may be selected or applied to support a degree of orthogonality between transmissions. In another example, the first device 405 may be a UE 115 having multiple RF chains, and the first reference signal 415-*a* and the second reference signal 415-*b* may be transmitted on the first band and the second band, respectively, using the same RF chain or different RF chains. In other examples, the first device 405 may be a base station 105 having multiple RF chains, and the first reference signal 415-*a* and the second reference signal 415-*b* may be transmitted on the first band and the second band, respectively, using the same RF chain or different RF chains. In examples where different RF chains are used by the first device 405 for the first reference signal 415-*a* and the second reference signal 415-*b*, such transmissions may include applying same or different M-sequences, same or different gold sequences, or same or different pseudo-random sequence for each of the first reference signal 415-*a* and the second reference signal 415-*b*.

The first reference signal 415-*a* may be received by the second device 410 using a first receive beam 411-*a*, or otherwise directionally received using a first receive codebook (e.g., an analog or digital codebook associated with a first direction of reception) and the second reference signal 415-*b* may be received by the second device 410 using a second receive beam 411-*b*, or otherwise directionally received using a second receive codebook (e.g., another analog or digital codebook associated with a second direction of reception). The reception of the first reference signal 415-*a* and the second reference signal 415-*b* may be evaluated at the second device 410, which may include an evaluation of how well-correlated the beams or directions of highest received power are between the first reference signal 415-*a* and the second reference signal 415-*b*. For example, the second device 410 may receive the first reference signal 415-*a* and, as part of the reception, the second device 410 may determine (e.g., explicitly or implicitly), a direction (e.g., of the receive beam 411-*a*) or codebook associated with a highest receive power of the first reference signal 415-*a*. Likewise, the second device 410 may receive the second reference signal 415-*b* and, as part of the reception, the second device 410 may determine (e.g., explicitly or implicitly), a direction (e.g., of the receive beam 411-*b*) or codebook associated with a highest receive power of the second reference signal 415-*b*.

The first reference signal 415-*a* and the second reference signal 415-*b* may be received concurrently, simultaneously, or according to other degrees of overlapping time intervals. For example, when the first reference signal 415-*a* and the second reference signal 415-*b* are transmitted simultaneously, the first reference signal 415-*a* and the second reference signal 415-*b* may be received simultaneously (e.g., when a signal propagation delay between the first device 405 and the second device 410 is the same for the first band and the second band). In other examples, when the first reference signal 415-*a* and the second reference signal 415-*b* are transmitted simultaneously, the first reference signal 415-*a* and the second reference signal 415-*b* may not be received simultaneously (e.g., when a signal propagation delay between the first device 405 and the second device 410 is different between the first band and the second band). However, in various examples (e.g., whether or not the first reference signal 415-*a* and the second reference signal 415-*b* are transmitted simultaneously), at least a portion of the first reference signal 415-*a* and the second reference signal 415-*b* may be received concurrently, or during overlapping time intervals. In some cases, a relative delay between receiving the first reference signal 415-*a* and the second reference signal 415-*b* may be determined and considered (e.g., applied at the second device 410 to signal processing of or evaluation between the first reference signal 415-*a* and the second reference signal 415-*b*). In other examples, a relative signal propagation delay between the first band and the second band may be determined and considered (e.g., at the first device 405), which may include transmitting the first reference signal 415-*a* and the second reference signal 415-*b* over different durations in an effort to synchronize their reception (e.g., at the second device 410).

A type of procedure used by the second device 410 to evaluate the direction of reception of the first reference signal 415-*a* or the second reference signal 415-*b* may be based at least in part on the device type of the first device 405 or the second device 410, or a type of communications between the first device 405 and the second device 410, or a combination thereof. For example, when the second device 410 is a UE 115, or when the reference signals 415-*a* and 415-*b* are transmitted in a downlink direction, the second device 410 may receive signaling (e.g., CSI-RS signaling or other reference signaling) as part of a P-1, P-2, or P-3 signaling or operational sequence that supports transmit and receive beam refinement between the first device 405 and the second device 410.

In P-1 signaling, the first device 405 (e.g., a base station 105) may transmit using a set of relatively wide transmission beams and the second device 410 (e.g., a UE 115) may receive using one or more relatively wide reception beams, which may support establishing a communications link between the first device 405 and the second device 410. In some examples, P-1 signaling may be used to enable UE measurement on different transmission beams to support selection of base station or TRP transmission beams or UE reception beams. For beamforming at a base station 105 or a TRP, P-1 operations may include intra-TRP or inter-TRP transmission beam sweep from a set of different beams (e.g., transmit beams). For beamforming at a UE 115, P-1 operations may include a UE receive beam sweep from a set of different beams (e.g., receive beams).

In P-2 signaling, the first device 405 may transmit using a set of relatively narrow transmission beams and the second device 410 may measure respective signal strengths of each of the set of transmission beams and signal or otherwise indicate a preferred one of the set of transmission beams. In some examples, P-2 signaling may be used to enable UE measurement on different transmission beams to possibly change transmission beams (e.g., inter-TRP or intra-TRP transmission beams). In some cases, such a selection may be made from a smaller set of beams for beam refinement than in P-1. In some examples, P-2 operations may be considered as a special case of P-1 operations.

In P-3 signaling the first device 405 may transmit using a relatively narrow transmission beam (e.g., as selected or indicated by the second device 410) and the second device 410 may measure respective signal strengths of each of a set of relatively narrow reception beams, which may or may not be signaled or indicated back to the first device 405. In some examples, P-3 signaling may be used to enable UE measurement on the same transmission beam to change a receive beam at a UE 115 in cases where a UE 115 uses beamforming.

In some examples, transmission of the first reference signal 415-*a* and the second reference signal 415-*b* may implement aspects of P-1 or P-2 signaling, where the operations of P-1 signaling or P-2 signaling are performed simultaneously (e.g., in a same symbol period) and in different bands (e.g., in BWPs of two or more different bands, in different RBs in the frequency domain). As part of performing P-1 or P-2 operations, the second device 410 (e.g., a UE 115) may determine a reception directionality associated with each of the first reference signal 415-*a* (e.g., a direction of the first receive beam 411-*a*) and the second reference signal 415-*b* (e.g., a direction of the second receive beam 411-*b*). In some examples according to the described techniques, the second device 410 (e.g., a UE 115) may be expected to have multiple RF chains with which it can process the first reference signal 415-*a* and the second reference signal 415-*b* (e.g., to separately determine respective reception directions), and estimate or otherwise evaluate a beam correlation metric. If the second device 410 (e.g., a UE 115) has only a single RF chain, a different procedure may be employed (e.g., according to U-1 or U-4 signaling or operations). In some cases, the beam correlation metric may be based on receiving the first reference signal over the first beam and receiving the second reference signal over the second beam.

In another example, when the second device 410 is a base station 105, or when the reference signals 415-*a* and 415-*b* are transmitted in an uplink direction, the second device 410 may receive signaling (e.g., SRS signaling or other reference signaling) as part of a U-1, U-4, or U-3 signaling or operational sequence which supports transmit and receive beam refinement between the first device 405 and the second device 410. In some examples, U-1, U-4, and U-3 signaling or operations may be similar to P-1, P-2, and P-3 signaling or operations, respectively, but with a reversed perspective (e.g., in an uplink direction rather than a downlink direction).

In some examples, transmission of the first reference signal 415-*a* and the second reference signal 415-*b* may implement aspects of U-1 or U-4 signaling, where the operations of U-1 signaling or U-4 signaling are performed simultaneously (e.g., in a same symbol period) and in different bands (e.g., in BWPs of two or more different bands, in different RBs in the frequency domain). As part of performing U-1 or U-4 operations, the second device 410 (e.g., a base station 105) may determine a reception directionality associated with each of the first reference signal 415-*a* (e.g., a direction of the first receive beam 411-*a*) and the second reference signal 415-*b* (e.g., a direction of the second receive beam 411-*b*). In some examples according to the described techniques, the second device 410 (e.g., a base station 105) may be expected to have multiple RF chains with which it can process the first reference signal 415-*a* and the second reference signal 415-*b* (e.g., to separately determine respective reception directions), and estimate or otherwise evaluate a beam correlation metric. In some examples, the first device 405 (e.g., a UE 115) may only have a single RF chain, but the example approach of using U-1 or U-4 signaling or operations may still be applicable at the second device 410 (e.g., a base station 105) having multiple RF chains.

In some examples, a type of procedure used by the second device 410 to evaluate the direction of reception of the first reference signal 415-*a* or the second reference signal 415-*b* may be based at least in part on a hardware capability or configuration of the second device 410. In various examples, the type of procedure used by the second device 410 to determine directionality of receiving over the first band and the second band (e.g., for the first reference signal 415-*a* and the second reference signal 415-*b*) may be the same, or the type of procedure used by the second device 410 to determine directionality of receiving over the first band and the second band (e.g., for the first reference signal 415-*a* and the second reference signal 415-*b*) may be different, which may be related to the hardware capability or configuration supported in the respective frequency bands.

In one example, the second device 410 may be configured to support digital beamforming for a respective band, which may support aspects of performing a directional (e.g., continuous) reception sweep. For example, for one or both of the first band or the second band, the second device may sweep through different beam weights to determine a spectrogram of receive power (e.g., associated with the receiving the first reference signal 415-a or receiving the second reference signal 415-b) versus reception direction. The second device 410 may accordingly determine a direction (e.g., an angle) of peak received power of a respective reference signal 415 based at least in part on a respective spectrogram corresponding. Thus, in some examples, the second device 410 may support a digital beamforming capability that allows search of peak energy received over different directions. Such techniques may be applied in an FR1+FR4 carrier aggregation, or an FR1+FR4 carrier aggregation, where digital beamforming is possible in one or both of $Band_1$ or $Band_4$, and may support a direct comparison between determined angles of peak receive power.

In another example, the second device 410 may additionally or alternatively be configured to support analog or hybrid beamforming for a respective band, which may support aspects of performing a reception codebook sweep. For example, for one or both of the first band or the second band, the second device 410 may sweep through different analog reception codebooks to determine a receive power (e.g., associated with the receiving the first reference signal 415-a or receiving the second reference signal) associated with each of the different analog reception codebooks. A codebook having a highest received power for a respective reference signal may thus be determined to correspond to a directionality of receiving the respective reference signal. In some examples, the second device 410 may sweep through different codebooks of beams to identify a preferred codebook entry using RSRP, SINR, or a combination thereof, as a metric for determining a preferred codebook. Thus, in some examples, the second device 410 may support an analog or hybrid beamforming capability that used beam scanning over analog or hybrid beamforming codebooks.

Although described in the context of analog receive beamforming, the second device 410 may perform a similar determination by sweeping through digital reception codebooks. In some examples, each codebook may be implicitly or explicitly associated with a respective reception direction, which may be used in an evaluation of correlation between receive codebooks associated with peak receive power of the first reference signal 415-a and the second reference signal 415-b. For example, $f_{low}$ and $f_{high}$ may be used to denote the preferred learned beams or codebooks for the two frequency bands at the second device 410. Such techniques may be applied in an FR4+FR4 carrier aggregation (e.g., using a 48 GHz band and a 39 GHz band), or an FR1+FR4 carrier aggregation (e.g., using a 48 GHz band and a 60 GHz band, using a 39 GHz band and a 39 GHz band).

In some examples, digital beamforming may be associated with relatively higher cost, complexity, power consumption or thermal considerations (e.g., related to a relatively higher quantity of RF chains), particularly at relatively higher frequencies. Thus, in some examples of the second device 410, digital beamforming may be supported at relatively lower frequencies (e.g., a relatively lower frequency band, $Band_1$) and analog beamforming may be supported at relatively higher frequencies (e.g., a relatively higher frequency band, $Band_4$). In such examples, a respective metric of directionality may be normalized between a digital beamforming technique and an analog beamforming technique to support an evaluation of reception correlation between the first band and the second band. Thus, in some examples, the second device 410 may support a beam correlation evaluation that is based at least in part on a comparison between a digital beamforming capability at the second device 410 that is used to determine the direction of peak received power of the first reference signal 415-a (e.g., using a relatively lower frequency band, $Band_1$) and an analog beamforming capability at the second device 410 that is used to determine the direction of peak received power of the second reference signal 415-b (e.g., using a relatively higher frequency band, $Band_4$).

An evaluation of beam correlation may be determined (e.g., explicitly or implicitly) based on an angle of separation (e.g., $\Delta\theta$) between a direction of peak reception power of the first reference signal 415-a and a direction of peak reception power of the second reference signal 415-b. In some examples, a beam correlation metric may be calculated as a cosine of the angle difference (e.g., from the perspective of the second device 410). For example, an azimuth direction of receiving the first reference signal 415-a at the second device 410 may be determined as $\theta_{Band1}$ (e.g., as an angle of peak received power from a receive power spectrogram, as an angle corresponding to a codebook associated with highest receive power) and an azimuth direction of receiving the second reference signal 415-b at the second device 410 may be determined as $\theta_{Band4}$, and a beam correlation metric may be determined as $\cos(\theta_{Band1}-\theta_{Band4})$.

In some examples, an elevation angle (e.g., from the perspective of the second device 410) may be considered, where an elevation direction of receiving the first reference signal 415-a may be determined as ($\varphi_{Band1}$ and an elevation direction of receiving the second reference signal 415-b may be determined as $\varphi_{Band}$. In some examples, considering both azimuth and elevation angles (e.g., where ($\theta_{Band1}$, ($\varphi_{Band1}$) and ($\theta_{Band4}$, $\varphi_{Band4}$) denote the azimuth and elevation angle pair towards which these beams steer peak energy), a beam correlation metric may be determined as $\cos(\varphi_{Band1}-\varphi_{Band4})$ $*\cos(\theta_{Band1}-\theta_{Band4})$. In other words, a relatively greater beam correlation may be determined if ($\theta_{Band1}$, $\varphi_{Band1}$) and ($\theta_{Band4}$, $\varphi_{Band4}$) are relatively close together, and a relatively lower beam correlation may be determined if ($\theta_{Band1}$, ($\varphi_{Band1}$) and ($\theta_{Band4}$, $\varphi_{Band4}$) are relatively far apart.

The first device 405 and the second device 410 may be configured for various aspects of inter-band carrier aggregation based on the evaluation of beam correlation at the second device 410. For example, when a determined beam correlation metric satisfies a threshold (e.g., is at or above a threshold correlation, indicates a sufficient degree of correlation), spectral efficiency of applying inter-band carrier aggregation in the first frequency band and the second frequency band may be favorable, and the first device 405 and the second device may proceed with inter-band carrier aggregation using the first frequency band and the second frequency band. In some examples, a determination to proceed (e.g., a comparison with a threshold) may be performed by the second device 410 and signaled to the first device 405 (e.g., signaling a support of the second device 410 for configuring or performing inter-band carrier aggregation using the first frequency band and the second frequency band). In some examples, a determination to proceed (e.g., a comparison with a threshold) may be performed at the first device 405 based on a beam correlation metric communicated from the second device 410, and signaled to the second device 410 (e.g., as an explicit indication by the first device 405 of inter-band carrier aggregation, as an implicit indication related to simultaneous scheduling by the first device 405 in the first frequency band and the second frequency band).

When a determined beam correlation metric does not satisfy a threshold (e.g., is at or below a threshold correlation, indicates an insufficient degree of correlation), the first device 405 and the second device 410 may refrain from performing inter-band carrier aggregation using the first frequency band and the second frequency band. For example, when a beam correlation metric does not satisfy a threshold, communications using different frequency bands may involve unbalanced power, unbalanced modulation and coding schemes, or other asymmetries between frequency bands, which may degrade spectral efficiency. In some examples, a determination to refrain from performing inter-band carrier aggregation using the first frequency band and the second frequency band may include a determination to attempt inter-band carrier aggregation using different frequency bands, or a determination to refrain from inter-band carrier aggregation (e.g., until a later time, until signal propagation conditions change or improve).

In some examples, when a determined beam correlation metric does not satisfy a threshold (e.g., is at or below a threshold correlation, indicates an insufficient degree of correlation between directions of peak received power), the second device 410 may reevaluate reception at different directions in an effort to balance reception using the first frequency band and the second frequency band. For example, the described techniques may include the second device 410 determining a sub-optimal reception direction for one or both the first frequency band and the second frequency band, where the suboptimal reception directions may be relatively better aligned to each other (e.g., better correlated than peak reception directions). In some examples, despite receiving signaling at less than optimal signal quality, such a tradeoff may support improved spectral utilization by leveraging inter-band carrier aggregation more efficiently.

Figure 5:
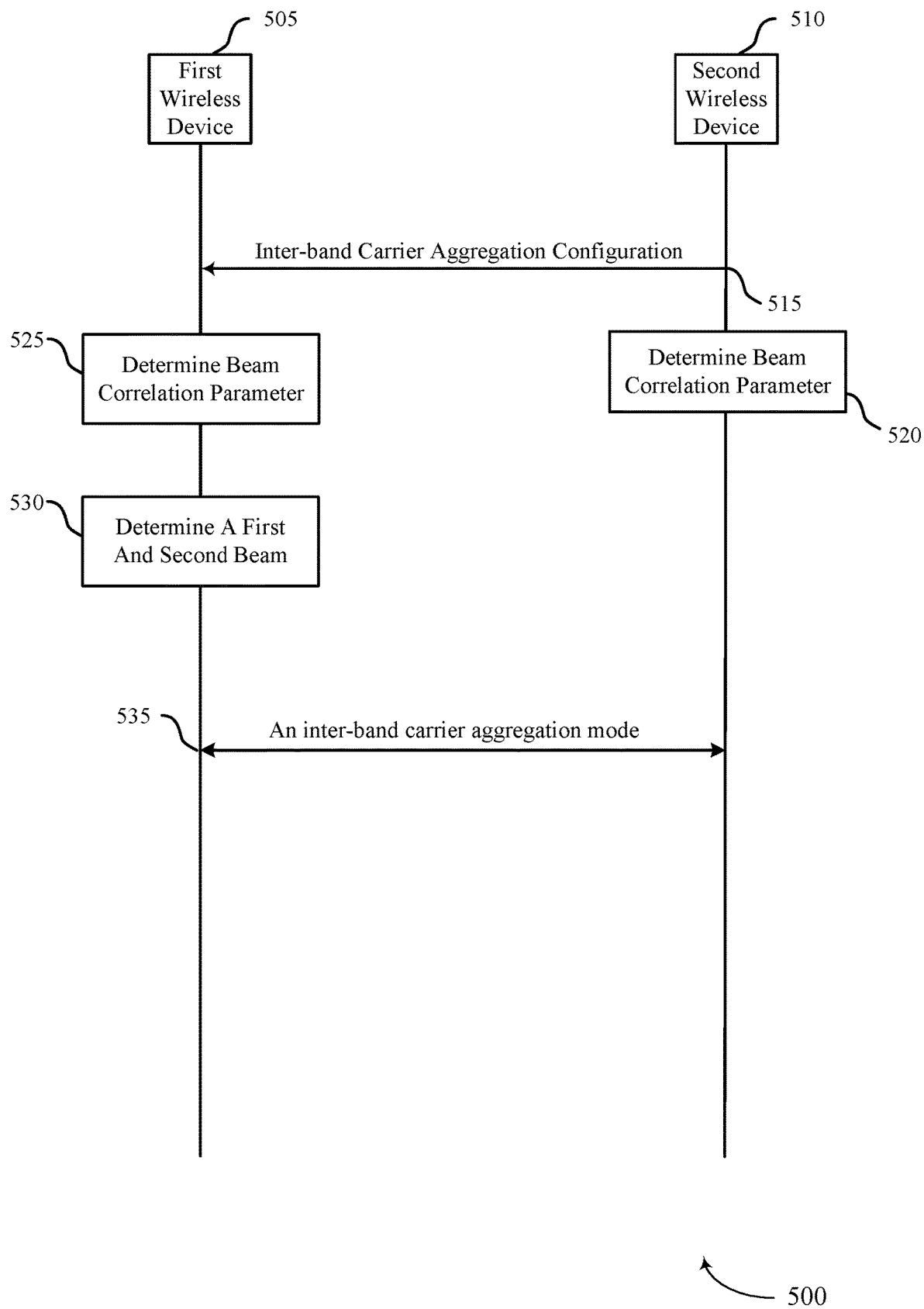
FIG. 5 illustrates an example of a process flow that supports signaling of beam correlation across millimeter wave frequency bands in accordance with aspects of the present disclosure.

FIG. 5 illustrates an example of a process flow 500 that supports signaling of beam correlation across millimeter wave frequency bands in accordance with aspects of the present disclosure. In some examples, process flow 500 may implement aspects of wireless communications system 100 or 300. Process flow 500 may be implemented by first wireless device 505 (e.g., a UE or a CPE) and a second wireless device 510 (e.g., a base station, a CPE, a relay device, a router, a repeater, or an IAB node) as described herein. Alternative examples of the following may be implemented, where some steps are performed in a different order than described or are not performed at all. In some cases, steps may include additional features not mentioned below, or further steps may be added.

At 515, second wireless device 510 may transmit, to first wireless device 505, a carrier aggregation configuration for communications with the first wireless device 505, the carrier aggregation configuration contains at least a first frequency band and a second frequency band. In a first example, first wireless device 505 may receive, from the second wireless device 510, a configuration message as a broadcast message to one or more wireless devices including at least the first wireless device 505, a wireless device specific message intended for the first wireless device 505, or both. In second example, first wireless device 505 may receive, from the second wireless device 510, a configuration message specific to bandwidth parts of the first and second frequency bands. In a third example, first wireless device 505 may receive, from the second wireless device 510, a configuration message specific to a TCI state used in the first and second millimeter wave bands at the second wireless device 510. In a fourth example, first wireless device 505 may receive, from the second wireless device 510, a configuration message as a weighted average metric for two or more transmission configuration indication states used in the first and second millimeter wave bands at the second wireless device 510. First wireless device may determine the weights for use with the weighted average metric and the TCIs of the second beam used in determining the weighted average.

At 520, second wireless device 510 may determine, a beam correlation parameter, based on the carrier aggregation configuration. At 525, first wireless device 505 may determine, a beam correlation parameter, based on the received carrier aggregation configuration from the second wireless device 510.

At 530, first wireless device 505 may determine, a first beam or a second beam for use in communications with the second wireless device 510 on the first or second frequency band based on the beam correlation parameter.

At 535, first wireless device 505 and second wireless device 510 may communicate, in an inter-band carrier aggregation mode using the first beam on the first millimeter wave band and the second beam on the second millimeter wave band. In some examples, the first frequency band (e.g., frequencies between 24.25 GHz and 52.6 GHz) is a lower millimeter wave band and the second frequency band (e.g., frequencies that are greater than 52.6 GHz) is an upper millimeter wave band.

Figure 6:
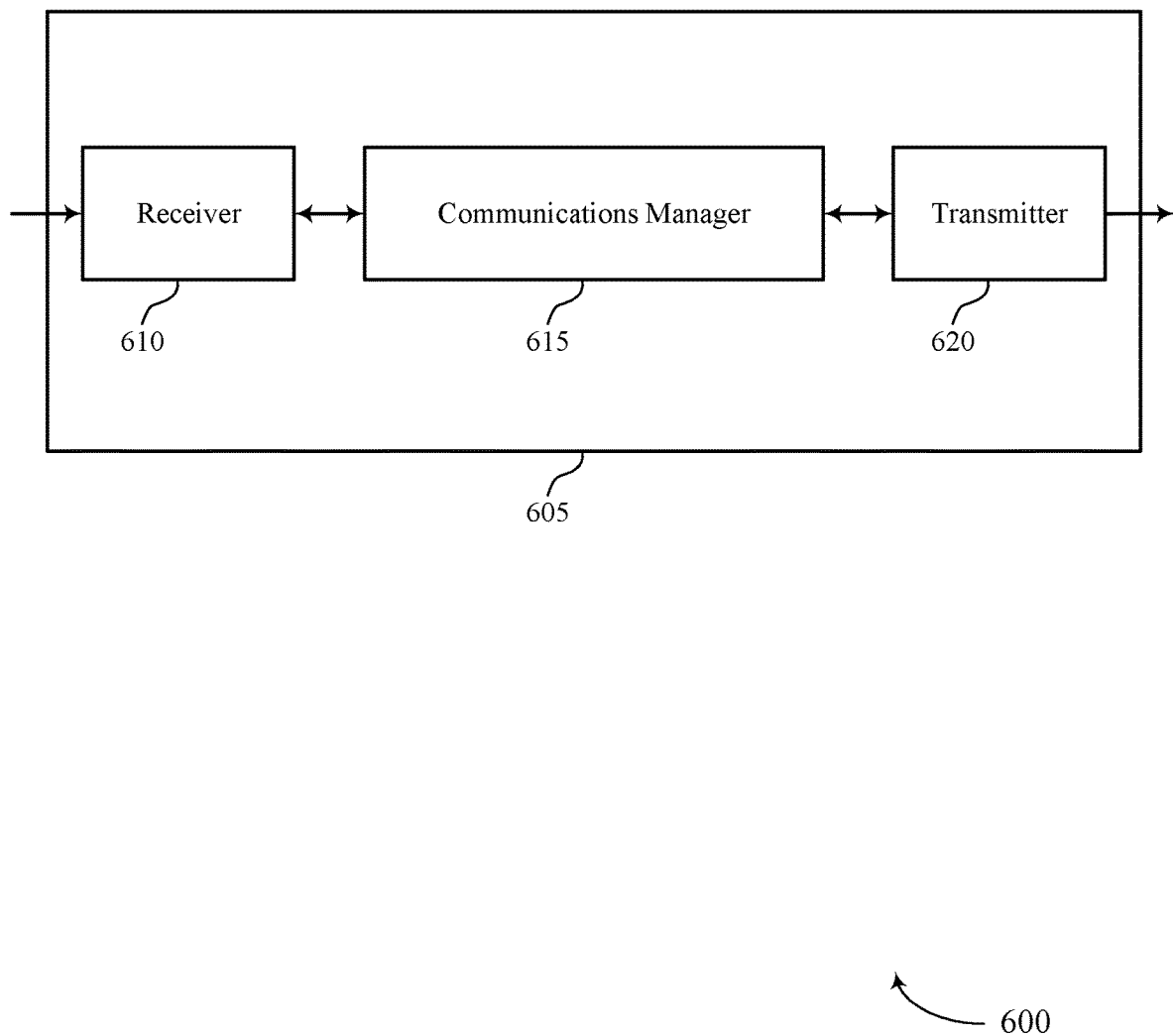
FIGS. 6 and 7 show block diagrams of devices that support signaling of beam correlation across millimeter wave frequency bands in accordance with aspects of the present disclosure.

FIG. 6 shows a block diagram 600 of a device 605 that supports signaling of beam correlation across millimeter wave frequency bands in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to signaling of beam correlation across millimeter wave frequency bands, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a second wireless device, a carrier aggregation configuration for communications with the second wireless device, the carrier aggregation configuration including at least a first frequency band and a second frequency band, determine, a beam correlation parameter, based on the received carrier aggregation configuration from the second wireless device, determine, a first beam for use in communications with the second wireless device on the first frequency band based on the beam correlation parameter, determine, a second beam for use in communications with the second wireless device on the second frequency band based on the beam correlation parameter, and communicate, with the second wireless device, in an inter-band carrier aggregation mode using the first beam on the first millimeter wave band and the second beam on the second millimeter wave band. The communications manager 615 may be an example of aspects of the communications manager 910 described herein.

The communications manager 615 may perform various aspects of signaling a beam correlation as described herein. The communications manager 615, or its sub-components, may be implemented in hardware (e.g., in communications management circuitry). The circuitry may include a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device.

In some examples, the communication manager 615 may be configured to perform various operations (e.g., receiving, determining, transmitting, configuring) using or otherwise in cooperation with the receiver 610, the transmitter 620, or both.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the UE communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The UE communications manager 615 as described herein may be implemented to realize one or more improvements. One implementation may allow the device 605 to determine a beam correlation parameter to perform inter-band carrier aggregation across two or more frequency bands. The beam correlation parameter may increase reliability and reduce latency during communications.

Based on techniques for signaling of beam correlation across millimeter wave frequency bands as described herein, a processor of a UE 115 (e.g., controlling the receiver 610, the transmitter 620, or the transceiver 920 as described with reference to FIG. 9) may increase reliability and decrease signaling overhead in the communications because the UE 115 may perform inter-band carrier aggregation across two or more frequency bands.

Figure 7:
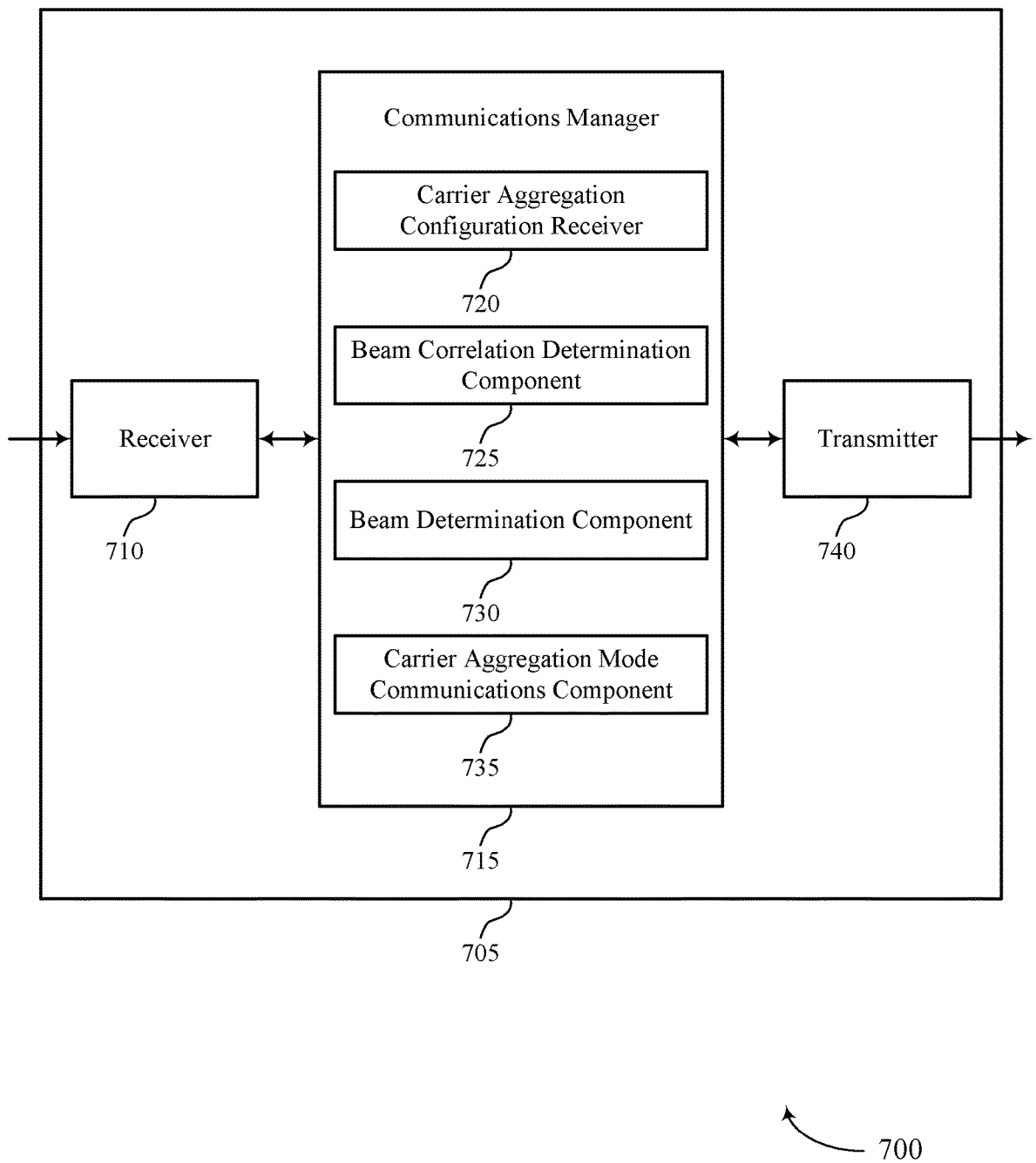

FIG. 7 shows a block diagram 700 of a device 705 that supports signaling of beam correlation across millimeter wave frequency bands in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to signaling of beam correlation across millimeter wave frequency bands, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a carrier aggregation configuration receiver 720, a beam correlation determination component 725, a beam determination component 730, and a carrier aggregation mode communications component 735. The communications manager 715 may be an example of aspects of the communications manager 910 described herein.

The carrier aggregation configuration receiver 720 may receive, from a second wireless device, a carrier aggregation configuration for communications with the second wireless device, the carrier aggregation configuration including at least a first frequency band and a second frequency band.

The beam correlation determination component 725 may determine, a beam correlation parameter, based on the received carrier aggregation configuration from the second wireless device.

The beam determination component 730 may determine, a first beam for use in communications with the second wireless device on the first frequency band based on the beam correlation parameter and determine, a second beam for use in communications with the second wireless device on the second frequency band based on the beam correlation parameter.

The carrier aggregation mode communications component 735 may communicate, with the second wireless device, in an inter-band carrier aggregation mode using the first beam on the first millimeter wave band and the second beam on the second millimeter wave band.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

In some examples, the UE communications manager 715 may be implemented as an integrated circuit or chipset for a mobile device modem, and the receiver 710 and transmitter 740 may be implemented as analog components (e.g., amplifiers, filters, antennas) coupled with the mobile device modem to enable wireless transmission and reception over one or more bands.

The UE communications manager 715 as described herein may be implemented to realize one or more improvements. One implementation may allow the device 705 to determine a beam correlation parameter to perform inter-band carrier aggregation across two or more frequency bands. The beam correlation parameter may increase reliability and reduce latency during communications.

Based on techniques for signaling of beam correlation across millimeter wave frequency bands as described herein, a processor of a UE 115 (e.g., controlling the receiver 710, the transmitter 740, or the transceiver 920 as described with reference to FIG. 9) may increase reliability and decrease signaling overhead in the communications because the UE 115 may perform inter-band carrier aggregation across two or more frequency bands.

Figure 8:
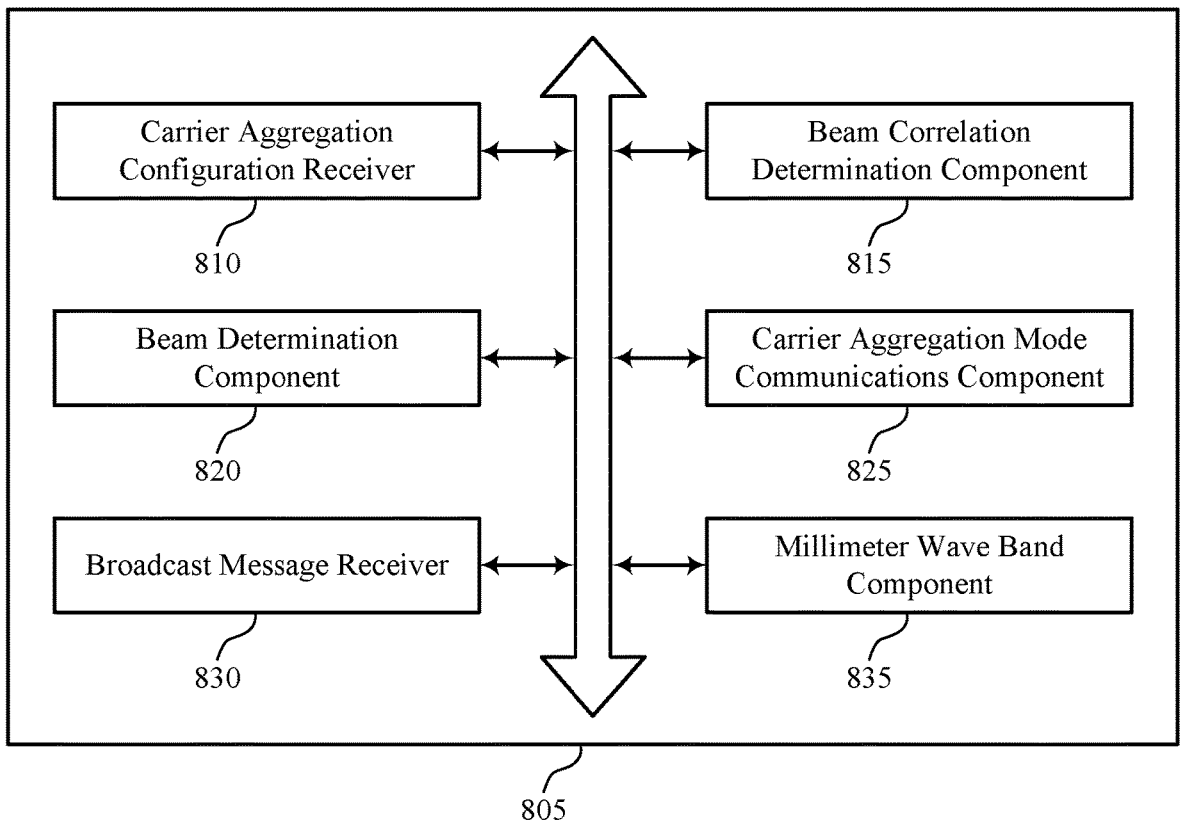
FIG. 8 shows a block diagram of a communications manager that supports signaling of beam correlation across millimeter wave frequency bands in accordance with aspects of the present disclosure.

FIG. 8 shows a block diagram 800 of a communications manager 805 that supports signaling of beam correlation across millimeter wave frequency bands in accordance with aspects of the present disclosure. The communications manager 805 may be an example of aspects of a communications manager 615, a communications manager 715, or a communications manager 910 described herein. The communications manager 805 may include a carrier aggregation configuration receiver 810, a beam correlation determination component 815, a beam determination component 820, a carrier aggregation mode communications component 825, a broadcast message receiver 830, and a millimeter wave band component 835. Each of these modules may communicate, directly or indirectly, with one another (e.g., via one or more buses).

The carrier aggregation configuration receiver 810 may receive, from a second wireless device, a carrier aggregation configuration for communications with the second wireless device, the carrier aggregation configuration including at least a first frequency band and a second frequency band.

In some examples, the carrier aggregation configuration receiver 810 may receive, from the second wireless device, a configuration message specific to bandwidth parts of the first and second frequency bands.

In some examples, the carrier aggregation configuration receiver 810 may receive, from the second wireless device, a configuration message specific to a transmission configuration indication state used in the first and second millimeter wave bands at the second wireless device.

In some examples, the carrier aggregation configuration receiver 810 may receive, from the second wireless device, a configuration message as a weighted average metric for two or more transmission configuration indication states used in the first and second millimeter wave bands at the second wireless device.

In some examples, the carrier aggregation configuration receiver 810 may determine the weights for use with the weighted average metric and the transmission configuration indications of the second beam used in determining the weighted average.

The beam correlation determination component 815 may determine, a beam correlation parameter, based on the received carrier aggregation configuration from the second wireless device.

The beam determination component 820 may determine, a first beam for use in communications with the second wireless device on the first frequency band based on the beam correlation parameter.

In some examples, the beam determination component 820 may determine, a second beam for use in communications with the second wireless device on the second frequency band based on the beam correlation parameter.

The carrier aggregation mode communications component 825 may communicate, with the second wireless device, in an inter-band carrier aggregation mode using the first beam on the first millimeter wave band and the second beam on the second millimeter wave band.

The broadcast message receiver 830 may receive, from the second wireless device, a configuration message as a broadcast message to one or more wireless devices including at least the first wireless device, a wireless device specific message intended for the first wireless device, or both.

The millimeter wave band component 835 may receive, from the second wireless device, a configuration message specific to a transmission configuration indication state used in the first and second frequency bands at the second wireless device.

In some cases, the first millimeter wave band is a lower millimeter wave band and the second millimeter wave band is an upper millimeter wave band. In some cases, the first frequency band includes frequencies between 24.25 GHz and 52.6 GHz, and the second frequency band includes frequencies that are greater than 52.6 GHz.

In some cases, the first wireless device is a UE or a CPE in a wireless communications system and the second wireless device is a base station, a CPE, a relay device, a router, a repeater, or an IAB node in the wireless communications system.

Figure 9:
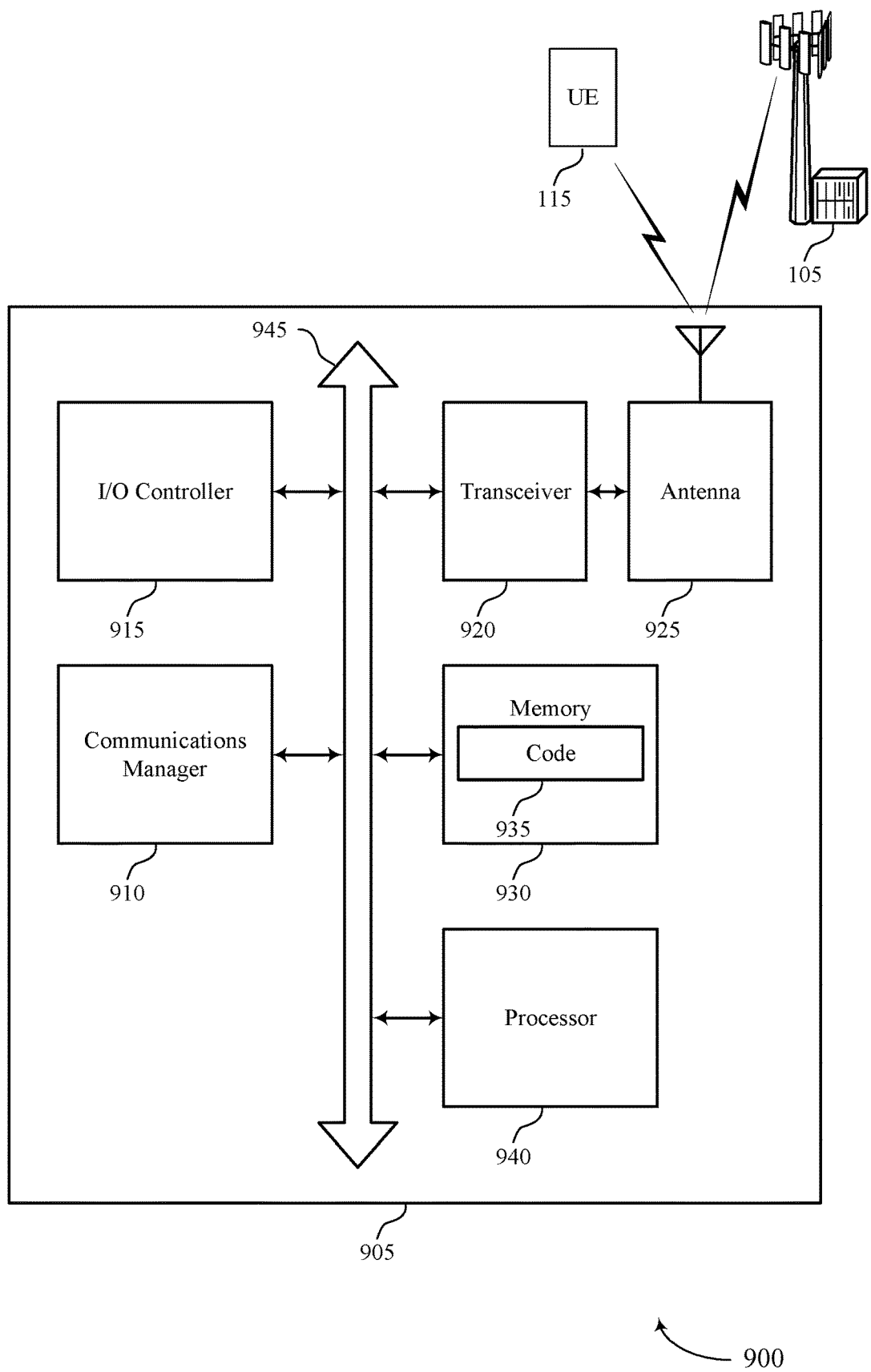
FIG. 9 shows a diagram of a system including a device that supports signaling of beam correlation across millimeter wave frequency bands in accordance with aspects of the present disclosure.

FIG. 9 shows a diagram of a system 900 including a device 905 that supports signaling of beam correlation across millimeter wave frequency bands in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a second wireless device, a carrier aggregation configuration for communications with the second wireless device, the carrier aggregation configuration including at least a first frequency band and a second frequency band, determine, a beam correlation parameter, based on the received carrier aggregation configuration from the second wireless device, determine, a first beam for use in communications with the second wireless device on the first frequency band based on the beam correlation parameter, determine, a second beam for use in communications with the second wireless device on the second frequency band based on the beam correlation parameter, and communicate, with the second wireless device, in an inter-band carrier aggregation mode using the first beam on the first millimeter wave band and the second beam on the second millimeter wave band.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling of beam correlation across millimeter wave frequency bands).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
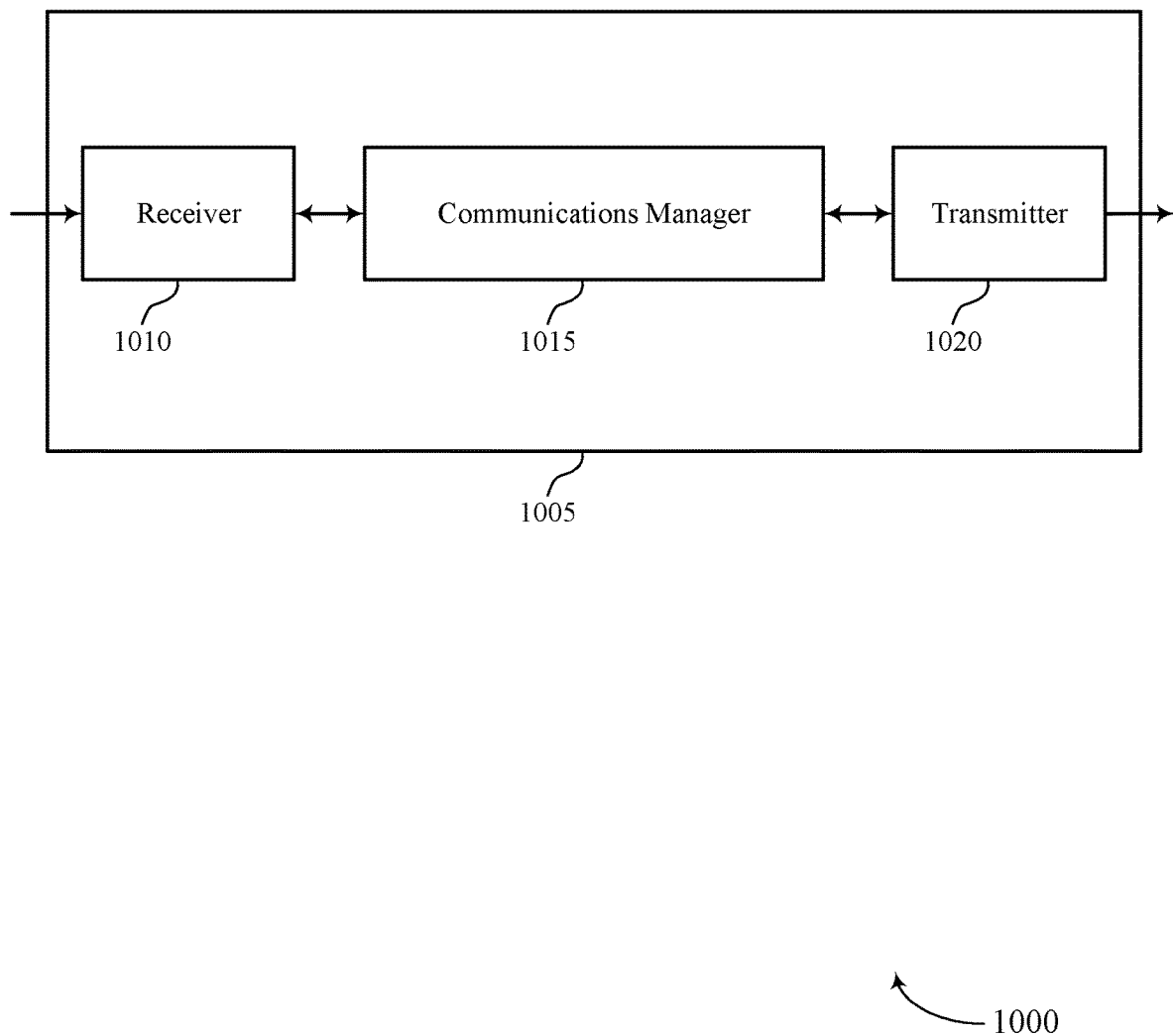
FIGS. 10 and 11 show block diagrams of devices that support signaling of beam correlation across millimeter wave frequency bands in accordance with aspects of the present disclosure.

FIG. 10 shows a block diagram 1000 of a device 1005 that supports signaling of beam correlation across millimeter wave frequency bands in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling of beam correlation across millimeter wave frequency bands, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a first wireless device, a carrier aggregation configuration for communications with the first wireless device, the carrier aggregation configuration including at least a first frequency band and a second frequency band, determine, a beam correlation parameter, based on the carrier aggregation configuration, and communicate, with the first wireless device, in an inter-band carrier aggregation mode using a first beam on the first millimeter wave band and a second beam on the second different millimeter wave band, the first beam and the second beam based on the beam correlation parameter. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
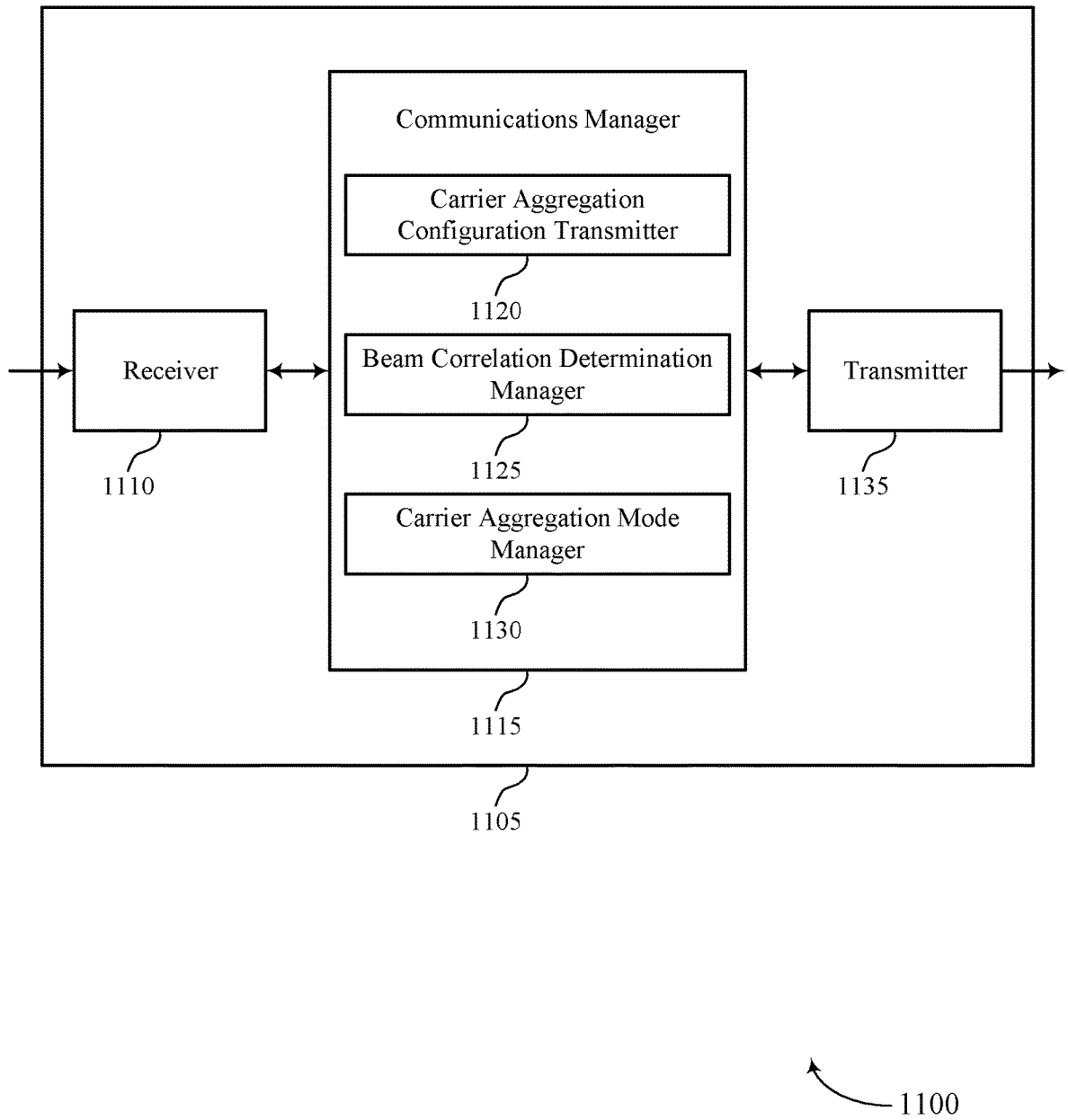

FIG. 11 shows a block diagram 1100 of a device 1105 that supports signaling of beam correlation across millimeter wave frequency bands in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to signaling of beam correlation across millimeter wave frequency bands, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a carrier aggregation configuration transmitter 1120, a beam correlation determination manager 1125, and a carrier aggregation mode manager 1130. The communications manager 1115 may be an example of aspects of the communications manager 1310 described herein.

The carrier aggregation configuration transmitter 1120 may transmit, to a first wireless device, a carrier aggregation configuration for communications with the first wireless device, the carrier aggregation configuration including at least a first frequency band and a second frequency band.

The beam correlation determination manager 1125 may determine, a beam correlation parameter, based on the carrier aggregation configuration.

The carrier aggregation mode manager 1130 may communicate, with the first wireless device, in an inter-band carrier aggregation mode using a first beam on the first millimeter wave band and a second beam on the second millimeter wave band, the first beam and the second beam based on the beam correlation parameter.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
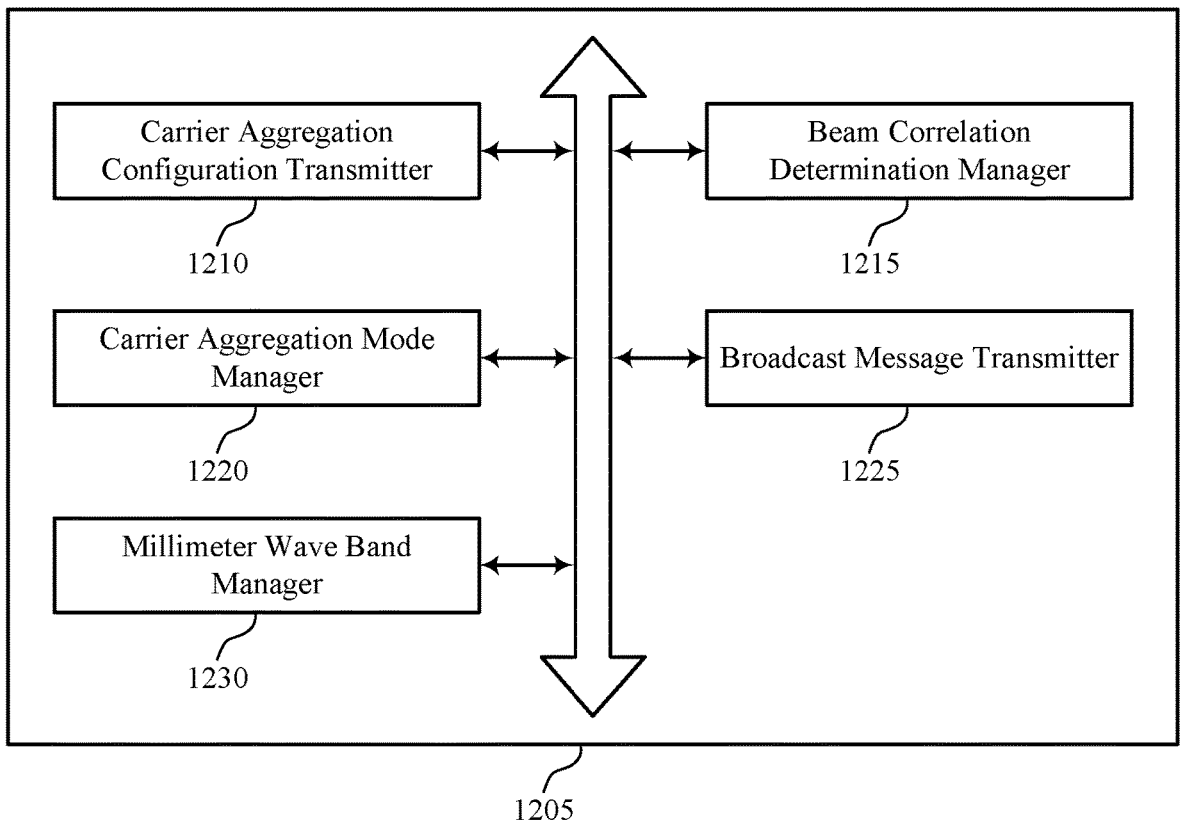
FIG. 12 shows a block diagram of a communications manager that supports signaling of beam correlation across millimeter wave frequency bands in accordance with aspects of the present disclosure.

FIG. 12 shows a block diagram 1200 of a communications manager 1205 that supports signaling of beam correlation across millimeter wave frequency bands in accordance with aspects of the present disclosure. The communications manager 1205 may be an example of aspects of a communications manager 1015, a communications manager 1115, or a communications manager 1310 described herein. The communications manager 1205 may include a carrier aggregation configuration transmitter 1210, a beam correlation determination manager 1215, a carrier aggregation mode manager 1220, a broadcast message transmitter 1225, and a millimeter wave band manager 1230. Each of these modules may communicate, directly or indirectly, with one another (e.g., via one or more buses).

The carrier aggregation configuration transmitter 1210 may transmit, to a first wireless device, a carrier aggregation configuration for communications with the first wireless device, the carrier aggregation configuration including at least a first frequency band and a second frequency band.

In some examples, the carrier aggregation configuration transmitter 1210 may transmit, to the first wireless device, a configuration message specific to bandwidth parts of the first and second frequency bands.

In some examples, the carrier aggregation configuration transmitter 1210 may transmit, to the first wireless device, a configuration message specific to a transmission configuration indication state used in the first and second millimeter wave bands at the second wireless device.

In some examples, the carrier aggregation configuration transmitter 1210 may transmit, to the first wireless device, a configuration message as a weighted average metric for two or more transmission configuration indication states used in the first and second millimeter wave bands at the second wireless device.

The beam correlation determination manager 1215 may determine, a beam correlation parameter, based on the carrier aggregation configuration.

The carrier aggregation mode manager 1220 may communicate, with the first wireless device, in an inter-band carrier aggregation mode using a first beam on the first millimeter wave band and a second beam on the second millimeter wave band, the first beam and the second beam based on the beam correlation parameter.

The broadcast message transmitter 1225 may transmit, to the first wireless device, a configuration message as a broadcast message to one or more wireless devices including at least the first wireless device, a wireless device specific message intended for the first wireless device, or both.

The millimeter wave band manager 1230 may receive, from the second wireless device, a configuration message specific to a transmission configuration indication state used in the first and second frequency bands at the second wireless device.

In some cases, the first millimeter wave band is a lower millimeter wave band and the second millimeter wave band is an upper millimeter wave band.

In some cases, the first wireless device is a UE or a CPE in a wireless communications system and the second wireless device is a base station, a CPE, a relay device, a router, a repeater, or an IAB node in the wireless communications system.

In some cases, the first frequency band includes frequencies between 24.25 GHz and 52.6 GHz, and the second frequency band includes frequencies that are greater than 52.6 GHz.

Figure 13:
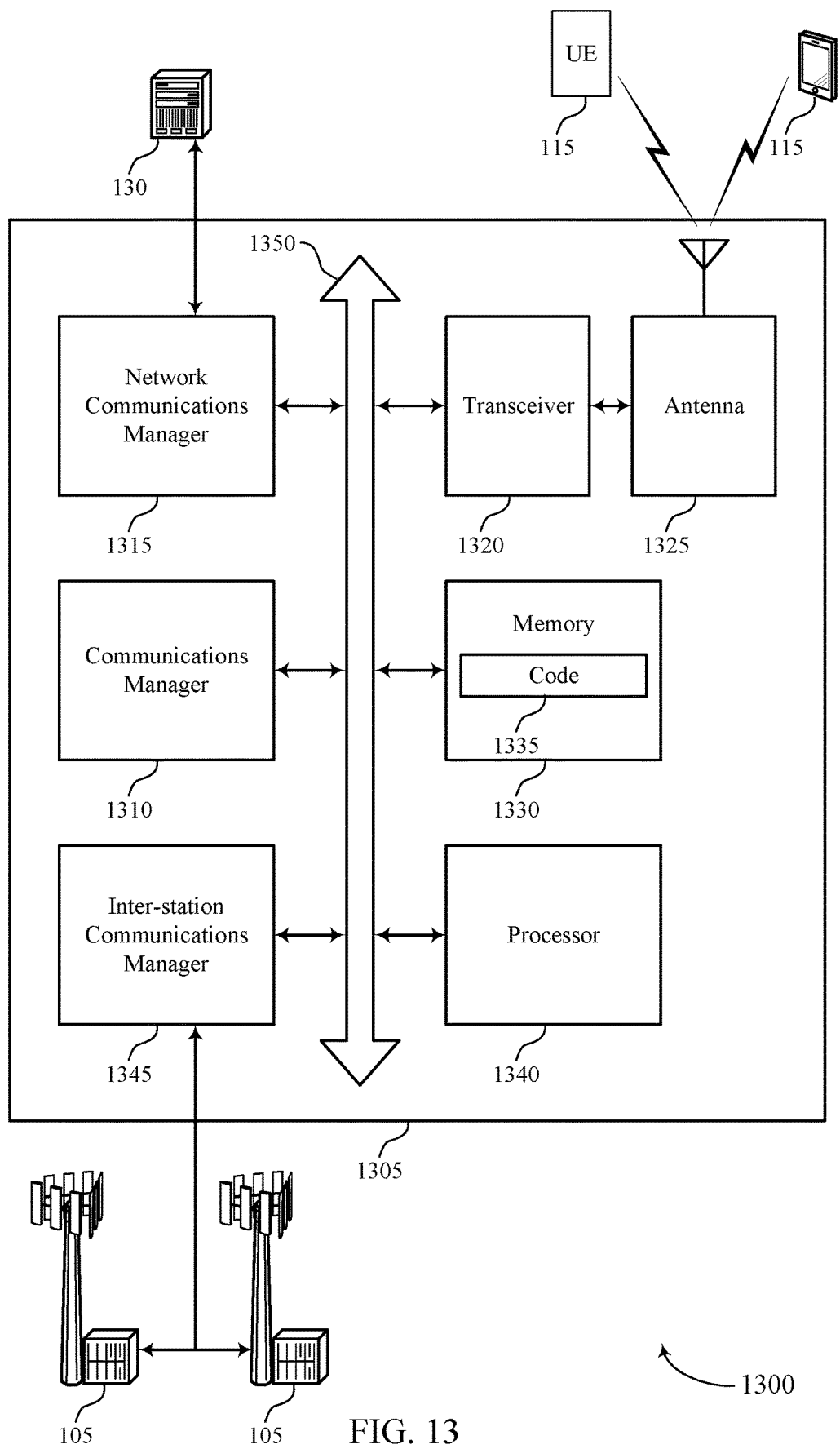
FIG. 13 shows a diagram of a system including a device that supports signaling of beam correlation across millimeter wave frequency bands in accordance with aspects of the present disclosure.

FIG. 13 shows a diagram of a system 1300 including a device 1305 that supports signaling of beam correlation across millimeter wave frequency bands in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a first wireless device, a carrier aggregation configuration for communications with the first wireless device, the carrier aggregation configuration including at least a first frequency band and a second frequency band, determine, a beam correlation parameter, based on the carrier aggregation configuration, and communicate, with the first wireless device, in an inter-band carrier aggregation mode using a first beam on the first millimeter wave band and a second beam on the second millimeter wave band, the first beam and the second beam based on the beam correlation parameter.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting signaling of beam correlation across millimeter wave frequency bands).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
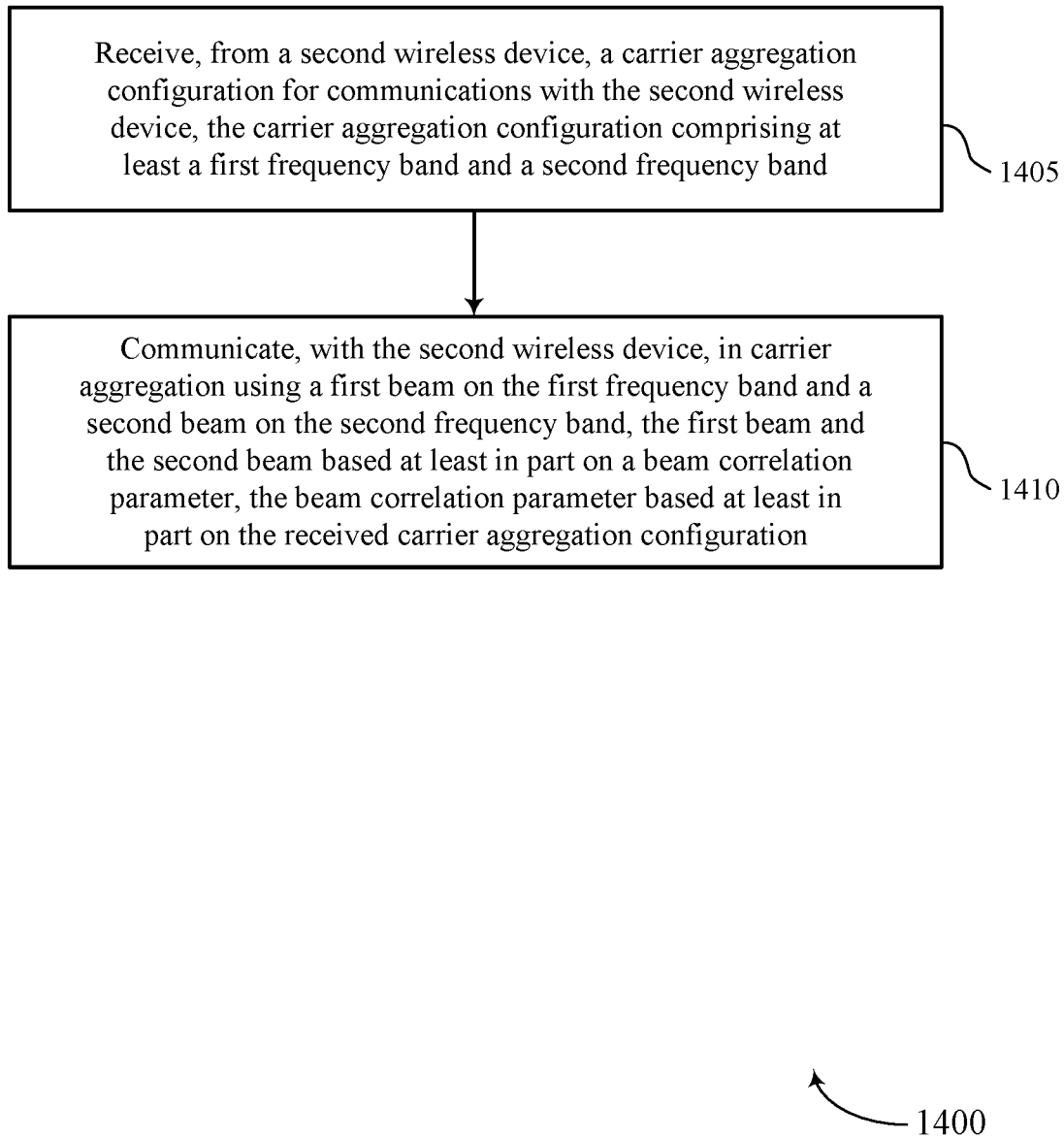
FIGS. 14 through 23 show flowcharts illustrating methods that support signaling of beam correlation across millimeter wave frequency bands in accordance with aspects of the present disclosure.

FIG. 14 shows a flowchart illustrating a method 1400 that supports signaling of beam correlation across millimeter wave frequency bands in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a second wireless device, a carrier aggregation configuration for communications with the second wireless device, the carrier aggregation configuration comprising at least a first frequency band and a second frequency band. The operations of 1405 may be performed according to the methods described herein. In some examples, aspects of the operations of 1405 may be performed by a carrier aggregation configuration receiver as described with reference to FIGS. 6 through 9.

At 1410, the UE may communicate, with the second wireless device, in carrier aggregation using a first beam on the first frequency band and a second beam on the second frequency band, the first beam and the second beam based at least in part on a beam correlation parameter, the beam correlation parameter based at least in part on the received carrier aggregation configuration. The operations of 1410 may be performed according to the methods described herein. In some examples, aspects of the operations of 1410 may be performed by a beam correlation determination component as described with reference to FIGS. 6 through 9.

Figure 15:
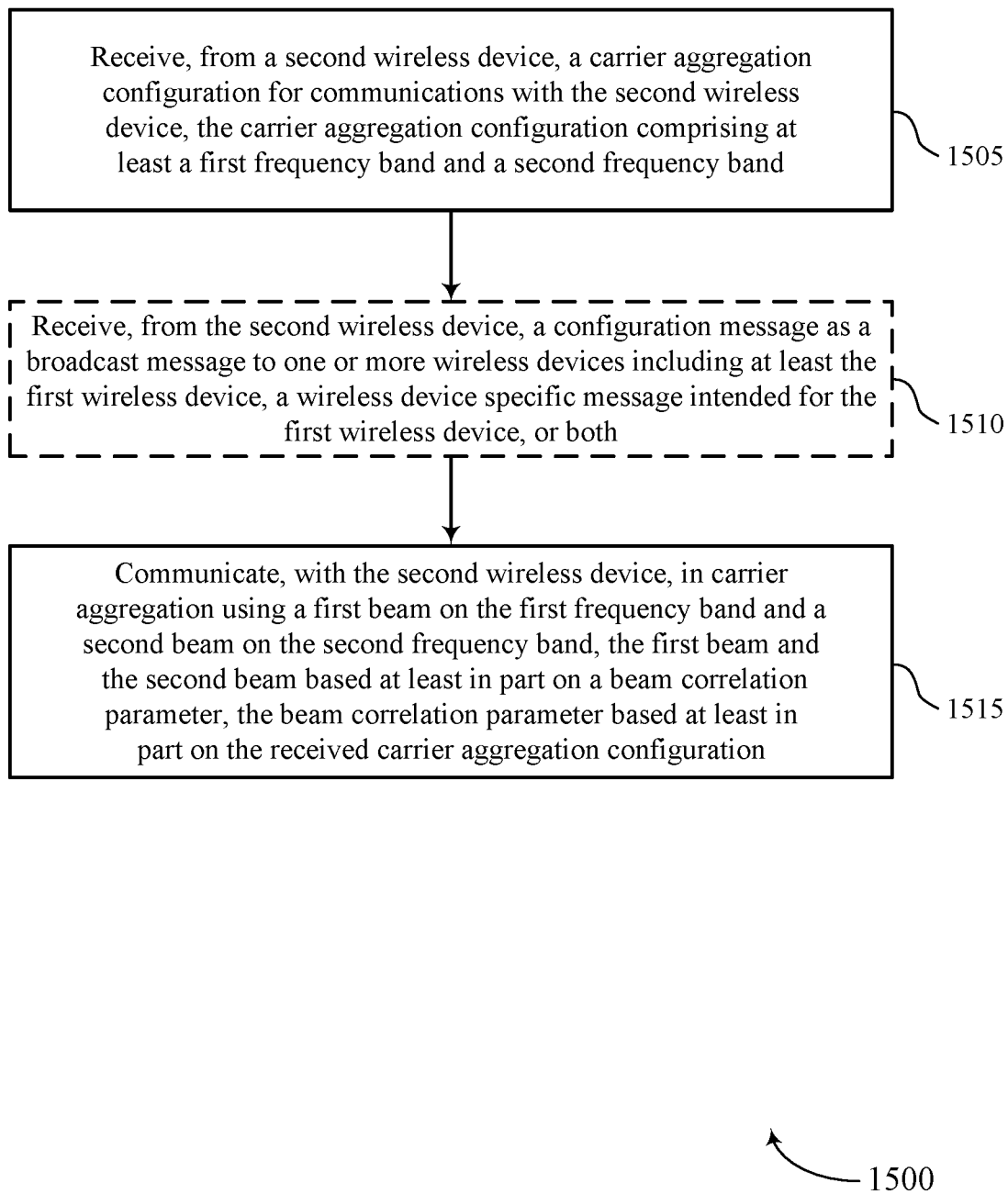

FIG. 15 shows a flowchart illustrating a method 1500 that supports signaling of beam correlation across millimeter wave frequency bands in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a second wireless device, a carrier aggregation configuration for communications with the second wireless device, the carrier aggregation configuration comprising at least a first frequency band and a second frequency band. The operations of 1505 may be performed according to the methods described herein. In some examples, aspects of the operations of 1505 may be performed by a carrier aggregation configuration receiver as described with reference to FIGS. 6 through 9.

At 1510, the UE may receive, from the second wireless device, a configuration message as a broadcast message to one or more wireless devices including at least the first wireless device, a wireless device specific message intended for the first wireless device, or both. The operations of 1510 may be performed according to the methods described herein. In some examples, aspects of the operations of 1510 may be performed by a broadcast message receiver as described with reference to FIGS. 6 through 9.

At 1515, the UE may communicate, with the second wireless device, in carrier aggregation using a first beam on the first frequency band and a second beam on the second frequency band, the first beam and the second beam based at least in part on a beam correlation parameter, the beam correlation parameter based at least in part on the received carrier aggregation configuration. The operations of 1515 may be performed according to the methods described herein. In some examples, aspects of the operations of 1515 may be performed by a beam correlation determination component as described with reference to FIGS. 6 through 9.

Figure 16:
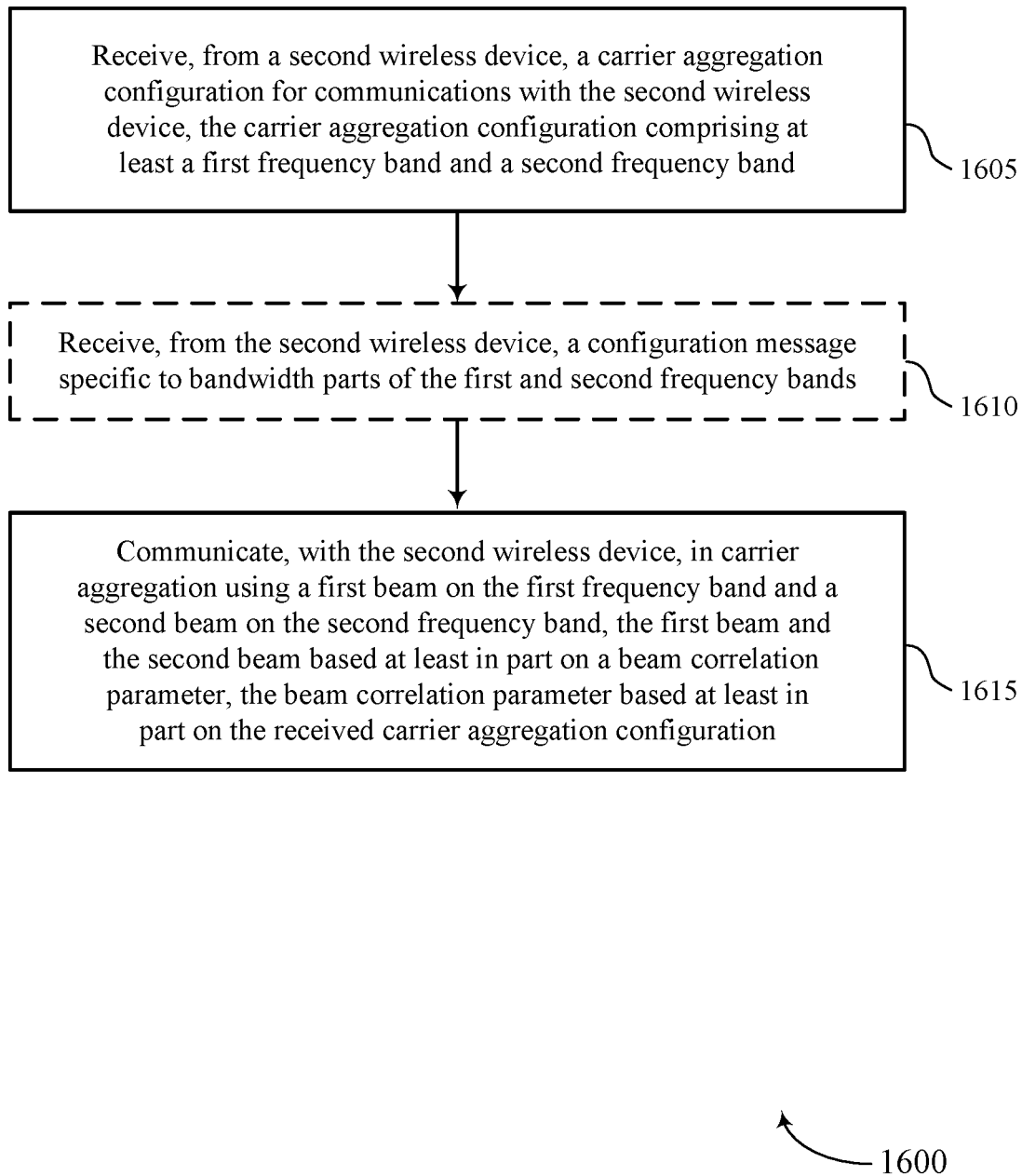

FIG. 16 shows a flowchart illustrating a method 1600 that supports signaling of beam correlation across millimeter wave frequency bands in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a second wireless device, a carrier aggregation configuration for communications with the second wireless device, the carrier aggregation configuration comprising at least a first frequency band and a second frequency band. The operations of 1605 may be performed according to the methods described herein. In some examples, aspects of the operations of 1605 may be performed by a carrier aggregation configuration receiver as described with reference to FIGS. 6 through 9.

At 1610, the UE may receive, from the second wireless device, a configuration message specific to bandwidth parts of the first and second frequency bands. The operations of 1610 may be performed according to the methods described herein. In some examples, aspects of the operations of 1610 may be performed by a carrier aggregation configuration receiver as described with reference to FIGS. 6 through 9.

At 1615, the UE may communicate, with the second wireless device, in carrier aggregation using a first beam on the first frequency band and a second beam on the second frequency band, the first beam and the second beam based at least in part on a beam correlation parameter, the beam correlation parameter based at least in part on the received carrier aggregation configuration. The operations of 1615 may be performed according to the methods described herein. In some examples, aspects of the operations of 1615 may be performed by a beam correlation determination component as described with reference to FIGS. 6 through 9.

Figure 17:
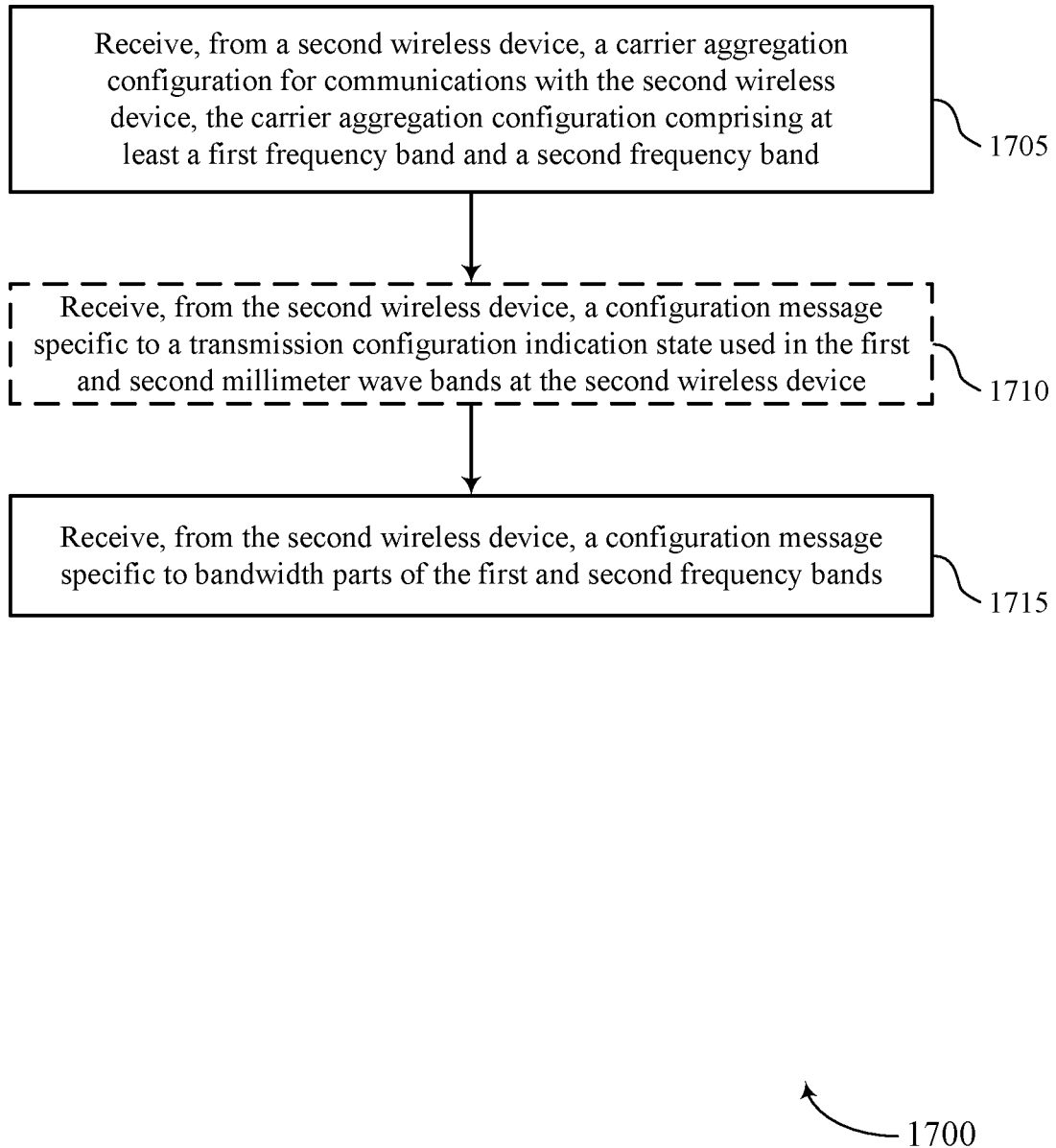

FIG. 17 shows a flowchart illustrating a method 1700 that supports signaling of beam correlation across millimeter wave frequency bands in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a second wireless device, a carrier aggregation configuration for communications with the second wireless device, the carrier aggregation configuration comprising at least a first frequency band and a second frequency band. The operations of 1705 may be performed according to the methods described herein. In some examples, aspects of the operations of 1705 may be performed by a carrier aggregation configuration receiver as described with reference to FIGS. 6 through 9.

At 1710, the UE may receive, from the second wireless device, a configuration message specific to a transmission configuration indication state used in the first and second millimeter wave bands at the second wireless device. The operations of 1710 may be performed according to the methods described herein. In some examples, aspects of the operations of 1710 may be performed by a carrier aggregation configuration receiver as described with reference to FIGS. 6 through 9.

At 1715, the UE may communicate, with the second wireless device, in carrier aggregation using a first beam on the first frequency band and a second beam on the second frequency band, the first beam and the second beam based at least in part on a beam correlation parameter, the beam correlation parameter based at least in part on the received carrier aggregation configuration. The operations of 1715 may be performed according to the methods described herein. In some examples, aspects of the operations of 1715 may be performed by a beam correlation determination component as described with reference to FIGS. 6 through 9.

Figure 18:
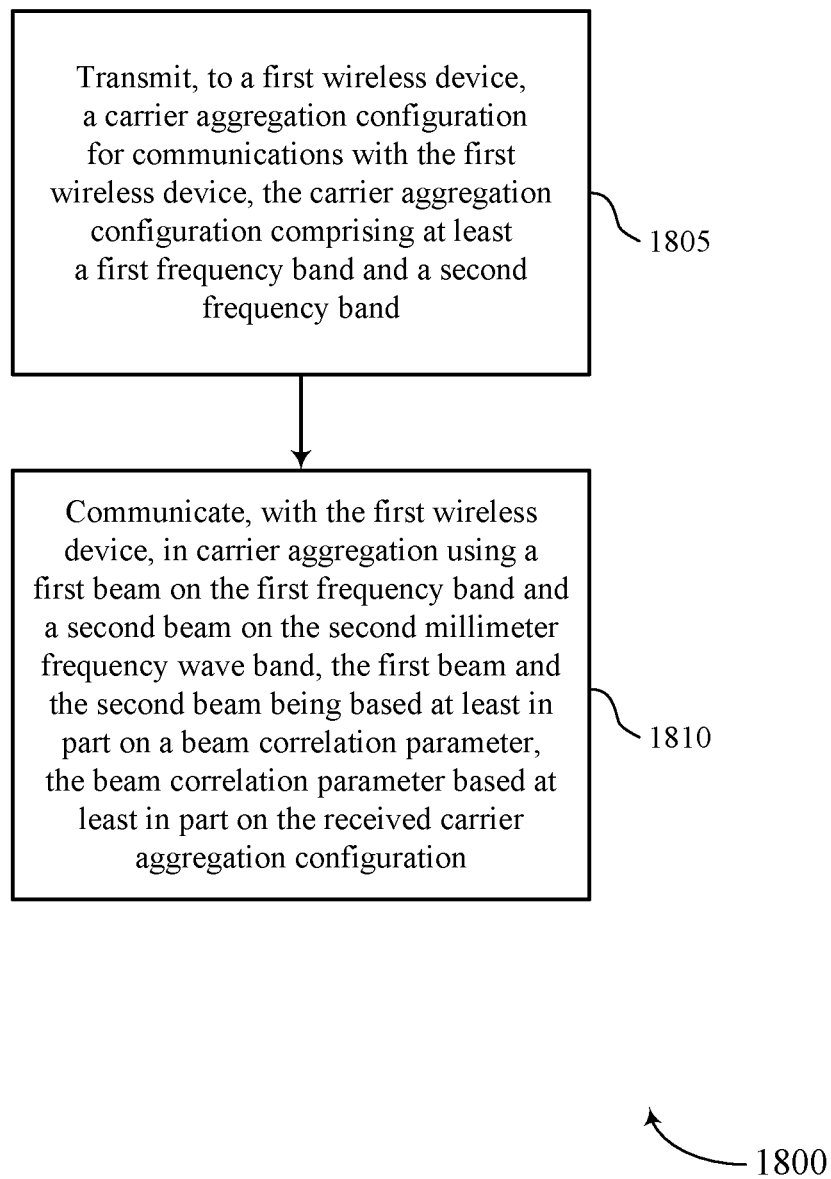

FIG. 18 shows a flowchart illustrating a method 1800 that supports signaling of beam correlation across frequency bands in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a first wireless device, a carrier aggregation configuration for communications with the first wireless device, the carrier aggregation configuration comprising at least a first frequency band and a second frequency band. The operations of 1805 may be performed according to the methods described herein. In some examples, aspects of the operations of 1805 may be performed by a carrier aggregation configuration transmitter as described with reference to FIGS. 10 through 13.

At 1810, the base station may communicate, with the first wireless device, in carrier aggregation using a first beam on the first frequency band and a second beam on the second millimeter frequency wave band, the first beam and the second beam being based at least in part on a beam correlation parameter, the beam correlation parameter based at least in part on the received carrier aggregation configuration. The operations of 1810 may be performed according to the methods described herein. In some examples, aspects of the operations of 1810 may be performed by a beam correlation determination manager as described with reference to FIGS. 10 through 13.

Figure 19:
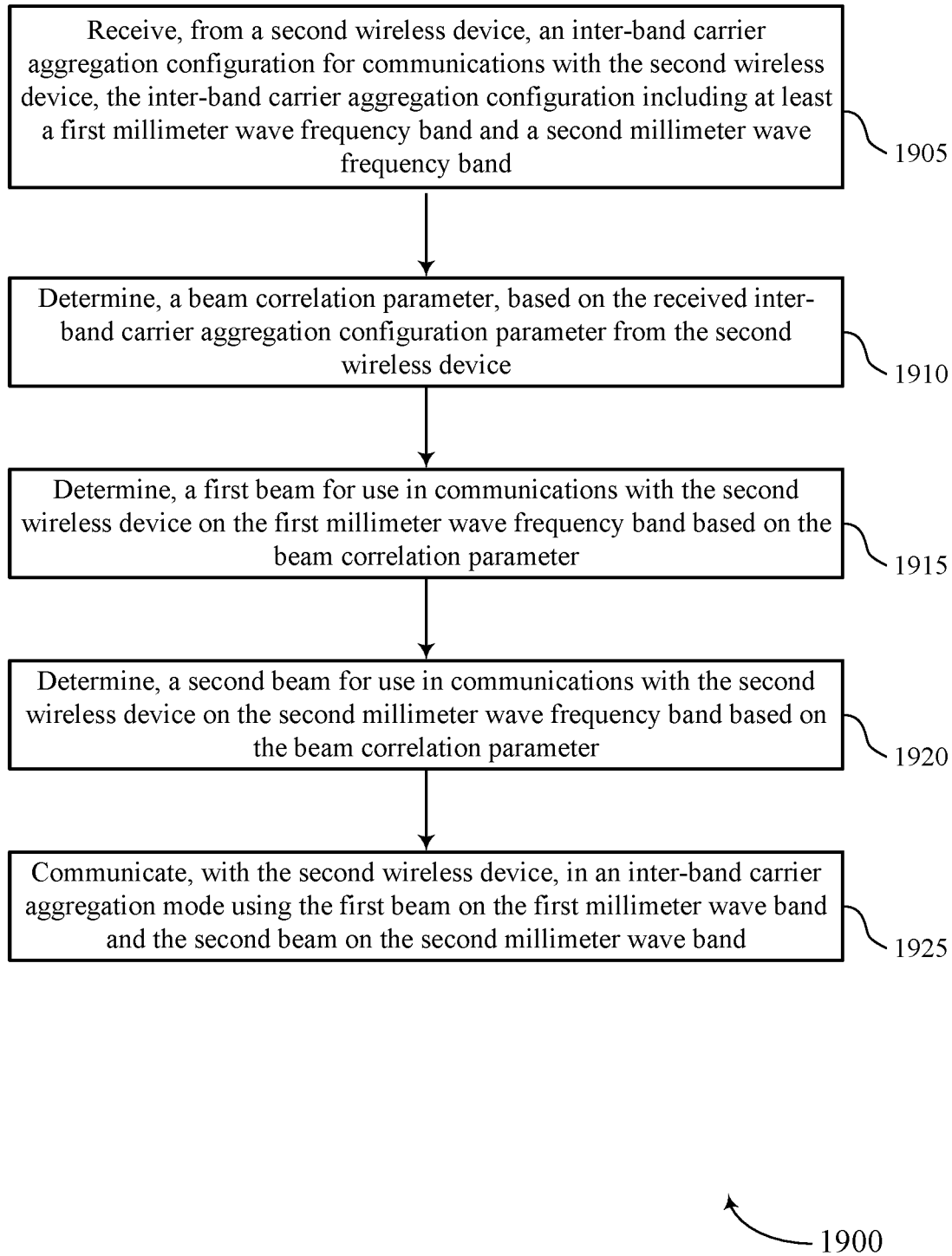

FIG. 19 shows a flowchart illustrating a method 1900 that supports signaling of beam correlation across millimeter wave frequency bands in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive, from a second wireless device, an inter-band carrier aggregation configuration for communications with the second wireless device, the inter-band carrier aggregation configuration including at least a first millimeter wave frequency band and a second millimeter wave frequency band. The operations of 1905 may be performed according to the methods described herein. In some examples, aspects of the operations of 1905 may be performed by a carrier aggregation configuration receiver as described with reference to FIGS. 6 through 9.

At 1910, the UE may determine, a beam correlation parameter, based on the received inter-band carrier aggregation configuration from the second wireless device. The operations of 1910 may be performed according to the methods described herein. In some examples, aspects of the operations of 1910 may be performed by a beam correlation determination component as described with reference to FIGS. 6 through 9.

At 1915, the UE may determine, a first beam for use in communications with the second wireless device on the first millimeter wave frequency band based on the beam correlation parameter. The operations of 1915 may be performed according to the methods described herein. In some examples, aspects of the operations of 1915 may be performed by a beam determination component as described with reference to FIGS. 6 through 9.

At 1920, the UE may determine, a second beam for use in communications with the second wireless device on the second millimeter wave frequency band based on the beam correlation parameter. The operations of 1920 may be performed according to the methods described herein. In some examples, aspects of the operations of 1920 may be performed by a beam determination component as described with reference to FIGS. 6 through 9.

At 1925, the UE may communicate, with the second wireless device, in an inter-band carrier aggregation mode using the first beam on the first millimeter wave band and the second beam on the second millimeter wave band. The operations of 1925 may be performed according to the methods described herein. In some examples, aspects of the operations of 1925 may be performed by a carrier aggregation mode communications component as described with reference to FIGS. 6 through 9.

Figure 20:
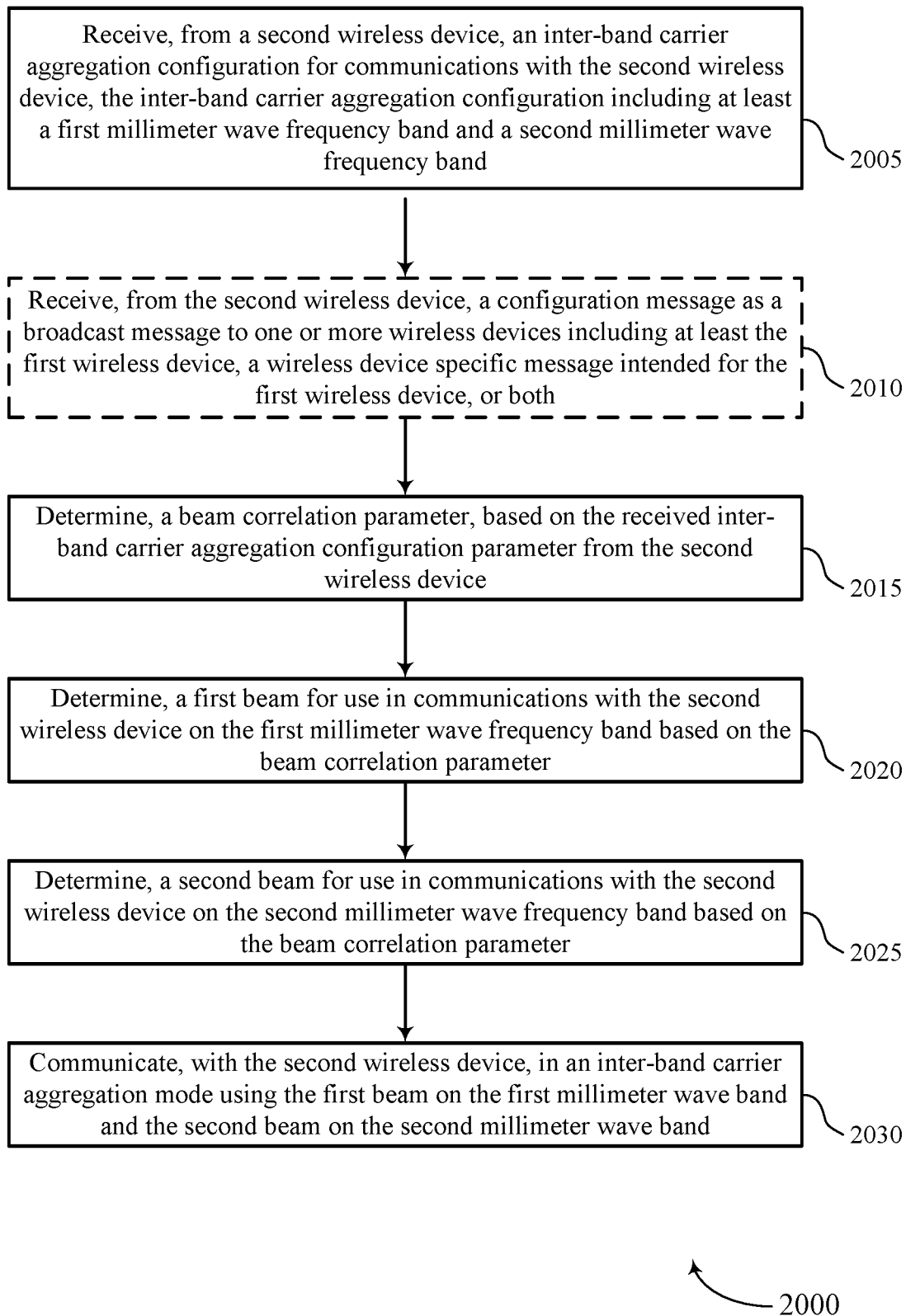

FIG. 20 shows a flowchart illustrating a method 2000 that supports signaling of beam correlation across millimeter wave frequency bands in accordance with aspects of the present disclosure. The operations of method 2000 may be implemented by a UE 120 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may receive, from a second wireless device, an inter-band carrier aggregation configuration for communications with the second wireless device, the inter-band carrier aggregation configuration including at least a first millimeter wave frequency band and a second millimeter wave frequency band. The operations of 2005 may be performed according to the methods described herein. In some examples, aspects of the operations of 2005 may be performed by a carrier aggregation configuration receiver as described with reference to FIGS. 6 through 9.

At 2010, the UE may receive, from the second wireless device, a configuration message as a broadcast message to one or more wireless devices including at least the first wireless device, a wireless device specific message intended for the first wireless device, or both. The operations of 2010 may be performed according to the methods described herein. In some examples, aspects of the operations of 2010 may be performed by a broadcast message receiver as described with reference to FIGS. 6 through 9.

At 2020, the UE may determine, a beam correlation parameter, based on the received inter-band carrier aggregation configuration from the second wireless device. The operations of 2020 may be performed according to the methods described herein. In some examples, aspects of the operations of 2020 may be performed by a beam correlation determination component as described with reference to FIGS. 6 through 9.

At 2020, the UE may determine, a first beam for use in communications with the second wireless device on the first millimeter wave frequency band based on the beam correlation parameter. The operations of 2020 may be performed according to the methods described herein. In some examples, aspects of the operations of 2020 may be performed by a beam determination component as described with reference to FIGS. 6 through 9.

At 2025, the UE may determine, a second beam for use in communications with the second wireless device on the second millimeter wave frequency band based on the beam correlation parameter. The operations of 2025 may be performed according to the methods described herein. In some examples, aspects of the operations of 2025 may be performed by a beam determination component as described with reference to FIGS. 6 through 9.

At 2030, the UE may communicate, with the second wireless device, in an inter-band carrier aggregation mode using the first beam on the first millimeter wave band and the second beam on the second millimeter wave band. The operations of 2030 may be performed according to the methods described herein. In some examples, aspects of the operations of 2030 may be performed by a carrier aggregation mode communications component as described with reference to FIGS. 6 through 9.

Figure 21:
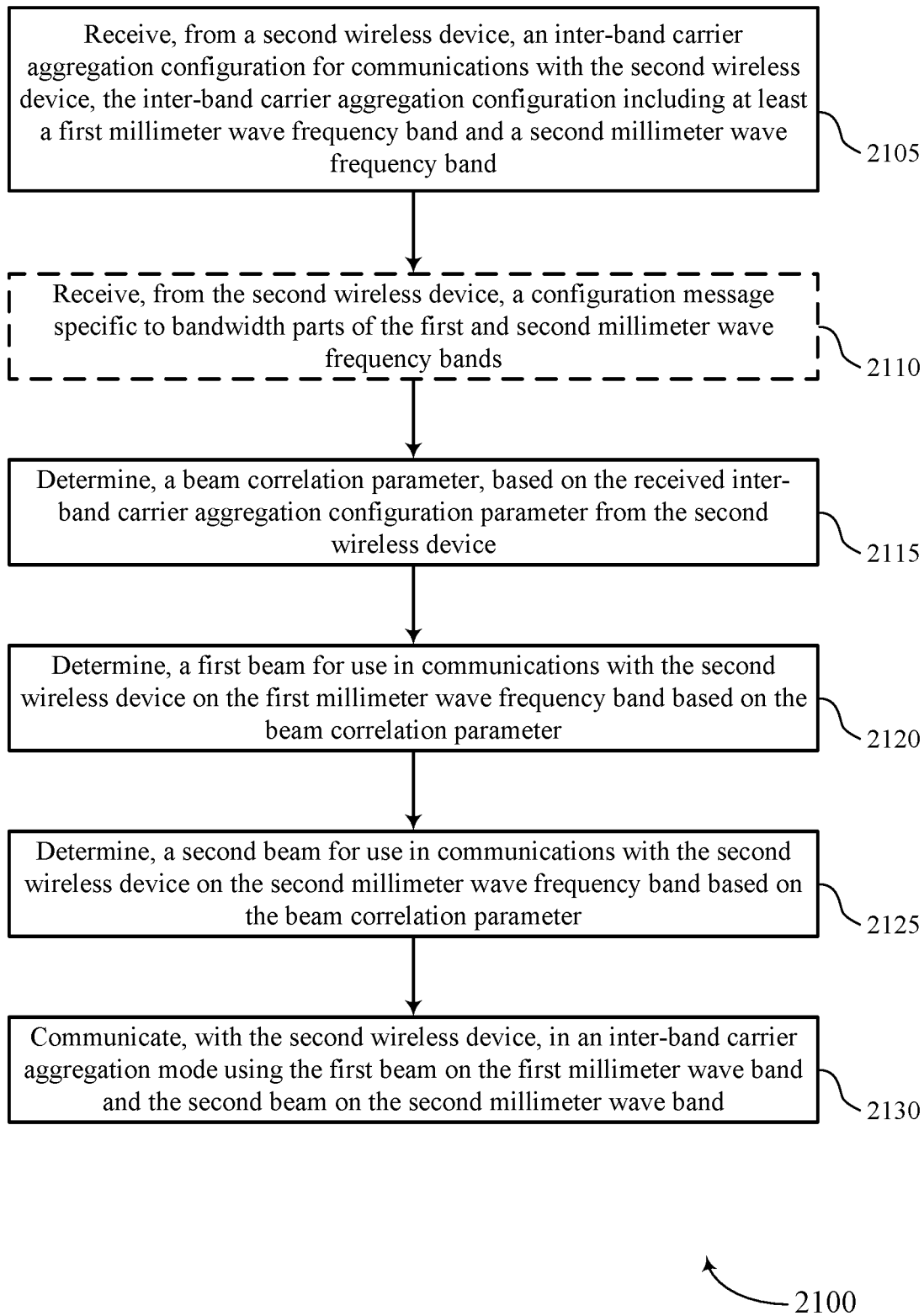

FIG. 21 shows a flowchart illustrating a method 2100 that supports signaling of beam correlation across millimeter wave frequency bands in accordance with aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2105, the UE may receive, from a second wireless device, an inter-band carrier aggregation configuration for communications with the second wireless device, the inter-band carrier aggregation configuration including at least a first millimeter wave frequency band and a second millimeter wave frequency band. The operations of 2105 may be performed according to the methods described herein. In some examples, aspects of the operations of 2105 may be performed by a carrier aggregation configuration receiver as described with reference to FIGS. 6 through 9.

At 2110, the UE may receive, from the second wireless device, a configuration message specific to bandwidth parts of the first and second millimeter wave frequency bands. The operations of 2110 may be performed according to the methods described herein. In some examples, aspects of the operations of 2110 may be performed by a carrier aggregation configuration receiver as described with reference to FIGS. 6 through 9.

At 2115, the UE may determine, a beam correlation parameter, based on the received inter-band carrier aggregation configuration from the second wireless device. The operations of 2115 may be performed according to the methods described herein. In some examples, aspects of the operations of 2115 may be performed by a beam correlation determination component as described with reference to FIGS. 6 through 9.

At 2120, the UE may determine, a first beam for use in communications with the second wireless device on the first millimeter wave frequency band based on the beam correlation parameter. The operations of 2120 may be performed according to the methods described herein. In some examples, aspects of the operations of 2120 may be performed by a beam determination component as described with reference to FIGS. 6 through 9.

At 2125, the UE may determine, a second beam for use in communications with the second wireless device on the second millimeter wave frequency band based on the beam correlation parameter. The operations of 2125 may be performed according to the methods described herein. In some examples, aspects of the operations of 2125 may be performed by a beam determination component as described with reference to FIGS. 6 through 9.

At 2130, the UE may communicate, with the second wireless device, in an inter-band carrier aggregation mode using the first beam on the first millimeter wave band and the second beam on the second millimeter wave band. The operations of 2130 may be performed according to the methods described herein. In some examples, aspects of the operations of 2130 may be performed by a carrier aggregation mode communications component as described with reference to FIGS. 6 through 9.

Figure 22:
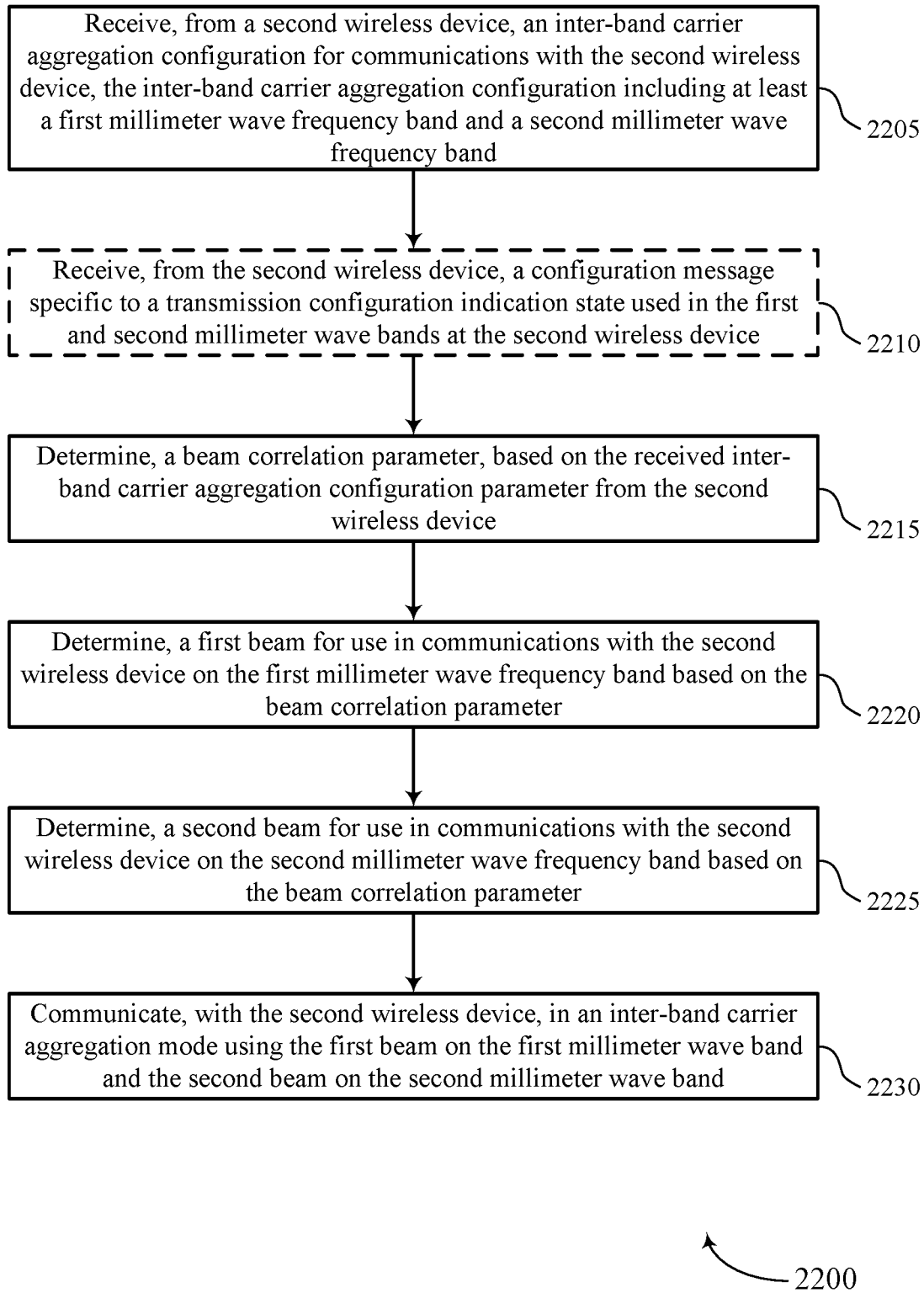

FIG. 22 shows a flowchart illustrating a method 2200 that supports signaling of beam correlation across millimeter wave frequency bands in accordance with aspects of the present disclosure. The operations of method 2200 may be implemented by a UE 115 or its components as described herein. For example, the operations of method 2200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2205, the UE may receive, from a second wireless device, an inter-band carrier aggregation configuration for communications with the second wireless device, the inter-band carrier aggregation configuration including at least a first millimeter wave frequency band and a second millimeter wave frequency band. The operations of 2205 may be performed according to the methods described herein. In some examples, aspects of the operations of 2205 may be performed by a carrier aggregation configuration receiver as described with reference to FIGS. 6 through 9.

At 2210, the UE may receive, from the second wireless device, a configuration message specific to a transmission configuration indication state used in the first and second millimeter wave bands at the second wireless device. The operations of 2210 may be performed according to the methods described herein. In some examples, aspects of the operations of 2210 may be performed by a carrier aggregation configuration receiver as described with reference to FIGS. 6 through 9.

At 2215, the UE may determine, a beam correlation parameter, based on the received inter-band carrier aggregation configuration from the second wireless device. The operations of 2215 may be performed according to the methods described herein. In some examples, aspects of the operations of 2215 may be performed by a beam correlation determination component as described with reference to FIGS. 6 through 9.

At 2220, the UE may determine, a first beam for use in communications with the second wireless device on the first millimeter wave frequency band based on the beam correlation parameter. The operations of 2220 may be performed according to the methods described herein. In some examples, aspects of the operations of 2220 may be performed by a beam determination component as described with reference to FIGS. 6 through 9.

At 2225, the UE may determine, a second beam for use in communications with the second wireless device on the second millimeter wave frequency band based on the beam correlation parameter. The operations of 2225 may be performed according to the methods described herein. In some examples, aspects of the operations of 2225 may be performed by a beam determination component as described with reference to FIGS. 6 through 9.

At 2230, the UE may communicate, with the second wireless device, in an inter-band carrier aggregation mode using the first beam on the first millimeter wave band and the second beam on the second millimeter wave band. The operations of 2230 may be performed according to the methods described herein. In some examples, aspects of the operations of 2230 may be performed by a carrier aggregation mode communications component as described with reference to FIGS. 6 through 9.

Figure 23:
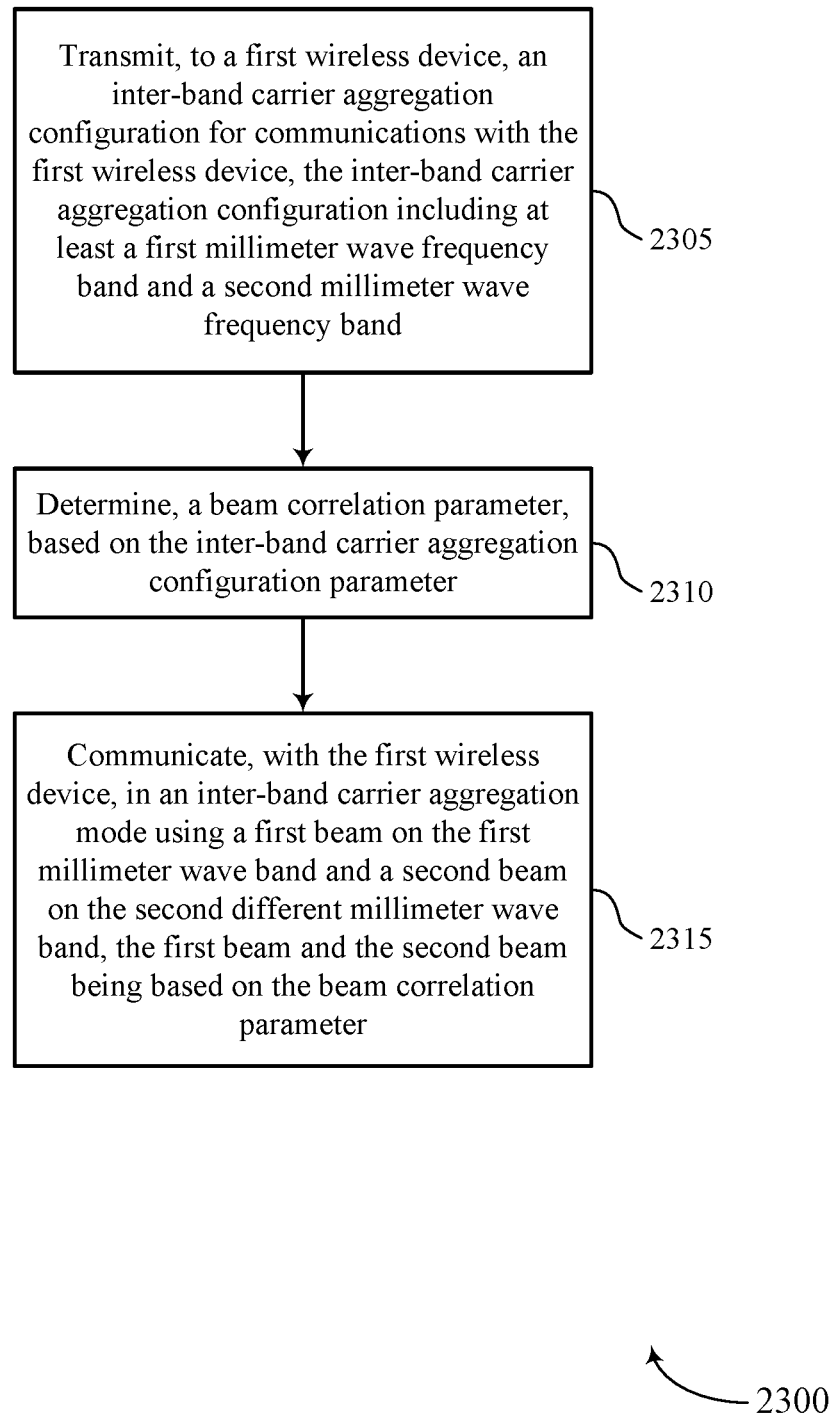

FIG. 23 shows a flowchart illustrating a method 2300 that supports signaling of beam correlation across millimeter wave frequency bands in accordance with aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2305, the base station may transmit, to a first wireless device, an inter-band carrier aggregation configuration for communications with the first wireless device, the inter-band carrier aggregation configuration including at least a first millimeter wave frequency band and a second millimeter wave frequency band. The operations of 2305 may be performed according to the methods described herein. In some examples, aspects of the operations of 2305 may be performed by a carrier aggregation configuration transmitter as described with reference to FIGS. 10 through 13.

At 2310, the base station may determine, a beam correlation parameter, based on the inter-band carrier aggregation configuration. The operations of 2310 may be performed according to the methods described herein. In some examples, aspects of the operations of 2310 may be performed by a beam correlation determination manager as described with reference to FIGS. 10 through 13.

At 2315, the base station may communicate, with the first wireless device, in an inter-band carrier aggregation mode using a first beam on the first millimeter wave band and a second beam on the second millimeter wave band, the first beam and the second beam based on the beam correlation parameter. The operations of 2315 may be performed according to the methods described herein. In some examples, aspects of the operations of 2315 may be performed by a carrier aggregation mode manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The following provides an overview of examples of the present disclosure: Aspect 1: A method for wireless communications at a first wireless device, comprising: receiving, from a second wireless device, a carrier aggregation configuration for communications with the second wireless device, the carrier aggregation configuration comprising at least a first frequency band and a second frequency band; and communicating, with the second wireless device, in carrier aggregation using a first beam on the first frequency band and a second beam on the second frequency band, the first beam and the second beam based at least in part on a beam correlation parameter, the beam correlation parameter based at least in part on the received carrier aggregation configuration.

Aspect 2: The method of aspect 1, wherein receiving the carrier aggregation configuration further comprises: receiving, from the second wireless device, an inter-band carrier aggregation configuration.

Aspect 3: The method of any of aspects 1 through 2, wherein the first frequency band is a first millimeter wave frequency band and the second frequency band is a second millimeter wave frequency band.

Aspect 4: The method of any of aspects 1 through 3, wherein receiving the carrier aggregation configuration comprises: receiving, from the second wireless device, a configuration message as a broadcast message to one or more wireless devices including at least the first wireless device, a wireless device specific message intended for the first wireless device, or both.

Aspect 5: The method of any of aspects 1 through 4, wherein receiving the carrier aggregation configuration comprises: receiving, from the second wireless device, a configuration message specific to bandwidth parts of the first and second frequency bands.

Aspect 6: The method of any of aspects 1 through 5, wherein receiving the carrier aggregation configuration comprises: receiving, from the second wireless device, a configuration message specific to a transmission configuration indication state used in the first and second frequency bands at the second wireless device.

Aspect 7: The method of any of aspects 1 through 6, wherein receiving the carrier aggregation configuration comprises: receiving, from the second wireless device, a configuration message as a weighted average metric for two or more transmission configuration indication states used in the first and second frequency bands at the second wireless device.

Aspect 8: The method of aspect 7, wherein communicating in carrier aggregation further comprises: communicating in carrier aggregation based at least in part on weights for use with the weighted average metric and the transmission configuration indication states of the second beam used in determining a weighted average.

Aspect 9: The method of any of aspects 1 through 8, wherein the first frequency band is a lower millimeter wave band and the second frequency band is an upper millimeter wave band.

Aspect 10: The method of any of aspects 1 through 9, wherein the first frequency band includes frequencies between 24.25 GHz and 52.6 GHz and the second frequency band includes frequencies that are greater than 52.6 GHz.

Aspect 11: The method of any of aspects 1 through 10, wherein the first wireless device is a UE or a CPE in a wireless communications system and the second wireless device is a base station, a CPE, a relay device, a router, a repeater, or an IAB node in the wireless communications system.

Aspect 12: A method for wireless communications at a second wireless device, comprising: transmitting, to a first wireless device, a carrier aggregation configuration for communications with the first wireless device, the carrier aggregation configuration comprising at least a first frequency band and a second frequency band; and communicating, with the first wireless device, in carrier aggregation using a first beam on the first frequency band and a second beam on the second millimeter frequency wave band, the first beam and the second beam being based at least in part on a beam correlation parameter, the beam correlation parameter based at least in part on the received carrier aggregation configuration.

Aspect 13: The method of aspect 12, wherein transmitting the carrier aggregation configuration further comprises: transmitting, from the second wireless device, an inter-band carrier aggregation configuration.

Aspect 14: The method of any of aspects 12 through 13, wherein the first frequency band is a first millimeter wave frequency band and the second frequency band is a second millimeter wave frequency band.

Aspect 15: The method of any of aspects 12 through 14, wherein transmitting the carrier aggregation configuration comprises: transmitting, to the first wireless device, a configuration message as a broadcast message to one or more wireless devices including at least the first wireless device, a wireless device specific message intended for the first wireless device, or both.

Aspect 16: The method of any of aspects 12 through 15, wherein transmitting the carrier aggregation configuration comprises: transmitting, to the first wireless device, a configuration message specific to bandwidth parts of the first and second frequency bands.

Aspect 17: The method of any of aspects 12 through 16, wherein transmitting the carrier aggregation configuration comprises: transmitting, to the first wireless device, a configuration message specific to a transmission configuration indication state used in the first and second frequency bands at the second wireless device.

Aspect 18: The method of any of aspects 12 through 17, wherein transmitting the carrier aggregation configuration comprises: transmitting, to the first wireless device, a configuration message as a weighted average metric for two or more transmission configuration indication states used in the first and second frequency bands at the second wireless device.

Aspect 19: The method of any of aspects 12 through 18, wherein the first frequency band is a lower millimeter wave band and the second frequency band is an upper millimeter wave band.

Aspect 20: The method of any of aspects 12 through 19, wherein the first wireless device is a UE or a CPE in a wireless communications system and the second wireless device is a base station, a CPE, a relay device, a router, a repeater, or an IAB node in the wireless communications system.

Aspect 21: The method of any of aspects 12 through 20, wherein the first frequency band includes frequencies between wherein the first frequency band includes frequencies between 24.25 GHz and 52.6 GHz and the second frequency band includes frequencies that are greater than 52.6 GHz Aspect 22: An apparatus for wireless communications at a first wireless device, comprising a processor; memory coupled with the processor, the processor and memory configured to perform a method of any of aspects 1 through 11.

Aspect 23: An apparatus for wireless communications at a first wireless device, comprising at least one means for performing a method of any of aspects 1 through 11.

Aspect 24: A non-transitory computer-readable medium storing code for wireless communications at a first wireless device, the code comprising instructions executable by a processor to perform a method of any of aspects 1 through 11.

Aspect 25: An apparatus for wireless communications at a first wireless device, comprising a processor; memory coupled with the processor, the processor and memory configured to perform a method of any of aspects 12 through 21.

Aspect 26: An apparatus comprising at least one means for performing a method of any of aspects 12 through 21.

Aspect 27: A non-transitory computer-readable medium storing code the code comprising instructions executable by a processor to perform a method of any of aspects 12 through 21.

Aspect 28: A method for wireless communication at a first device, comprising: receiving, from a second wireless device, an inter-band carrier aggregation configuration for communications with the second wireless device, the inter-band carrier aggregation configuration comprising at least a first millimeter wave frequency band and a second millimeter wave frequency band; determining, a beam correlation parameter, based at least in part on the received inter-band carrier aggregation configuration from the second wireless device; determining, a first beam for use in communications with the second wireless device on the first millimeter wave frequency band based at least in part on the beam correlation parameter; determining, a second beam for use in communications with the second wireless device on the second millimeter wave frequency band based at least in part on the beam correlation parameter; and communicating, with the second wireless device, in an inter-band carrier aggregation mode using the first beam on the first millimeter wave frequency band and the second beam on the second millimeter wave frequency band.

Aspect 29: The method of aspect 28, wherein receiving the inter-band carrier aggregation configuration comprises: receiving, from the second wireless device, a configuration message as a broadcast message to one or more wireless devices including at least the first wireless device, a wireless device specific message intended for the first wireless device, or both.

Aspect 30: The method of any of aspects 28 or 29, wherein receiving the inter-band carrier aggregation configuration comprises: receiving, from the second wireless device, a configuration message specific to bandwidth parts of the first and second millimeter wave frequency bands.

Aspect 31: The method of any of aspects 28 to 30, wherein receiving the inter-band carrier aggregation configuration comprises: receiving, from the second wireless device, a configuration message specific to a transmission configuration indication state used in the first and second millimeter wave frequency bands at the second wireless device.

Aspect 32: The method of any of aspects 28 to 31, wherein receiving the inter-band carrier aggregation configuration comprises: receiving, from the second wireless device, a configuration message as a weighted average metric for two or more transmission configuration indication states used in the first and second millimeter wave frequency bands at the second wireless device.

Aspect 33: The method of any of aspects 28 to 32, further comprising: determining the weights for use with the weighted average metric and the transmission configuration indications of the second beam used in determining the weighted average.

Aspect 34: The method of any of aspects 28 to 33, wherein the first millimeter wave frequency band is a lower millimeter wave band and the second millimeter wave frequency band is an upper millimeter wave band.

Aspect 35: The method of any of aspects 28 to 34, wherein the first millimeter wave frequency band includes frequencies between 24.25 GHz and 52.6 GHz, and the second millimeter wave frequency band includes frequencies that are greater than 52.6 GHz.

Aspect 36: The method of any of aspects 28 to 35, wherein the first wireless device is a UE or a CPE in a wireless communications system and the second wireless device is a base station, a CPE, a relay device, a router, a repeater, or an IAB node in the wireless communications system.

Aspect 37: A method for wireless communications at a second wireless device, comprising: transmitting, to a first wireless device, an inter-band carrier aggregation configuration for communications with the first wireless device, the inter-band carrier aggregation configuration comprising at least a first millimeter wave frequency band and a second millimeter wave frequency band; determining, a beam correlation parameter, based on the inter-band carrier aggregation configuration; and communicating, with the first wireless device, in an inter-band carrier aggregation mode using a first beam on the first millimeter wave frequency band and a second beam on the second millimeter frequency wave band, the first beam and the second beam based at least in part on the beam correlation parameter.

Aspect 38: The method of any one of aspects 28 through 37, wherein: transmitting the inter-band carrier aggregation configuration comprises: transmitting, to the first wireless device, a configuration message as a broadcast message to one or more wireless devices including at least the first wireless device, a wireless device specific message intended for the first wireless device, or both.

Aspect 39: The method of any one of aspects 28 through 38, wherein transmitting the inter-band carrier aggregation configuration comprises: transmitting, to the first wireless device, a configuration message specific to bandwidth parts of the first and second millimeter wave frequency bands.

Aspect 40: The method of any one of aspects 28 through 39, wherein transmitting the inter-band carrier aggregation configuration comprises: transmitting, to the first wireless device, a configuration message specific to a transmission configuration indication state used in the first and second millimeter wave frequency bands at the second wireless device.

Aspect 41: The method of any one of aspects 28 through 40, wherein transmitting the inter-band carrier aggregation configuration comprises: transmitting, to the first wireless device, a configuration message as a weighted average metric for two or more transmission configuration indication states used in the first and second millimeter wave frequency bands at the second wireless device.

Aspect 42: The method of any one of aspects 28 through 41, wherein the first millimeter wave frequency band is a lower millimeter wave band and the second millimeter wave frequency band is an upper millimeter wave band.

Aspect 43: The method of any one of aspects 28 through 41, wherein the first wireless device is a UE or a CPE in a wireless communications system and the second wireless device is a base station, a CPE, a relay device, a router, a repeater, or an IAB node in the wireless communications system.

Aspect 44: The method of any one of aspects 28 through 43, wherein the first millimeter wave frequency band includes frequencies between 24.25 GHz and 52.6 GHz, and the second millimeter wave frequency band includes frequencies that are greater than 52.6 GHz.

Aspect 45: The method of any one of aspects 28 through 17, wherein: transmitting the first reference signal comprises transmitting the first reference signal using a first resource block; and transmitting the second reference signal comprises transmitting the second reference signal using a second resource block that is non-overlapping in the frequency domain with the first resource block.

Aspect 46: An apparatus for wireless communication comprising at least one means for performing a method of any one of aspects 28 through 45.

Aspect 47: An apparatus for wireless communication comprising a processor, memory in electronic communication with the processor, and instructions stored in the memory and executable by the processor to cause the apparatus to perform a method of any one of aspects 28 through 45.

Aspect 48: A non-transitory computer-readable medium storing code for wireless communication comprising a processor, memory in electronic communication with the processor, and instructions stored in the memory and executable by the processor to cause the apparatus to perform a method of any one of aspects 28 through 45.

What is claimed is:

1. A method for wireless communications at a first wireless device, comprising:
   receiving, from a second wireless device, a carrier aggregation configuration for communications with the second wireless device, the carrier aggregation configuration comprising at least a first frequency band and a second frequency band; and
   communicating, with the second wireless device, in carrier aggregation using a first beam on the first frequency band and a second beam on the second frequency band, the first beam and the second beam being based at least in part on a beam correlation parameter, the beam correlation parameter based at least in part on the received carrier aggregation configuration and indicating a correlation between the first beam and the second beam in a direction based at least in part on the carrier aggregation performed in the direction in the first frequency band and in the second frequency band and across a plurality of transmission configuration indication states for the first frequency band and the second frequency band.

2. The method of claim 1, wherein receiving the carrier aggregation configuration further comprises:
   receiving, from the second wireless device, an inter-band carrier aggregation configuration.

3. The method of claim 1, wherein the first frequency band is a first millimeter wave frequency band and the second frequency band is a second millimeter wave frequency band.

4. The method of claim 1, wherein receiving the carrier aggregation configuration comprises:
   receiving, from the second wireless device, a configuration message as a broadcast message to one or more wireless devices including at least the first wireless device, a wireless device specific message intended for the first wireless device, or both.

5. The method of claim 1, wherein receiving the carrier aggregation configuration comprises:
   receiving, from the second wireless device, a configuration message specific to bandwidth parts of the first frequency band and the second frequency band.

6. The method of claim 1, wherein receiving the carrier aggregation configuration comprises:
   receiving, from the second wireless device, a configuration message specific to at least one transmission configuration indication state of the plurality of transmission configuration indication states associated with the first frequency band and the second frequency band at the second wireless device.

7. The method of claim 1, wherein receiving the carrier aggregation configuration comprises:
   receiving, from the second wireless device, a configuration message as a weighted average metric for two or more transmission configuration indication states of the plurality of transmission configuration indication states associated with the first frequency band and the second frequency band at the second wireless device.

8. The method of claim 7, wherein communicating in the carrier aggregation further comprises:
   communicating in the carrier aggregation based at least in part on weights for use with the weighted average metric and the two or more transmission configuration indication states of the second beam used in determining a weighted average.

9. The method of claim 1, wherein the first frequency band is a lower millimeter wave band and the second frequency band is an upper millimeter wave band.

10. The method of claim 1, wherein the first frequency band includes frequencies between 24.25 GHz and 52.6 GHz and the second frequency band includes frequencies that are greater than 52.6 GHz.

11. The method of claim 1, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

12. A method for wireless communications at a second wireless device, comprising:
   transmitting, to a first wireless device, a carrier aggregation configuration for communications with the first wireless device, the carrier aggregation configuration comprising at least a first frequency band and a second frequency band; and
   communicating, with the first wireless device, in carrier aggregation using a first beam on the first frequency band and a second beam on the second frequency band, the first beam and the second beam being based at least in part on a beam correlation parameter, the beam correlation parameter based at least in part on the carrier aggregation configuration and indicating a correlation between the first beam and the second beam in a direction based at least in part on the carrier aggregation performed in the direction in the first frequency band and in the second frequency band and across a plurality of transmission configuration indication states for the first frequency band and the second frequency band.

13. The method of claim 12, wherein transmitting the carrier aggregation configuration further comprises:
   transmitting, from the second wireless device, an inter-band carrier aggregation configuration.

14. The method of claim 12, wherein the first frequency band is a first millimeter wave frequency band and the second frequency band is a second millimeter wave frequency band.

15. The method of claim 12, wherein transmitting the carrier aggregation configuration comprises:
transmitting, to the first wireless device, a configuration message as a broadcast message to one or more wireless devices including at least the first wireless device, a wireless device specific message intended for the first wireless device, or both.

16. The method of claim 12, wherein transmitting the carrier aggregation configuration comprises:
transmitting, to the first wireless device, a configuration message specific to bandwidth parts of the first frequency band and the second frequency band.

17. The method of claim 12, wherein transmitting the carrier aggregation configuration comprises:
transmitting, to the first wireless device, a configuration message specific to at least one transmission configuration indication state of the plurality of transmission configuration indication states used in the first frequency band and the second frequency band at the second wireless device.

18. The method of claim 12, wherein transmitting the carrier aggregation configuration comprises:
transmitting, to the first wireless device, a configuration message as a weighted average metric for two or more transmission configuration indication states of the plurality of transmission configuration indication states used in the first frequency band and the second frequency band at the second wireless device.

19. The method of claim 12, wherein the first frequency band is a lower millimeter wave band and the second frequency band is an upper millimeter wave band.

20. The method of claim 12, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

21. The method of claim 12, wherein the first frequency band includes frequencies between 24.25 GHz and 52.6 GHz, and the second frequency band includes frequencies that are greater than 52.6 GHz.

22. An apparatus for wireless communications at a first wireless device, comprising:
one or more memories; and
one or more processors coupled with the one or more memories and configured to cause the first wireless device to:
receive, from a second wireless device, a carrier aggregation configuration for communications with the second wireless device, the carrier aggregation configuration comprising at least a first frequency band and a second frequency band; and
communicate, with the second wireless device, in carrier aggregation using a first beam on the first frequency band and a second beam on the second frequency band, the first beam and the second beam being based at least in part on a beam correlation parameter, the beam correlation parameter based at least in part on the received carrier aggregation configuration, wherein the beam correlation parameter indicates a correlation between the first beam and the second beam in a direction based at least in part on the carrier aggregation performed in the direction in the first frequency band and in the second frequency band and across a plurality of transmission configuration indication states for the first frequency band and the second frequency band.

23. The apparatus of claim 22, wherein the one or more processors are configured to cause the first wireless device to:
receive, from the second wireless device, an inter-band carrier aggregation configuration.

24. The apparatus of claim 22, wherein the first frequency band is a first millimeter wave frequency band and the second frequency band is a second millimeter wave frequency band.

25. The apparatus of claim 22, wherein the one or more processors are configured to cause the first wireless device to:
receive, from the second wireless device, a configuration message as a broadcast message to one or more wireless devices including at least the first wireless device, a wireless device specific message intended for the first wireless device, or both.

26. The apparatus of claim 22, wherein the one or more processors are configured to cause the first wireless device to:
receive, from the second wireless device, a configuration message specific to bandwidth parts of the first frequency band and the second frequency band.

27. The apparatus of claim 22, wherein the one or more processors are further configured to cause the second wireless device to:
receive, from the second wireless device, a configuration message specific to at least one transmission configuration indication state of the plurality of transmission configuration indication states associated with the first frequency band and the second frequency band at the second wireless device.

28. The apparatus of claim 22, wherein the one or more processors are further configured to cause the second wireless device to:
receive, from the second wireless device, a configuration message as a weighted average metric for two or more transmission configuration indication states of the plurality of transmission configuration indication states associated with the first frequency band and the second frequency band at the second wireless device.

29. The apparatus of claim 28, wherein the one or more processors are further configured to cause the second wireless device to:
communicate in the carrier aggregation based at least in part on weights for use with the weighted average metric and the two or more transmission configuration indication states of the plurality of transmission configuration indication states of the second beam used in determining a weighted average.

30. An apparatus for wireless communications at a second wireless device, comprising:
one or more memories; and
one or more processors coupled with the one or more memories and configured to cause the second wireless device to:
transmit, to a first wireless device, a carrier aggregation configuration for communications with the first wireless device, the carrier aggregation configuration comprising at least a first frequency band and a second frequency band; and
communicate, with the first wireless device, in carrier aggregation using a first beam on the first frequency band and a second beam on the second frequency band, the first beam and the second beam being based at least in part on a beam correlation parameter, the beam correlation parameter based at least in part on the carrier aggregation configuration, wherein the beam correlation parameter indicates a correlation between the first beam and the second beam in a direction based at least in part on the carrier aggregation in the direction in the first frequency band and in the second frequency band and across a plurality of transmission configuration indication states for the first frequency band and the second frequency band.

31. The apparatus of claim 30, wherein the one or more processors are further configured to cause the second wireless device to:
transmit, from the second wireless device, an inter-band carrier aggregation configuration.

32. The apparatus of claim 31, wherein the first frequency band is a first millimeter wave frequency band and the second frequency band is a second millimeter wave frequency band.

33. The apparatus of claim 31, wherein the one or more processors are further configured to cause the second wireless device to:
transmit, to the first wireless device, a configuration message as a broadcast message to one or more wireless devices including at least the first wireless device, a wireless device specific message intended for the first wireless device, or both.

34. The apparatus of claim 31, wherein the one or more processors are further configured to cause the second wireless device to:
transmit, to the first wireless device, a configuration message specific to bandwidth parts of the first frequency band and the second frequency band.

35. The apparatus of claim 31, wherein the one or more processors are further configured to cause the second wireless device to:
transmit, to the first wireless device, a configuration message specific to at least one transmission configuration indication state of the plurality of transmission configuration indication states used in the first frequency band and the second frequency band at the second wireless device.

36. The apparatus of claim 31, wherein the one or more processors are further configured to cause the second wireless device to:
transmit, to the first wireless device, a configuration message as a weighted average metric for two or more transmission configuration indication states of the plurality of transmission configuration indication states used in the first frequency band and the second frequency band at the second wireless device.

37. A non-transitory computer-readable medium storing code for wireless communication at a device in a wireless communications system, the code comprising instructions executable by one or more processors to cause the device to:
receive, from a wireless device, a carrier aggregation configuration for communications with the wireless device, the carrier aggregation configuration comprising at least a first frequency band and a second frequency band; and
communicate, with the wireless device, in carrier aggregation using a first beam on the first frequency band and a second beam on the second frequency band, the first beam and the second beam being based at least in part on a beam correlation parameter, the beam correlation parameter based at least in part on the received carrier aggregation configuration and indicating a correlation between the first beam and the second beam in a direction based at least in part on the carrier aggregation performed in the direction in the first frequency band and in the second frequency band and across a plurality of transmission configuration indication states for the first frequency band and the second frequency band.

38. The non-transitory computer-readable medium of claim 37, wherein the code comprising instructions executable by the one or more processors to cause the device to receive the carrier aggregation configuration further comprises instructions executable by the one or more processors to cause the device to:
receive, from the wireless device, an inter-band carrier aggregation configuration.

39. The non-transitory computer-readable medium of claim 37, wherein the wireless device is a first wireless device, and wherein the code comprising instructions executable by the one or more processors to cause the device to receive the carrier aggregation configuration further comprises instructions executable by the one or more processors to cause the device to:
receive, from the wireless device, a configuration message as a broadcast message to one or more wireless devices including at least a second wireless device, a wireless device specific message intended for the second wireless device, or both.

40. The non-transitory computer-readable medium of claim 37, wherein the code comprising instructions executable by the one or more processors to cause the device to receive the carrier aggregation configuration further comprises instructions executable by the one or more processors to cause the device to:
receive, from the wireless device, a configuration message specific to bandwidth parts of the first frequency band and the second frequency band.

41. The non-transitory computer-readable medium of claim 37, wherein the code comprising instructions executable by the one or more processors to cause the device to receive the carrier aggregation configuration further comprises instructions executable by the one or more processors to cause the device to:
receive, from the wireless device, a configuration message specific to at least one transmission configuration indication state of the plurality of transmission configuration indication states associated with the first frequency band and the second frequency band at the wireless device.

42. The non-transitory computer-readable medium of claim 37, wherein the code comprising instructions executable by the one or more processors to cause the device to receive the carrier aggregation configuration further comprises instructions executable by the one or more processors to cause the device to:
receive, from the wireless device, a configuration message as a weighted average metric for two or more transmission configuration indication states of the plurality of transmission configuration indication states associated with the first frequency band and the second frequency band at the wireless device.

43. The non-transitory computer-readable medium of claim 42, wherein the code comprising instructions executable by the one or more processors to cause the device to communicate in the carrier aggregation further comprises instructions executable by the one or more processors to cause the device to:

communicate in the carrier aggregation based at least in part on weights for use with the weighted average metric and the two or more transmission configuration indication states of the plurality of transmission configuration indication states of the second beam used in determining a weighted average.

44. A non-transitory computer-readable medium storing code for wireless communication at a device in a wireless communications system, the code comprising instructions executable by one or more processors to cause the device to:
   transmit, to a first wireless device, a carrier aggregation configuration for communications with the first wireless device, the carrier aggregation configuration comprising at least a first frequency band and a second frequency band; and
   communicate, with the first wireless device, in carrier aggregation using a first beam on the first frequency band and a second beam on the second frequency band, the first beam and the second beam being based at least in part on a beam correlation parameter, the beam correlation parameter based at least in part on the carrier aggregation configuration and indicating a correlation between the first beam and the second beam in a direction based at least in part on the carrier aggregation performed in the direction in the first frequency band and in the second frequency band and across a plurality of transmission configuration indication states for the first frequency band and the second frequency band.

45. The non-transitory computer-readable medium of claim 44, wherein the code comprising instructions executable by the one or more processors to cause the device to transmit the carrier aggregation configuration further comprises instructions executable by the one or more processors to cause the device to:
   transmit, from the device, an inter-band carrier aggregation configuration.

46. The non-transitory computer-readable medium of claim 44, wherein the code comprising instructions executable by the one or more processors to cause the device to transmit the carrier aggregation configuration further comprises instructions executable by the one or more processors to cause the device to:
   transmit, to the first wireless device, a configuration message as a broadcast message to one or more wireless devices including at least the first wireless device, a wireless device specific message intended for the first wireless device, or both.

47. The non-transitory computer-readable medium of claim 44, wherein the code comprising instructions executable by the one or more processors to cause the device to transmit the carrier aggregation configuration further comprises instructions executable by the one or more processors to cause the device to:
   transmit, to the first wireless device, a configuration message specific to bandwidth parts of the first frequency band and the second frequency band.

48. The non-transitory computer-readable medium of claim 44, wherein the code comprising instructions executable by the one or more processors to cause the device to transmit the carrier aggregation configuration further comprises instructions executable by the one or more processors to cause the device to:
   transmit, to the first wireless device, a configuration message specific to at least one transmission configuration indication state of the plurality of transmission configuration indication states used in the first frequency band and the second frequency band at the device.

49. The non-transitory computer-readable medium of claim 44, wherein the code comprising instructions executable by the one or more processors to cause the device to transmit the carrier aggregation configuration further comprises instructions executable by the one or more processors to cause the device to:
   transmit, to the first wireless device, a configuration message as a weighted average metric for two or more transmission configuration indication states of the plurality of transmission configuration indication states used in the first frequency band and the second frequency band at the device.

50. An apparatus for wireless communications at a first wireless device, comprising:
   one or more memories; and
   one or more processors coupled with the one or more memories and configured to cause the first wireless device to:
      receive, from a second wireless device, a carrier aggregation configuration for communications with the second wireless device, the carrier aggregation configuration comprising at least a first frequency band and a second frequency band;
      receive, from the second wireless device, a configuration message, wherein the configuration message comprises a weighted average metric for two or more transmission configuration indication states associated with the first frequency band and the second frequency band at the second wireless device; and
      communicate, with the second wireless device, in carrier aggregation using a first beam on the first frequency band and a second beam on the second frequency band, the first beam and the second beam being based at least in part on a beam correlation parameter, the beam correlation parameter based at least in part on the received carrier aggregation configuration, wherein the beam correlation parameter indicates a correlation between the first beam and the second beam in a direction based at least in part on the carrier aggregation in the direction for the first frequency band and the second frequency band.

51. The apparatus of claim 50, wherein the one or more processors is configured to cause the first wireless device to:
   receive, from the second wireless device, an inter-band carrier aggregation configuration.

52. The apparatus of claim 50, wherein the one or more processors are further configured to cause the first wireless device to:
   receive, from the second wireless device, the configuration message as a broadcast message to one or more wireless devices including at least the first wireless device, a wireless device specific message intended for the first wireless device, or both.

53. The apparatus of claim 50, wherein the one or more processors are further configured to cause the first wireless device to:
   receive, from the second wireless device, the configuration message specific to bandwidth parts of the first frequency band and the second frequency band.

54. The apparatus of claim 50, wherein the one or more processors are further configured to cause the first wireless device to:
   receive, from the second wireless device, the configuration message specific to a transmission configuration indication state associated with the first frequency band and the second frequency band at the second wireless device, wherein the beam correlation parameter is based at least in part on the transmission configuration indication state.

55. The apparatus of claim 50, wherein the one or more processors are further configured to cause the first wireless device to:

communicate in the carrier aggregation based at least in part on weights for use with the weighted average metric and the two or more transmission configuration indication states of the second beam used in determining a weighted average.

56. An apparatus for wireless communications at a second wireless device, comprising:

one or more memories; and one or more processors coupled with the one or more memories and configured to cause the second wireless device to:

transmit, to a first wireless device, a carrier aggregation configuration for communications with the first wireless device, the carrier aggregation configuration comprising at least a first frequency band and a second frequency band;

transmit, to the first wireless device, a configuration message as a weighted average metric for two or more transmission configuration indication states used in the first frequency band and the second frequency band at the second wireless device; and communicate, with the first wireless device, in carrier aggregation using a first beam on the first frequency band and a second beam on the second frequency band, the first beam and the second beam being based at least in part on a beam correlation parameter, the beam correlation parameter based at least in part on the carrier aggregation configuration, wherein the beam correlation parameter indicates a correlation between the first beam and the second beam in a direction based at least in part on the carrier aggregation in the direction for the first frequency band and the second frequency band.

57. The apparatus of claim 56, wherein the one or more processors are further configured to cause the second wireless device to:

transmit, to the first wireless device, the configuration message as a broadcast message to one or more wireless devices including at least the first wireless device, a wireless device specific message intended for the first wireless device, or both.

58. The apparatus of claim 56, wherein the one or more processors are further configured to cause the second wireless device to:

transmit, to the first wireless device, the configuration message specific to bandwidth parts of the first frequency band and the second frequency band.

59. The apparatus of claim 56, wherein the one or more processors are further configured to cause the second wireless device to:

transmit, to the first wireless device, the configuration message specific to a transmission configuration indication state used in the first frequency band and the second frequency band at the second wireless device, wherein the beam correlation parameter is based at least in part on the transmission configuration indication state.

60. The apparatus of claim 56, wherein the one or more processors are further configured to cause the second wireless device to:

transmit, from the second wireless device, an inter-band carrier aggregation configuration.

* * * * *